(12) United States Patent
Nassi et al.

(10) Patent No.: US 10,579,421 B2
(45) Date of Patent: Mar. 3, 2020

(54) DYNAMIC SCHEDULING OF VIRTUAL PROCESSORS IN A DISTRIBUTED SYSTEM

(71) Applicant: TidalScale, Inc., Campbell, CA (US)

(72) Inventors: Isaac R. Nassi, Los Gatos, CA (US); Mark Hill, Los Altos, CA (US); I-Chun Fang, San Jose, CA (US); Kleoni Ioannidou, Sunnyvale, CA (US)

(73) Assignee: TidalScale, Inc., Campbell, CA (US)

( * ) Notice: Subject to any disclaimer, the term of this patent is extended or adjusted under 35 U.S.C. 154(b) by 55 days.

(21) Appl. No.: 15/687,172

(22) Filed: Aug. 25, 2017

(65) Prior Publication Data

US 2018/0060121 A1    Mar. 1, 2018

Related U.S. Application Data

(60) Provisional application No. 62/457,609, filed on Feb. 10, 2017, provisional application No. 62/380,896, (Continued)

(51) Int. Cl.
| | | |
|---|---|---|
| G06F 9/46 | (2006.01) |
| G06F 9/48 | (2006.01) |
| G06F 9/455 | (2018.01) |
| G06F 9/44 | (2018.01) |
| G06F 9/50 | (2006.01) |

(Continued)

(52) U.S. Cl.
CPC .......... *G06F 9/4875* (2013.01); *G06F 9/3009* (2013.01); *G06F 9/30123* (2013.01); *G06F 9/3855* (2013.01); *G06F 9/44* (2013.01); *G06F 9/45558* (2013.01); *G06F 9/4856* (2013.01); *G06F 9/4881* (2013.01); *G06F 9/5055* (2013.01); *G06F 9/5077* (2013.01); *G06F 9/546* (2013.01); *H04L 67/10* (2013.01); *G06F 2009/4557* (2013.01)

(58) Field of Classification Search
None
See application file for complete search history.

(56) References Cited

U.S. PATENT DOCUMENTS

| | | |
|---|---|---|
| 5,109,486 A | 4/1992 | Seymour |
| 5,745,778 A | 4/1998 | Alfieri |

(Continued)

FOREIGN PATENT DOCUMENTS

GB    2419701    5/2006

OTHER PUBLICATIONS

Kai Li. Shared Virtual Memory on Loosely Coupled Multiprocessors. Yale University, 1986.

(Continued)

*Primary Examiner* — Bing Zhao
(74) *Attorney, Agent, or Firm* — Van Pelt, Yi & James LLP

(57) ABSTRACT

Dynamic scheduling is disclosed. A plurality of physical nodes is included in a computer system. Each node includes a plurality of processors. Each processor includes a plurality of hyperthreads. In response to receiving an indication of an event occurring, a search is performed for a queue in a set of queues on which to place a virtual processor that had been waiting on the event. Queues in the set of queues correspond to hyperthreads in a physical node in the plurality of physical nodes. The queues in the set of queues are visited according to a predetermined traversal order.

12 Claims, 28 Drawing Sheets

Related U.S. Application Data filed on Aug. 29, 2016, provisional application No. 62/468,856, filed on Mar. 8, 2017, provisional application No. 62/525,544, filed on Jun. 27, 2017, provisional application No. 62/525,552, filed on Jun. 27, 2017.

(51) Int. Cl.

| | | |
|---|---|---|
| *H04L 29/08* | (2006.01) | |
| *G06F 9/30* | (2018.01) | |
| *G06F 9/38* | (2018.01) | |
| *G06F 9/54* | (2006.01) | |

(56) References Cited

U.S. PATENT DOCUMENTS

| | | | |
|---|---|---|---|
| 5,991,893 A | 11/1999 | Snider | |
| 6,016,542 A | 1/2000 | Gottlieb | |
| 6,105,053 A | 8/2000 | Kimmel | |
| 6,266,745 B1 | 7/2001 | De Backer | |
| 6,336,170 B1 | 1/2002 | Dean | |
| 6,601,083 B1 | 7/2003 | Reznak | |
| 6,625,709 B2 | 9/2003 | Aiken | |
| 6,658,447 B2 | 12/2003 | Cota-Robles | |
| 6,748,593 B1 * | 6/2004 | Brenner | G06F 9/5083 709/223 |
| 6,807,616 B1 | 10/2004 | McGrath | |
| 6,823,472 B1 | 11/2004 | Dekoning | |
| 7,222,221 B1 | 5/2007 | Agesen | |
| 7,308,498 B1 | 12/2007 | Olsen | |
| 7,328,371 B1 | 2/2008 | Kalyanasundharam | |
| 7,596,654 B1 | 9/2009 | Wong | |
| 7,613,882 B1 | 11/2009 | Akkawi | |
| 7,711,789 B1 | 5/2010 | Jnagal | |
| 7,715,400 B1 | 5/2010 | Krakirian | |
| 7,782,869 B1 | 8/2010 | Chitlur Srinivasa | |
| 7,783,788 B1 | 8/2010 | Quinn | |
| 7,797,375 B2 | 9/2010 | Vincent | |
| 7,802,073 B1 | 9/2010 | Cheng | |
| 7,844,709 B2 | 11/2010 | Aman | |
| 7,852,786 B2 | 12/2010 | Wang | |
| 7,865,895 B2 | 1/2011 | Anand | |
| 8,346,909 B2 | 1/2013 | Dan | |
| 8,423,694 B2 | 4/2013 | Naylor | |
| 8,424,010 B2 | 4/2013 | Stegaru | |
| 8,544,004 B2 | 9/2013 | Fultheim | |
| 8,547,840 B1 | 10/2013 | Kumar | |
| RE44,610 E | 11/2013 | Krakirian | |
| 8,650,296 B1 | 2/2014 | Herington | |
| RE44,818 E | 3/2014 | Jnagal | |
| 8,693,391 B2 | 4/2014 | Garcia-Martin | |
| 8,776,050 B2 | 7/2014 | Plouffe | |
| 8,788,672 B2 | 7/2014 | Heller, Jr. | |
| 8,832,692 B2 | 9/2014 | Fultheim | |
| 9,020,801 B2 | 4/2015 | Fultheim | |
| 9,201,689 B2 | 12/2015 | Scott | |
| 9,774,401 B1 | 9/2017 | Borrill | |
| 10,187,452 B2 * | 1/2019 | Nassi | H04L 67/10 |
| 2002/0087611 A1 | 7/2002 | Tanaka | |
| 2003/0037185 A1 | 2/2003 | Davis | |
| 2004/0226026 A1 | 11/2004 | Glass | |
| 2004/0249947 A1 | 12/2004 | Novaes | |
| 2005/0015430 A1 | 1/2005 | Rothman | |
| 2005/0044301 A1 | 2/2005 | Vasilevsky | |
| 2005/0223382 A1 | 10/2005 | Lippett | |
| 2006/0037017 A1 * | 2/2006 | Accapadi | G06F 9/5088 718/100 |
| 2006/0136653 A1 | 6/2006 | Traut | |
| 2006/0143350 A1 | 6/2006 | Miloushev | |
| 2006/0242389 A1 | 10/2006 | Browning | |
| 2006/0259818 A1 | 11/2006 | Howell | |
| 2007/0226795 A1 | 9/2007 | Conti | |
| 2007/0283125 A1 | 12/2007 | Manczak | |
| 2008/0028408 A1 | 1/2008 | Day | |
| 2008/0109876 A1 | 5/2008 | Hitomi | |
| 2008/0270659 A1 | 10/2008 | Grewal | |
| 2009/0064158 A1 | 3/2009 | Carter | |
| 2009/0138887 A1 | 5/2009 | Uehara | |
| 2009/0172690 A1 | 7/2009 | Zimmer | |
| 2009/0187904 A1 | 7/2009 | Serebrin | |
| 2009/0193122 A1 | 7/2009 | Krishamurthy | |
| 2009/0217276 A1 | 8/2009 | Brenner | |
| 2009/0288087 A1 | 11/2009 | Ringseth | |
| 2010/0031254 A1 | 2/2010 | Chin | |
| 2010/0235847 A1 | 9/2010 | Brehmer | |
| 2011/0004729 A1 | 1/2011 | Akkawi | |
| 2011/0004732 A1 | 1/2011 | Krakirian | |
| 2011/0004733 A1 | 1/2011 | Krakirian | |
| 2011/0010709 A1 | 1/2011 | Anand | |
| 2011/0041131 A1 | 2/2011 | Srivatsa | |
| 2011/0083134 A1 | 4/2011 | Song | |
| 2011/0087822 A1 | 4/2011 | Bennett | |
| 2011/0119422 A1 | 5/2011 | Grouzdev | |
| 2011/0179132 A1 | 7/2011 | Mayo | |
| 2011/0191783 A1 | 8/2011 | Le Moal | |
| 2011/0247000 A1 | 10/2011 | Eidus | |
| 2011/0296406 A1 | 12/2011 | Bhandari | |
| 2012/0020370 A1 | 1/2012 | Sonnier | |
| 2012/0023311 A1 | 1/2012 | Yamamoto | |
| 2012/0079232 A1 | 3/2012 | Hinton | |
| 2012/0096462 A1 | 4/2012 | Kim | |
| 2012/0174097 A1 | 7/2012 | Levin | |
| 2012/0185866 A1 | 7/2012 | Couvee | |
| 2012/0297163 A1 | 11/2012 | Breternitz | |
| 2012/0303799 A1 | 11/2012 | Hadas | |
| 2013/0159997 A1 | 6/2013 | Cawlfield | |
| 2013/0167146 A1 | 6/2013 | Dong | |
| 2013/0173806 A1 | 7/2013 | Newton | |
| 2013/0263138 A1 | 10/2013 | Aho | |
| 2013/0332778 A1 | 12/2013 | Spracklen | |
| 2014/0059110 A1 | 2/2014 | Nassi | |
| 2014/0081918 A1 | 3/2014 | Srivas | |
| 2014/0201421 A1 | 7/2014 | Schoenberg | |
| 2014/0245294 A1 | 8/2014 | Kaul | |
| 2014/0245295 A1 | 8/2014 | Tsirkin | |
| 2014/0245444 A1 | 8/2014 | Lutas | |
| 2015/0277908 A1 | 10/2015 | Bradbury | |
| 2016/0366183 A1 | 12/2016 | Smith | |
| 2017/0031819 A1 | 2/2017 | Venkatasubramanian | |
| 2018/0062764 A1 | 3/2018 | Borrill | |

OTHER PUBLICATIONS

Alnæs et al., "Scalable Coherent Interface", Jan. 1990.

Ami Litman, "The DUNIX Distributed Operating System", Jan. 1988.

Amza et al., "TreadMarks: Shared Memory Computing on Networks of Workstations", 1996.

Amza et al., "TreadMarks: Shared Memory Computing on Networks of Workstations", Feb. 1996.

Andrew W. Wilson Jr., "Hierarchical Cache / Bus Architecture for Shared Memory Multiprocessors", 1987.

Andrew Wilkins Wilson Jr., "Organization and Statistical Simulation of Hierarchical Multiprocessors", Department of Electrical and Computer Engineering, Carnegie-Mellon University, Aug. 1985. (part 1 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 2 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 3 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 4 of 4).

Aral et al. Process Control Structures for Multiprocessors. Encore Computer Corporation. IEEE, 1991.

(56) References Cited

OTHER PUBLICATIONS

Aral, Ziya et al. "Variable Weight Processes with Flexible Shared Resources ." (1989).
Assaf Schuster, Resume, Jul. 2017.
Author Unknown, "A research and development strategy for high performance computing", Executive Office of the President, Office of Science and Technology Policy, Nov. 20, 1987.
Author Unknown, "IBM System/360 Model 67: Functional Characteristics", IBM Systems Reference Library, First Edition, 1967.
Author Unknown, "IBM Time Sharing System: Command System User's Guide", IBM Systems Reference Library, Aug. 1976. (1 of 3).
Author Unknown, "IBM Time Sharing System: Command System User's Guide", IBM Systems Reference Library, Aug. 1976. (2 of 3).
Author Unknown, "IBM Time Sharing System: Command System User's Guide", IBM Systems Reference Library, Aug. 1976. (3 of 3).
Author Unknown, "Multimax Technical Summary", Encore Computer Corporation, May 1985.
Author Unknown, "System/360 Model 67: Time Sharing System Preliminary Technical Summary", IBM Systems Reference Library, 1966.
Author Unknown. Features—multicians.org/features.html. Multics Software Features. Jul. 21, 2012.
Barak et al., "MOS: A Multicomputer Distributed Operating System", The Hebrew University of Jerusalem, Software—Practice and Experience, vol. 15(8), 725-737, Aug. 1985.
Beck et al. Harness: a next generation distributed virtual machine. Future Generation Computer Systems 15 (1999). pp. 571-582.
Bell et al., "The Encore Continuum: a complete distributed work station—multiprocessor computing environment", National Computer Conference, 1985.
Bendtsen et al. Experience With the KSR-1 Parallel Computer. Jul. 1996.
Bensoussan et al. The Multics Virtual Memory: Concepts and Design. Association for Computing Machinery, Inc., 1972.
Bilas et al., "Shared virtual memory clusters: bridging the cost-performance gap between SMPs and hardware DSM systems", Journal of Parallel and Distributed Computing, Oct. 19, 2001.
Blakeney et al. An Application-Oriented Multiprocessing System: II Design Characteristics of the 9020 System. IBM Systems Journal, vol. 6, No. 2. 1967, part 2.
Boykin et al. Programming under Mach. UNIX and Open Systems Series. pp. 63-97.Copyright (c) 1993 by Addison-Wesley Publishing Company, Inc. 1993.
Breit et al. Technical Applications on the KSR1: High Performance and Ease of Use. IEEE, 1993.
Bugnion et al., "Disco: Running Commodity Operating Systems on Scalable Multiprocessors", Computer Systems Laboratory, Stanford University, 1997.
Büttner et al., "ARTS of PEACE—A High-Performance Middleware Layer for Parallel Distributed Computing", Mar. 31, 1995.
Buyya et al., "Single System Image (SSI)", The International Journal of High Performance Computing Applications, vol. 15, No. 2, 2001.
Buzen et al., "The evolution of virtual machine architecture", Honeywell Information Systems, Inc. and Harvard University, National Computer Conference, 1973.
C. Gordon Bell, "Multis: A New Class of Multiprocessor Computers", Science, vol. 228, pp. 462-467, Apr. 26, 1985.
Carl J. Young. Extended Architecture and Hypervisor Performance. IBM VM/370 Development Group. Published in: Proceedings of the workshop on virtual computer systems. pp. 177-183 Cambridge, Massachusetts, USA—Mar. 26-27, 197. Acm New York, NY, USA © 1973.
Chapman et al., "vNUMA: A Virtual Shared-Memory Multiprocessor", 2009.
Chen et al., "When Virtual Is Better Than Real", 2001.
Chester Gordon Bell. Three Decades of Multiprocessors. Feb. 1991.
Chester Gordon Bell. Darpa Proposal: Encore Computer Corporation Research and Development in High Performance and Fail Soft Multiprocessors for Parallelism; and Systolic Array Processors for Signal Processing. Mar. 10, 1984.
Corbató et al., "Introduction and Overview of the Multics System", 1965.
Corbató et al., "Multics—The first seven years", Spring Joint Computer Conference, 1972.
Dave Taylor. Distributed Operating Systems—An Overview of Current Research. Jun. 13, 1998.
David B. Gustavson, "Applications for the Scalable Coherent Interface", Stanford Linear Accelerator Center, Apr. 1990.
David B. Gustavson. [RPRWG] Dave James. Jan. 18, 2008.
David J. Schanin. The Design and Development of a Very High Speed System Bus—The Encore Multimax Nanobus. IEEE, 1986.
Edmnd Burke. An Overview of System Software for the KSR1. Kendall Square Research Corporation, Waltham, MA. IEEE. 1993.
Einar Rustad, "numascale: NumaConnect", Sep. 2013.
Elizabeth Corcoran, "Strategic computing: a status report", Apr. 1987.
Frank et al. The KSR1: Bridging the Gap Between Shared Memory and MPPs. IEEE, 1993.
Fraser et al. 3Leaf Virtual Server Software Architecture. Copyright (c) 2004 3Leaf Networks.
Fu et al., "Distributed shared arrays: A distributed virtual machine with mobility support for reconfiguration", Wayne State University, Sep. 1, 2003.
Gabriel Southern. Analysis of SMP VM CPU Scheduling. George Mason University. 2008.
Gardner Hendrie, "Oral History of Gordon Bell", Computer History Museum, Jun. 23, 2005.
Gertner et al., "Symmetric Parallel Processing", 1990.
Ghormley et al., "GLUnix: a Global Layer Unix for a Network of Workstations", University of California at Berkeley, Aug. 14, 1997.
Giloi W.K., Hastedt C., Schoen F., Schroeder-Preikschat W. (1991) A distributed implementation of shared virtual memory with strong and weak coherence. In: Bode A. (eds) Distributed Memory Computing. EDMCC 1991. Lecture Notes in Computer Science, vol. 487. Springer, Berlin, Heidelberg.
Goodman et al. Scalability and Its Application to Multicube. Computer Sciences Technical Report #835. Mar. 1989.
Gordon Bell, "Scalable, Parallel Computers: Alternatives, Issues, and Challenges", International Journal of Parallel Programming, vol. 22, No. 1, 1994.
Govil et al., "Cellular Disco: resource management using virtual clusters on shared-memory multiprocessors", 17th ACM Symposium on Operating Systems Principles, Dec. 1999.
Gregory F. Pfister, "An Introduction to the InfiniBand Architecture", 2001.
Gregory F. Pfister. In Search of Clusters the Ongoing Battle in Lowly Parallel Computing. Chapters. 6-7, 11, 12.11.4.2, 13. Second Edition. (c) 1998 Prentice Hall PTR. 1998 (part 1 of 3).
Gregory F. Pfister. In Search of Clusters the Ongoing Battle in Lowly Parallel Computing. Chapters. 6-7, 11, 12.11.4.2, 13. Second Edition. (c) 1998 Prentice Hall PTR. 1998 (part 2 of 3).
Gregory F. Pfister. In Search of Clusters the Ongoing Battle in Lowly Parallel Computing. Chapters. 6-7, 11, 12.11.4.2, 13. Second Edition. (c) 1998 Prentice Hall PTR. 1998 (part 3 of 3).
Gregory Pfister, "Aspects of the InfiniBand Architecture", IBM Server Technology & Architecture, Austin, TX, Oct. 11, 2001.
Healy et al. Single System Image: A Survey. Article in Journal of Parallel and Distributed Computing. Feb. 2016.
History of IBM Mainframe Operating Systems. From Wikipedia, the free encyclopedia. https://web.archive.org/web/20120622012058/https://en.wikipedia.org/wiki/History_of_IBM_mainframe_operating_systems. Jun. 22, 2012.
Holley et al., "VM/370 asymmetric multiprocessing", IBM Systems Journal, vol. 18, No. 1, 1979.
Hu et al. The Memory and Communication Subsystem of Virtual Machines for Cluster Computing. Jan. 2002.
Hudzia et al., "Memory Aggregation for KVM", Hecatonchire Project, Nov. 2012.

(56) References Cited

OTHER PUBLICATIONS

Hwang et al. Distributed and Cloud Computing From Parallel Processing to the Internet of Things. Oct. 17, 2011.
Ion Stoica. Virtual Machines Disco and Xen (Lecture 10, cs262a). UC Berkeley, Sep. 28, 2016.
J. F. Keeley. An Application-Oriented Multiprocessing System: I Introduction. IBM Systems Journal, vol. 6, No. 2. 1967, part 1.
Janjua et al. CEJVM: "Cluster Enabled Java Virtual Machine". Faculty of Computer Science & Engineering, GIK Institute, Topi, Pakistan. IEEE, Sep. 2002.
Jeff Dike. User Mode Linux. Bruce Peren's Open Source Series. Chapter 12. Copyright (c) 2006 Pearson Education, Inc. Apr. 2006.
Jeff Dike. UML Clustering. Sep. 14, 2001.
Jiang et al., "SODA: a Service-On-Demand Architecture for Application Service Hosting Utility Platforms", Proceedings of the 12th IEEE International Symposium on High Performance Distributed Computing (HPDC'03), 2003.
Jim Elliot. IBM Mainframes—45+ Years of Evolution. (c) 2010 IBM Corporation. 2010.
Juhász et al., "Distributed and Parallel Systems: Cluster and Grid Computing", the Kluwer iternational series in engineering and computer science, 2005.
Kai Hwang. Advanced Computer Architecture: Parallelism, Scalability, Programmability. Chapter 7. Copyright (c) 1993 McGraw-Hill, Inc.
Kaneda et al. A Virtual Machine Monitor for Providing a Single System Image. 2006.
King et al., "Operating System Support for Virtual Machines", Proceedings of the 2003 USENIX Technical Conference, 2003.
Konthothanassis et al., "VM-Based Shared Memory on Low-Latency, Remote-Memory-Access Networks", Nov. 1996.
Kronenberg et al., "VAXclusters: A Closely-Coupled Distributed System", ACM Transactions on Computer Systems, vol. 4, No. 2, pp. 130-146, May 1986.
Lenoski et al. The Stanford Dash Multiprocessor. IEEE, Mar. 1992.
Li et al., "Memory Coherence in Shared Virtual Memory Systems", ACM Transactions on Computer Systems, vol. 7, No. 4, pp. 321-359, Nov. 1989.
Li et al., "Memory Coherence in Shared Virtual Memory Systems", Distributed Information Processing, 2014.
Li et al., "Memory Coherence in Shared Virtual Memory Systems", Yale University, 1986.
Liu et al., "Design and Implementation of a Single System Image Operating System for Ad Hoc Networks", Department of Computer Science, Cornell University, Jun. 2005.
Ma et al., "JESSICA: Java-Enable Single-System-Image Computing Architecture", The University of Hong Kong, Oct. 2000.
Maurice Herlihy. Wait-Free Synchronization. ACM Transactions on Programming Languages and Systems, vol. 11, No. 1. pp. 124-149. Jan. 1991.
Michael James Carlton, "Multiple-Bus, Scaleable, Shared-Memory Multiprocessors", University of California at Berkeley, 1995.
Michael T. Alexander, "Organization and features of the Michigan terminal system", Spring Joint Computer Conference, 1972.
Oracle. Oracle Buys Virtual Iron—Adds advanced virtualization management technology to enhance Oracle VM. Jun. 15, 2009.
Osisek et al. ESA/390 Interpretive-Execution Architecture, Foundation for VM/ESA. IBM Systems Journal, vol. 30, No. 1. Feb. 1991.
Ossanna et al. Communications and Input/Output Switching in a Multiplex Computing System. Fall Joint Computer Conference, 1965.
Peng et al. DVMM: a Distributed VMM for Supporting Single System Image on Clusters. The 9th international Conference for Young Computer Scientists. IEEE, 2008.
Pete Keleher, "CVM: The Coherent Virtual Machine", University of Maryland, Aug. 1, 1998.
Pieter J. Muller, "An Environment for Distributed Programming on a Multicomputer", a thesis submitted to the department of computer science of the University of Stellenbosch in partial fulfillment of the requirements for the degree of master of science, Feb. 1994.
Pinkston et al., "InfiniBand: The 'De Facto' Future Standard for System and Local Area Networks or Just a Scalable Replacement for PCI Buses?", Cluster Computing 6, pp. 95-104, 2003.
Popek and Goldberg Virtualization Requirements. From Wikipedia, the free encyclopedia. https://en.wikipedia.org/wiki/Popek_and_Goldberg_virtualization_requirements. Jun. 22, 2012.
Popek et al. Formal Requirements for Virtualizable Third Generation Architectures. Communications of the ACM, vol. 17, No. 7. Jul. 1974.
Popek, Gerald J. et al. "LOCUS—A Network Transparent, High Reliability Distributed System." SOSP (1981).
Protić et al., "A Survey of Distributed Shared Memory Systems", Proceedings of the 28th Annual Hawaii International Conference on System Sciences, 1995.
R. A. MacKinnon, "The changing virtual machine environment: Interfaces to real hardware, virtual hardware, and other virtual machines", 1979.
R. J. Creasy. The Origin of the VM/370 Time-Sharing System. IBM J. Res. Develop. vol. 25, No. 5. Sep. 1981.
Rajkumar Buyya, "PARMON: a portable and scalable monitoring system for clusters", Monash University, 2000.
Ramachandran et al. Scalability Study of the KSR-1—Appeared in Parallel Computing, vol. 22, pp. 739-759. 1996.
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 1 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Raport"), Mar. 1991. (part 2 of 4).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 3 of 3).
Rich Oehler, "Ideas for a Dependable 'Industry Standard Architecture' Platform", Newisys, Inc., Jan. 27, 2005.
Richard A. Jenkins, "New Approaches in Parallel Computing", Computers in Physics, 1989.
Robert P. Goldberg. Survey of Virtual Machine Research. Honeywell Information Systems and Harvard University. Jun. 1974.
Robert P. Goldberg. Survey of Virtual Machine Research (2). Honeywell Information Systems and Harvard University. Jun. 1974.
Roland et al. Strategic Computing—Darpa and the Quest for Machine Intelligence, 1983-1993. Chapter 5 and Chapter 9. (c)2002 Massachusetts Institute of Technology. 2002.
Rudolph et al., "Dynamic Decentralized Cache Schemes for MIMD Parallel Processors", Carnegie-Mellon University, 1984.
Scales et al., "Towards Transparent and Efficient Software Distributed Shared Memory", Oct. 1997.
Scott Lurndal. 3Leaf Virtual Server—Low-Level Architectural Design. May 9, 2018.
Sirer et al Al. Distributed Virtual Machines: A System Architecture for Network Computing. Dept. of Computer Science & Engineering, University of Washington. 1998.
Southern et al. FPGA Implementation of High Throughput Circuit for Trial Division by Small Primes. George Mason University. 2007.
Srodawa et al., "An efficient virtual machine implementation", Wayne State University, National Computer Conference, 1973.
Steier et al. Mind Matters—A Tribute to Allen Newell. Chapter 6. Copyright (c) 1996 by Lawrence Associates, Inc. 1996.

(56) References Cited

OTHER PUBLICATIONS

Tetzlaff et al., "VM/370, Attached Processor, and multiprocessor performance study", IBM Systems Journal, vol. 23, No. 4, 1984.
Tod Newcombe, "Public-Sector Multiprocessing Emerges", Nov. 30, 1995.
USENIX Association. Proceedings of the 5th Annual Linux Showcase & Conference. Oakland, CA. Nov. 5-10, 2001.
Vasilevsky et al., "LINUX Virtualization on Virtual Iron VFe", Virtual Iron Software, Inc., 2005.
VM (operating system). From Wikipedia, the fee encyclopedia. https://en.wikipedia.org/wiki/VM_(operating_system). Jun. 22, 2012.
Walker et al. The LOCUS Distributed Operating System. ACM, 1983.
Walker et al. The LOCUS Distributed Operating System. Presentation, 1983.
Walker, Bruce J. and Douglas Steel. "Implementing a Full Single System Image UnixWare Cluster: Middleware vs Underware." PDPTA (1999).
Wang et al. NEX: Virtual Machine Monitor Level Single System Support in Xen. 2009 First International Workshop on Education Technology and Computer Science. IEEE, 2009.
Whitaker et al. Scale and Performance in the Denali Isolation Kernel. USENIX Association 5th Symposium on Operating Systems Design and Implementation. Dec. 2002.
Woodbury et al., "Shared Memory Multiprocessors: The Right Approach to Parallel Processing", Encore Computer Corporation, IEEE, 1989.
Yeo C.S., Buyya R., Pourreza H., Eskicioglu R., Graham P., Sommers F. (2006) Cluster Computing: High-Performance, High-Availability, and High-Throughput Processing on a Network of Computers. In: Zomaya A.Y. (eds) Handbook of Nature-Inspired and Innovative Computing. Springer, Boston, MA. 2006.
Younge et al. Evaluation of SMP Shared Memory Machines for Use With In-Memory and OpenMP Big Data Applications. 2016 IEEE International Parallel and Distributed Processing Symposium Workshops. 2016.
Zhu et al., "JESSICA2: A Distributed Java Virtual Machine with Transparent Thread Migration Support", The University of Hong Kong, 2002.
Aho et al. Principles of Optimal Page Replacement. Article in Journal of the ACM. vol. 18, No. 1, Jan. 1971.
Peter J. Denning. The Working Set Model for Program Behavior. Massachusetts Institute of Technology, Cambridge, Massachusetts. Communications of the ACM. vol. 11, No. 5. May 1968.
PCT2013/058271, "Notification of Transmittal of the International Search Report and the Written Opinion of the International Searching Authority, or Declaration", dated Mar. 18, 2014.
PCT20131058262, "Notification of Transmittal of the International Search Report and the Written Opinion of the International Searching Authority, or Declaration", dated Mar. 25, 2014.
Author Unknown, Technical Summary, Kendall Square Research, 1992.
Bell et al., "DSM Perspective: Another Point of View", Proceedings of the IEEE, vol. 87, No. 3, Mar. 1999.
Bell et al., "The Encore Continuum: a complete distributed work station-multiprocessor computing environment", pp. 147, 149-155, 1985.
Dean et al., "MapReduce: Simplified Data Processing on Large Clusters", USENIX Association, OSDI '04: 6th Symposium on Operating Systems Design and Implementation, pp. 137-149, 2004.
Gordon Bell, "Scalable, Paralell Computers: Alternatives, Issues, and Challenges", from the International Journal of Parallel Programming, vol. 22, No. 1, 1994.
Ike Nassi, "Advances in Virtualization in Support of In-Memory Big Data Applications", TidalScale Powerpoint presentation, Sep. 29, 2015.
Ike Nassi, "Scaling the Computer to the Problem: Application Programming with Unlimited Memory", Cover Feature Computer Design Starts Over, Aug. 2017.
Mendel Rosenblum, "The Reincarnation of Virtual Machines", Jul./Aug. 2004.
Ousterhout et al., "The Case for RAMClouds: Scalable High-Performance Storage Entirely in DRAM" SIGOPS Operating Systems Review, vol. 43, No. 4, pp. 92-105, Dec. 2009.
Rajkumar Buyya, Architecture Alternatives for Scalable Single System Image Clusters, Proceedings of the 1999 Conference on High Performance Computing on Hewlett-Packard Systems (HiPer'99), Tromse, Norway, 1999.
Romney White, "The Single System Image Feature Delivers Greater Flexibility and Resilience", IBM Systems Magazine, May 2013.

\* cited by examiner

INITIAL (Time 0) MEMORY ASSIGNMENT

| BLOCK | | Current Owner | Last Owner |
|---|---|---|---|
| 0 | - FFFF | Node 0 | Node 0 |
| 10000 | - 1FFFF | Node 0 | Node 0 |
| 20000 | - 2FFFF | Node 0 | Node 0 |
| 30000 | - 3FFFF | Node 1 | Node 1 |
| 40000 | - 4FFFF | Node 1 | Node 1 |
| 50000 | - 5FFFF | Node 1 | Node 1 |
| 60000 | - 6FFFF | Node 2 | Node 2 |
| 70000 | - 7FFFF | Node 2 | Node 2 |
| 80000 | - 8FFFF | Node 2 | Node 2 |

⎫ 1002

INITIAL (Time 0) PROCESSOR ASSIGNMENT

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |

Time 1 MEMORY ASSIGNMENT
(Updated)

| BLOCK | | Current Owner | Last Owner |
|---|---|---|---|
| 0 | - FFFF | Node 0 | Node 0 |
| 10000 | - 1FFFF | Node 0 | Node 0 |
| 20000 | - 2FFFF | Node 2 ⬇ | Node 0 |
| 30000 | - 3FFFF | Node 1 | Node 1 |
| 40000 | - 4FFFF | Node 1 | Node 1 |
| 50000 | - 5FFFF | Node 1 | Node 1 |
| 60000 | - 6FFFF | Node 2 | Node 2 |
| 70000 | - 7FFFF | Node 2 | Node 2 |
| 80000 | - 8FFFF | Node 0 ⬆ | Node 2 |

(SWAP between Node 2 and Node 0)

Time 1 PROCESSOR ASSIGNMENT
(Unchanged)

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |

FIG. 11

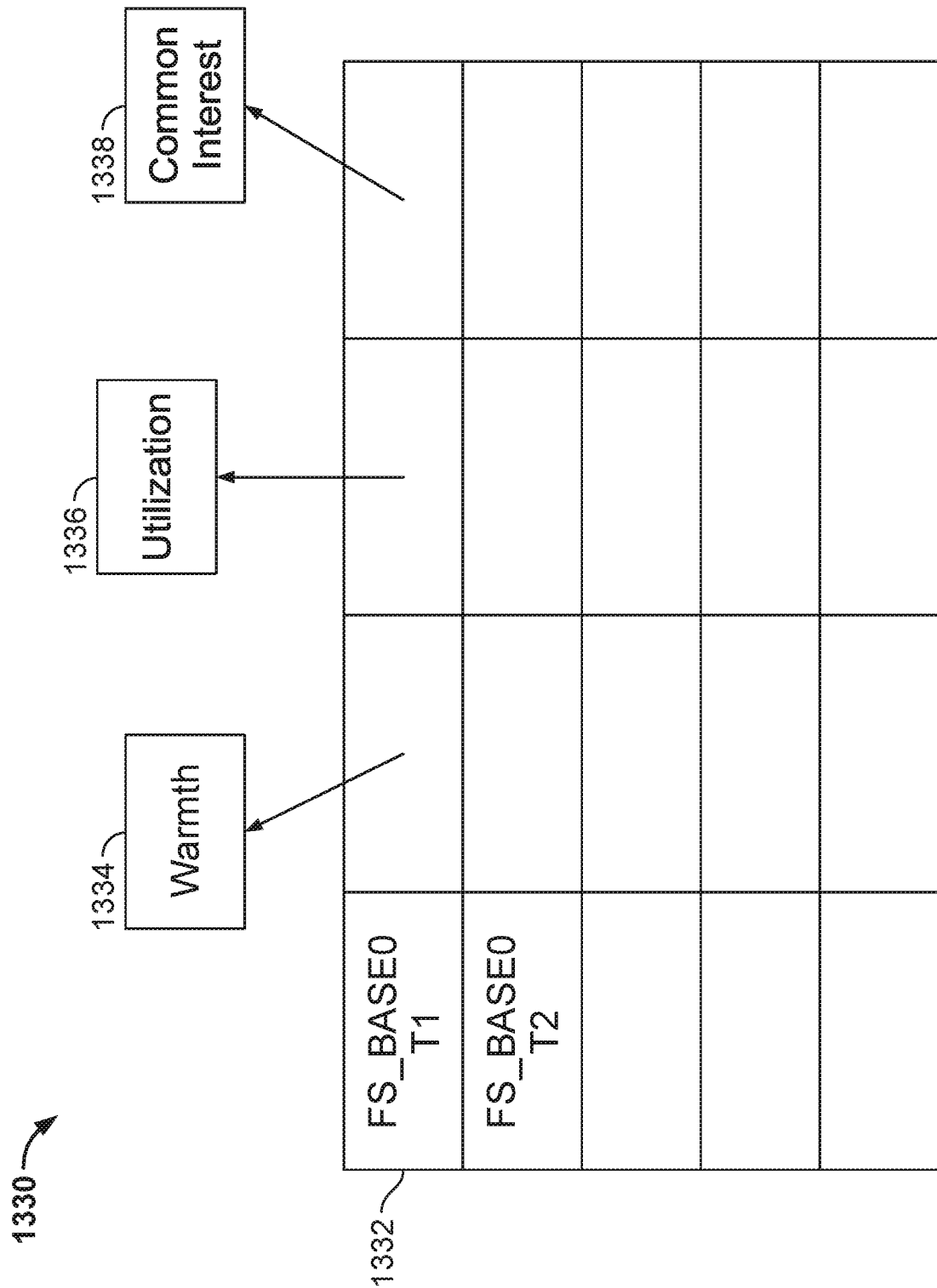

1540

1542
Receive an indication of a stalling event associated with a virtual processor running in a physical processor on a node in a cluster of nodes 1544
Search a set of queues corresponding to physical processors on the node for a virtual processor that is ready to run 1546
Based at least in part on the search, select a virtual processor that is ready to run to assign to the physical processor

FIG. 15D

DYNAMIC SCHEDULING OF VIRTUAL PROCESSORS IN A DISTRIBUTED SYSTEM

CROSS REFERENCE TO OTHER APPLICATIONS

This application claims priority to U.S. Provisional Patent Application No. 62/457,609 entitled ASSOCIATING WORKING SETS AND THREADS filed Feb. 10, 2017, U.S. Provisional Patent Application No. 62/380,896 entitled DYNAMIC SCHEDULING filed Aug. 29, 2016, U.S. Provisional Patent Application No. 62/468,856 entitled DYNAMIC SCHEDULING filed Mar. 8, 2017, U.S. Provisional Patent Application No. 62/525,544 entitled RESOURCE MIGRATION NEGOTIATION filed Jun. 27, 2017, and U.S. Provisional Patent Application No. 62/525,552 entitled MEMORY THREAD LOCALITY filed Jun. 27, 2017, all of which are incorporated herein by reference for all purposes.

BACKGROUND OF THE INVENTION

Software applications are increasingly operating on large sets of data and themselves becoming increasingly complex. In some cases, distributed computing systems are used to support such applications (e.g., where a large database system distributes portions of data onto a landscape of different server nodes, and optimizes queries into sub-queries that get distributed across that landscape). Unfortunately, significant effort has to be spent managing that distribution both in terms of data placement and data access distribution methods, including the complexities of networking. If the landscape changes, if the data organization changes, or if the workload changes, significant work will be required. More generally, the behavior of complex computing systems changes over time, e.g., with new releases of applications, the addition of new intermediate software layers, new operating system releases, new processor models, changing structural characteristics of data, increasing amounts of data, and different data access patterns.

BRIEF DESCRIPTION OF THE DRAWINGS

Various embodiments of the invention are disclosed in the following detailed description and the accompanying drawings.

FIG. 10 illustrates an example of an initial memory assignment and processor assignment.

FIG. 11 illustrates an updated view of the memory assignment and an unchanged view of the processor assignment.

FIG. 13D illustrates an example embodiment of a table used to store information pertaining to guest threads.

FIG. 15D is a flow diagram illustrating an embodiment of a process for searching for a vcpu that is ready to run.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
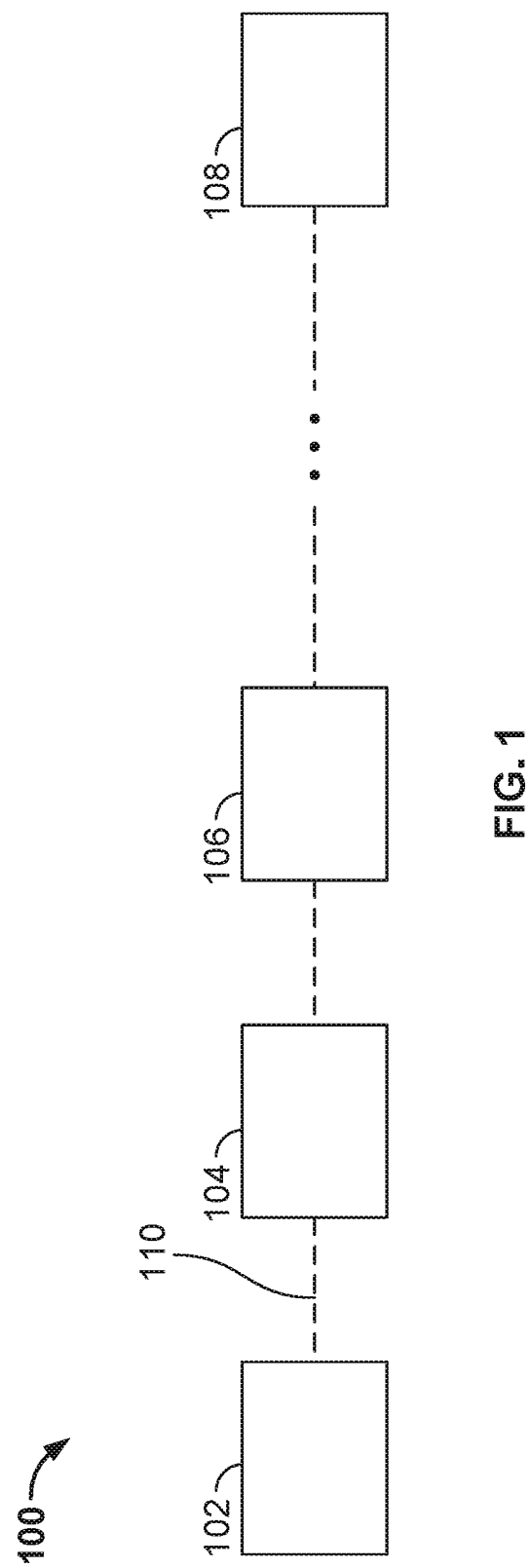
FIG. 1 illustrates an embodiment of a computer system.

FIG. 1 illustrates an embodiment of a computer system. System 100 is also referred to herein as an "enterprise supercomputer" and a "mainframe." In the example shown, system 100 includes a plurality of nodes (e.g., nodes 102-108) located in close proximity (e.g., located within the same rack). In other embodiments, multiple racks of nodes (e.g., located within the same facility) can be used in the system. Further, the techniques described herein can also be used in conjunction with distributed systems.

The nodes are interconnected with a high-speed interconnect (110) such as 10-gigabit Ethernet, direct PCI-to-PCI, and/or InfiniBand. Each node comprises commodity server-class hardware components (e.g., a blade in a rack with its attached or contained peripherals). In the example shown in FIG. 1, each node includes multiple physical processor chips. Each physical processor chip (also referred to as a "socket") includes multiple cores, and each core has multiple hyperthreads.

Figure 2:
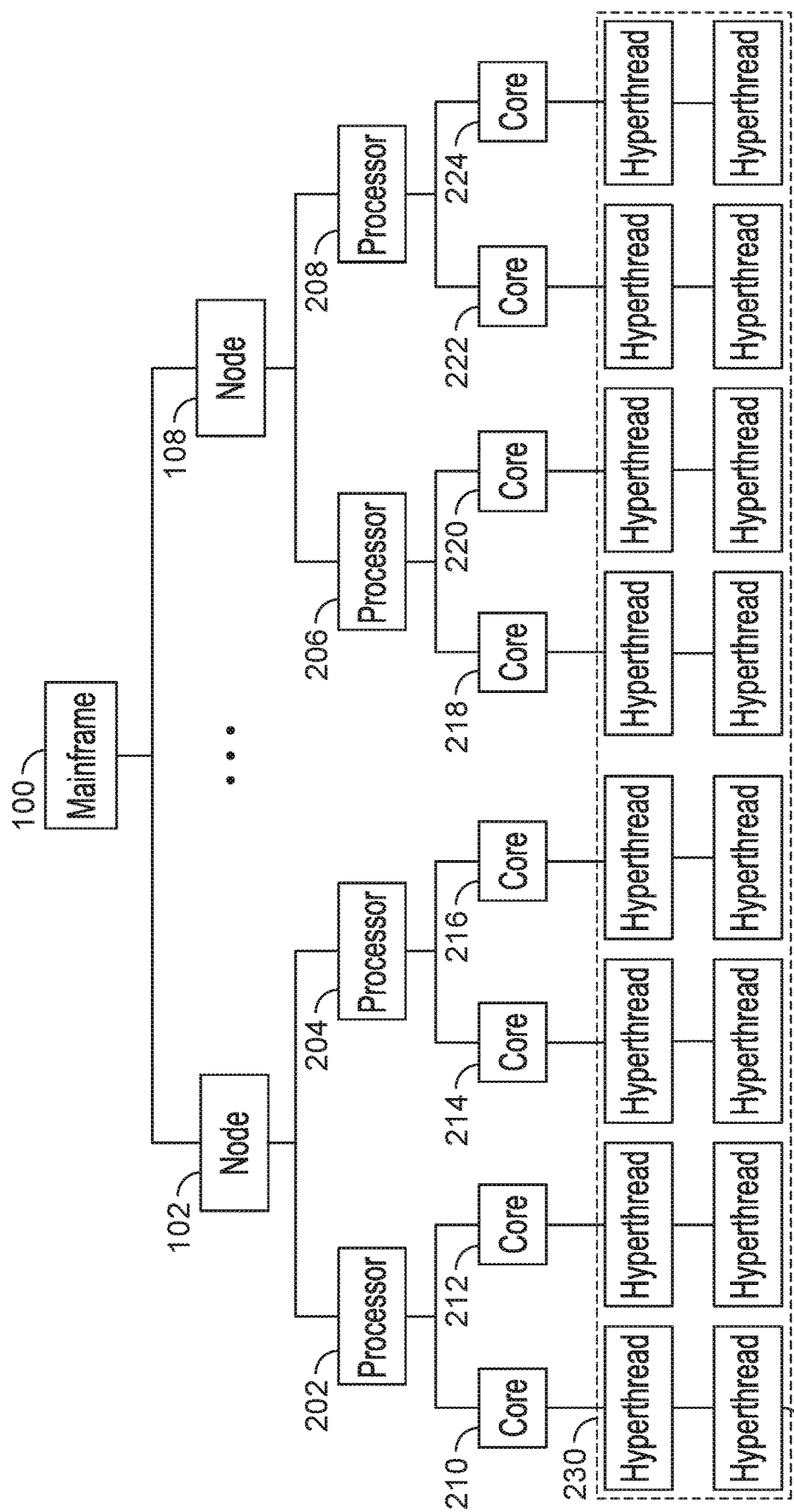
FIG. 2 illustrates the physical structure of the computer system as a hierarchy.

As illustrated in FIG. 2, the physical structure of system 100 forms a hierarchy (from the bottom) of hyperthreads (230), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
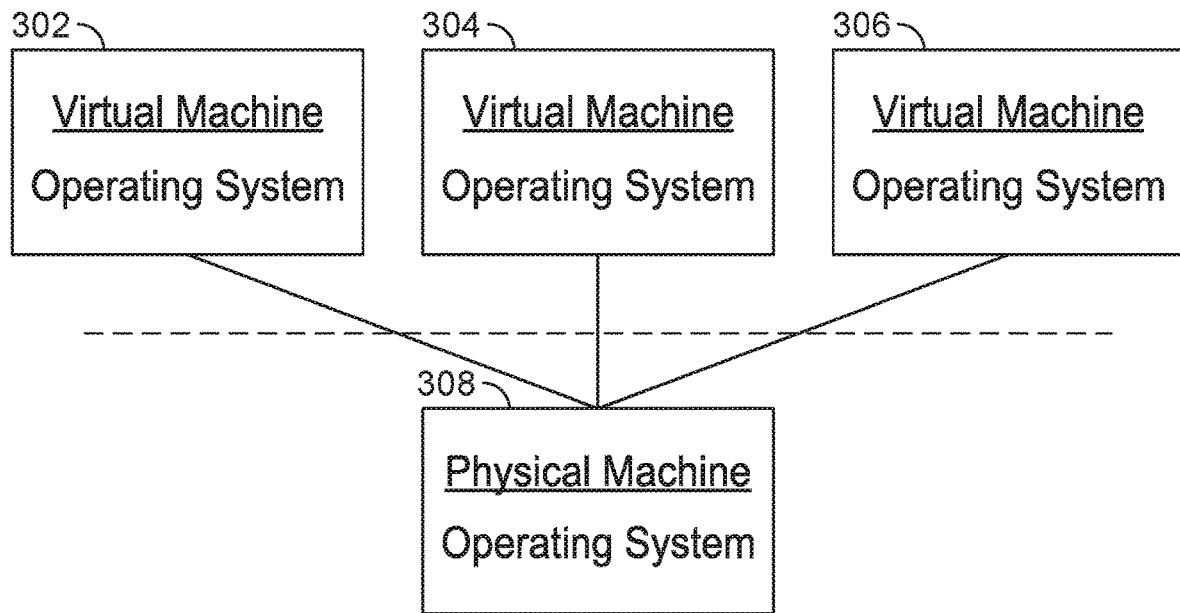
FIG. 3A depicts a virtualized computing environment in which multiple virtual machines (with respective multiple guest operating systems) run on a single physical machine.
Figure 3B:
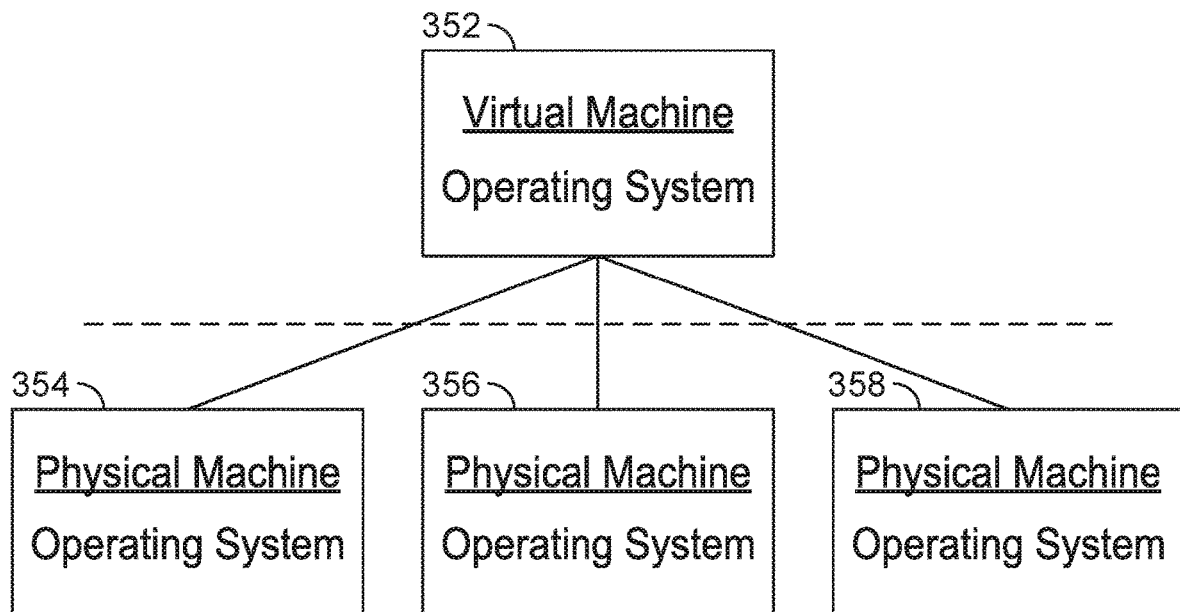
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
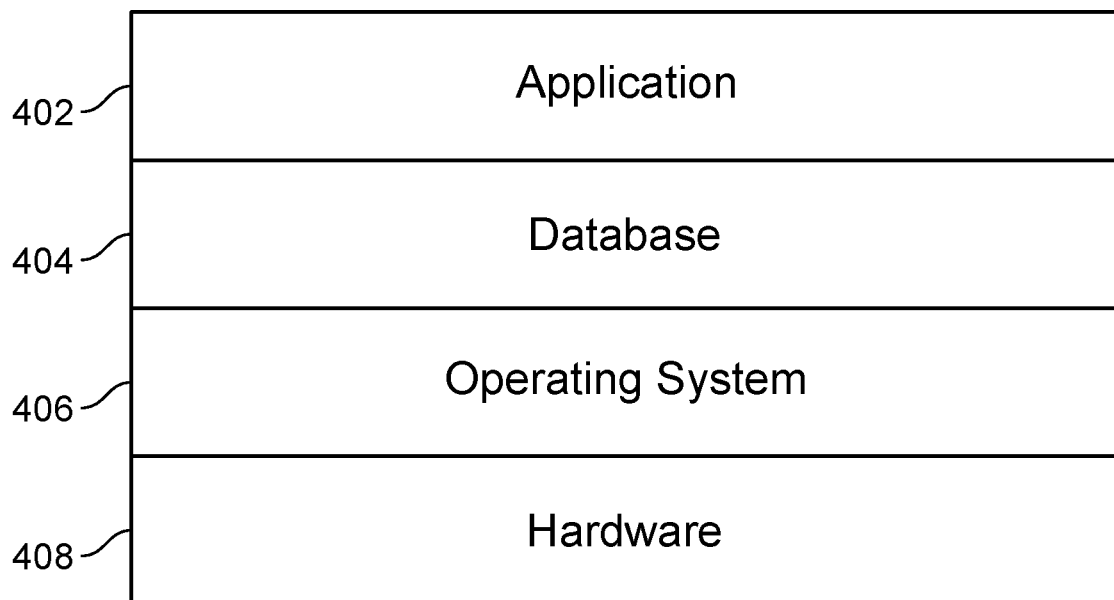
FIG. 4A depicts an example of a software stack.
Figure 4B:
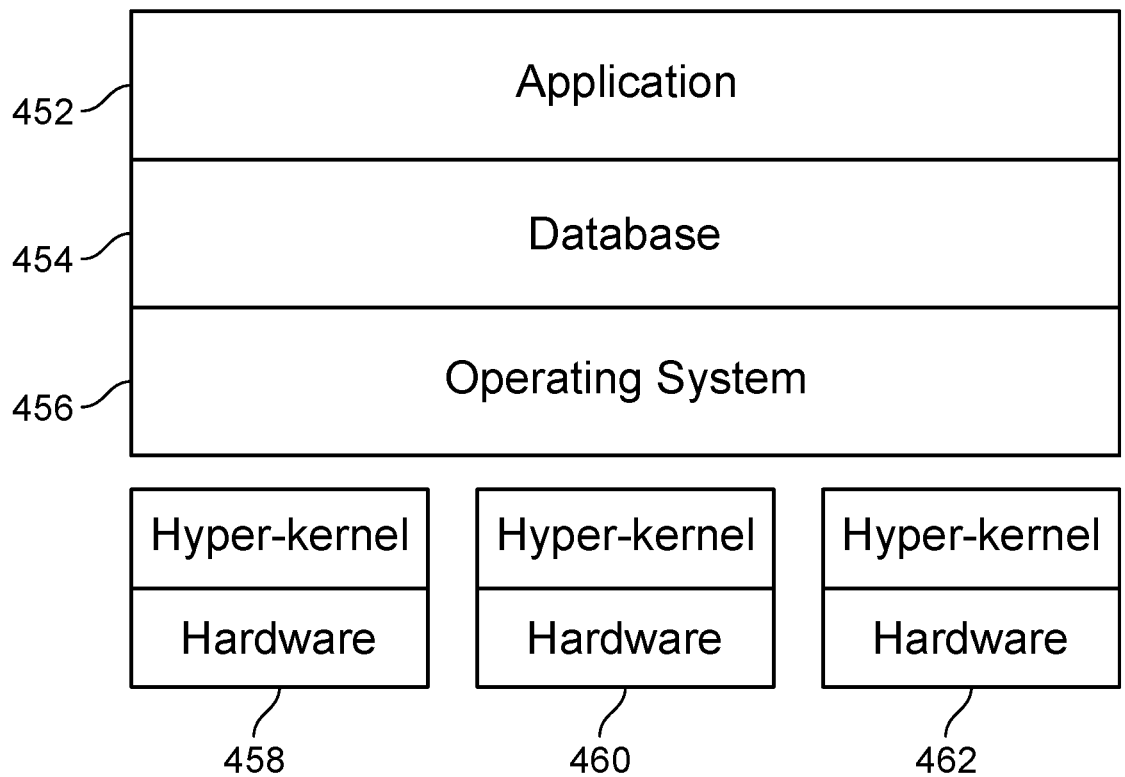
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
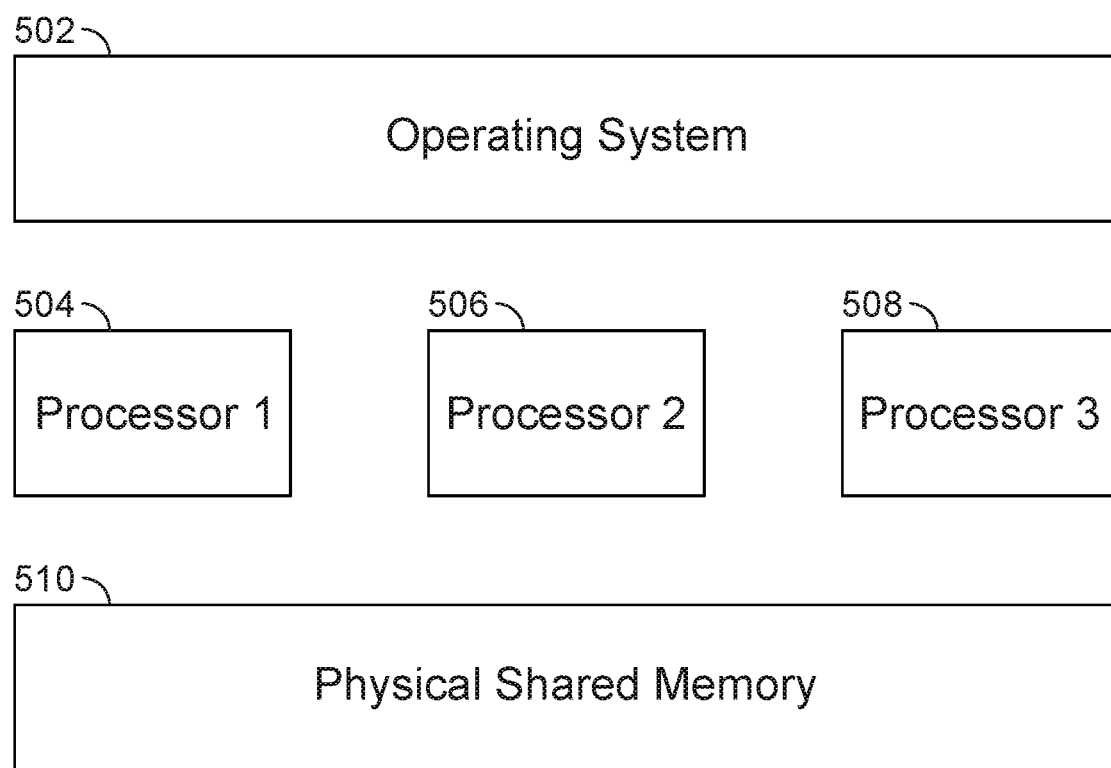
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
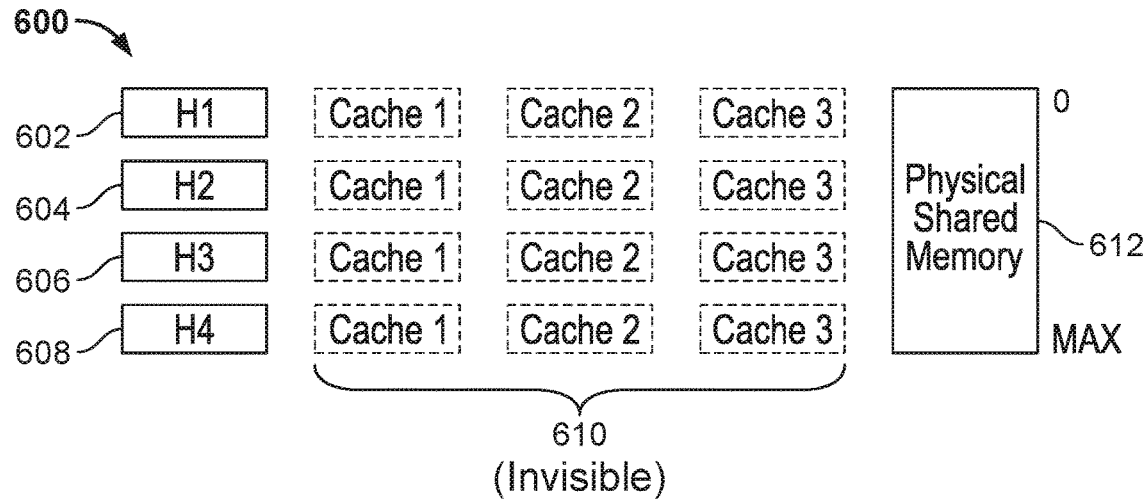
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
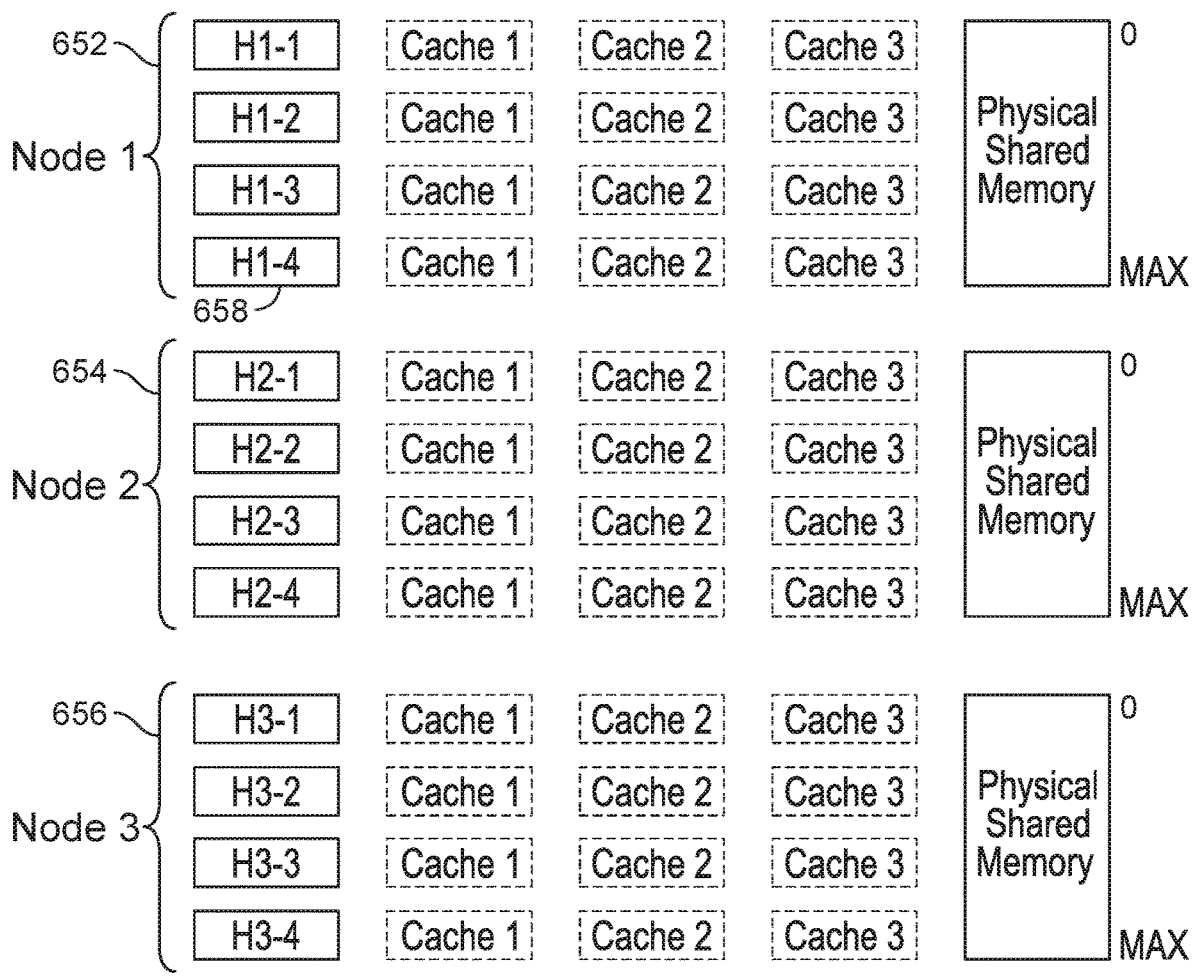
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
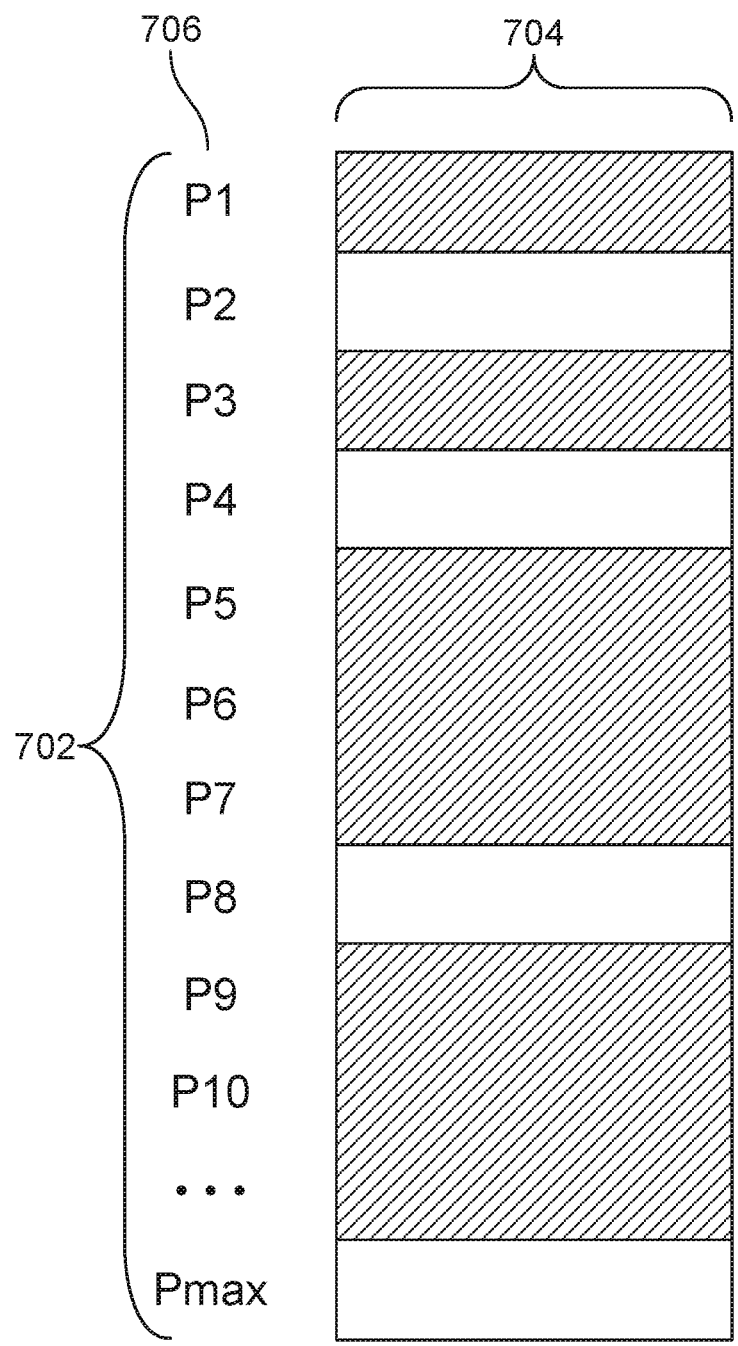
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, a "shadow processor" is an anonymous virtual processor, i.e., one that had been a virtual processor but has now given up its operating system context and has context known only to the hyper-kernel.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).

Has a set of performance indicators that guide a scheduler object with information about how to intelligently assign continuations to leaf nodes for execution.

Has a virtual-processor identifier that indicates the processor the operating system thinks is the physical processor to which this continuation is assigned.

Has an event on which this continuation is waiting (possibly empty).

Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources can be migrated between physical locations. As explained above, the operating system is provided with information about the virtualized system, but that information need not agree with the physical system.

In the following example, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated and the corresponding resource maps would be updated. A continuation would be built poised to be placed in a local table in shared memory called the event table (discussed below) so that the next thing the continuation does when it is resumed would be to return control to the operating system after the transfer is completed. A decision could also be made to move the virtual processor to the node that contains the memory being requested or to move the virtualized memory (and its virtualized memory address) from one node to another. In various embodiments, the hyper-kernel makes three decisions when handling an event: which (virtual) resources should move, when to move them, and to where (in terms of physical locations) they should move.

Tidaltree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each Scheduler Object s:

Is associated with a physical component (e.g., rack, blade, socket, core, hyperthread).

Except for the root of the tree, has a parent scheduler object which is partly responsible for directing its operations (as explained in more detail below).

Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).

Has a work queue, which is a set of continuations (as described earlier).

Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled continuation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below. Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will be generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

Pseudo code for an example on-stall routine is provided below in the "EXAMPLE ROUTINES" section. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:

1. Position in the queue
2. The relationship between p and the last location recorded in the continuation (the closer those locations are the better it may be for reusing cache entries).
3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$cost = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:
Length of time since the last processor evacuated this scheduler object.
Height of the scheduler object in the TidalTree.
Length of the work queue.
Reservation status (i.e., it may be the case that some application has reserved this resource for a specific reason).
Node specification (i.e., the node itself might have been taken out of service, or is problematic, has in some way a specialized function, etc.).
Age of the continuation in the queue.
Last physical processor to run this continuation.
Last virtual processor to run this continuation.
Node on which this continuation was last executing.
The "temperature" of the cache. (A cache is "warm" when it has entries that are likely to be reused. A cache is "cold" when it is unlikely to have reusable cache entries.)
Group membership of the continuation (i.e., the continuation may be part of a computation group, each element of which has some affinity for other members of the group).
Performance Indicators (Hints) and special requirements.

EXAMPLES

"OnStall" and "assignProcessor"

Figure 8:
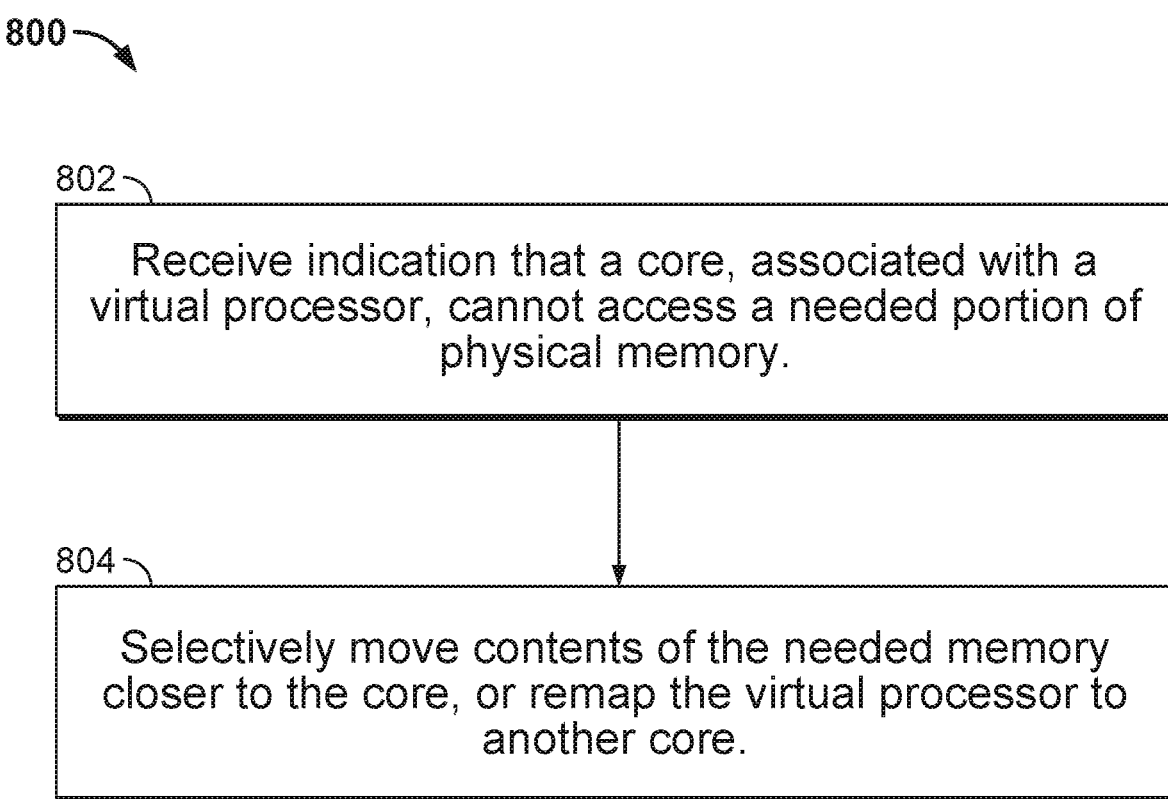
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
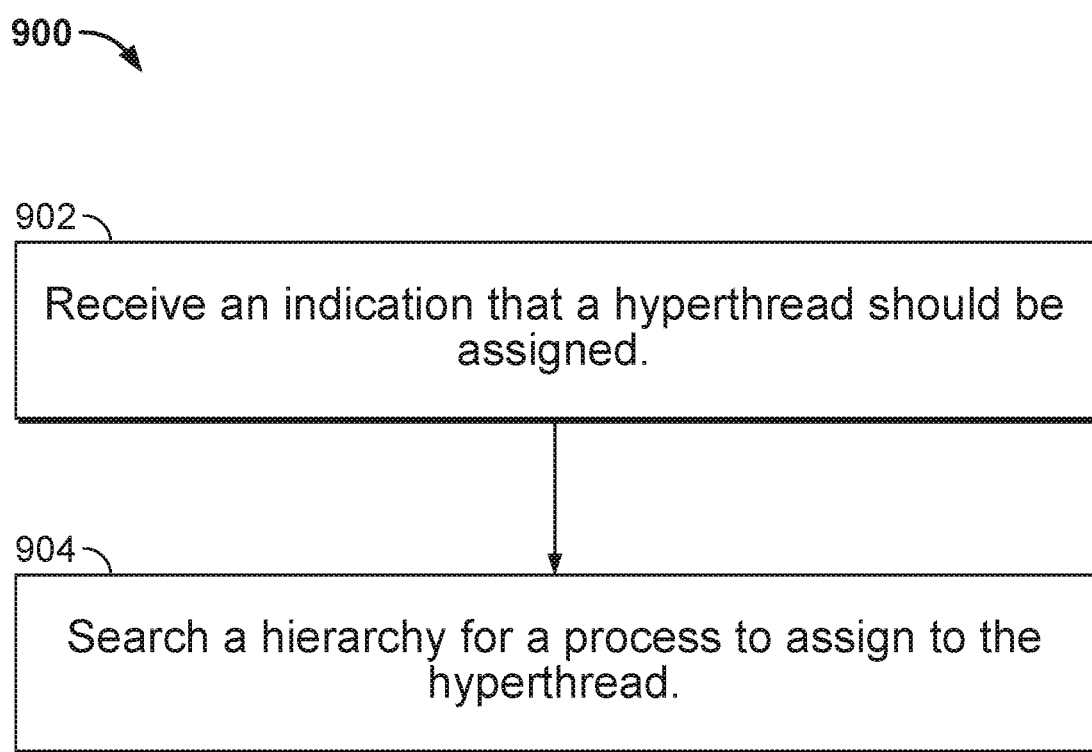
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Time Sequence

For expository purposes, in the example, a "swapping" operation is used to transfer continuations and memory, but in fact that's not necessary in all embodiments.

FIG. 10 illustrates an example of an initial memory assignment and processor assignment. Specifically, region 1002 of FIG. 10 depicts a hyper-kernel's mapping between physical blocks of memory (on the left hand side) and the current owner of the memory (the center column). The right column shows the previous owner of the memory. As this is the initial memory assignment, the current and last owner columns hold the same values. Region 1004 of FIG. 10 depicts a hyper-kernel's mapping between system virtual processors (on the left hand side) and the physical nodes (center column)/core numbers (right column).

Suppose virtual processor P00 makes a memory request to read location 8FFFF and that the hyper-kernel decides to move one or more memory blocks containing 8FFFF to the same node as P00 (i.e., node 0). Block 8FFFF is located on node 2. Accordingly, the blocks containing 8FFFF are transferred to node 0, and another block is swapped out (if evacuation is required and the block is valid), as shown in FIG. 11.

Figure 12:
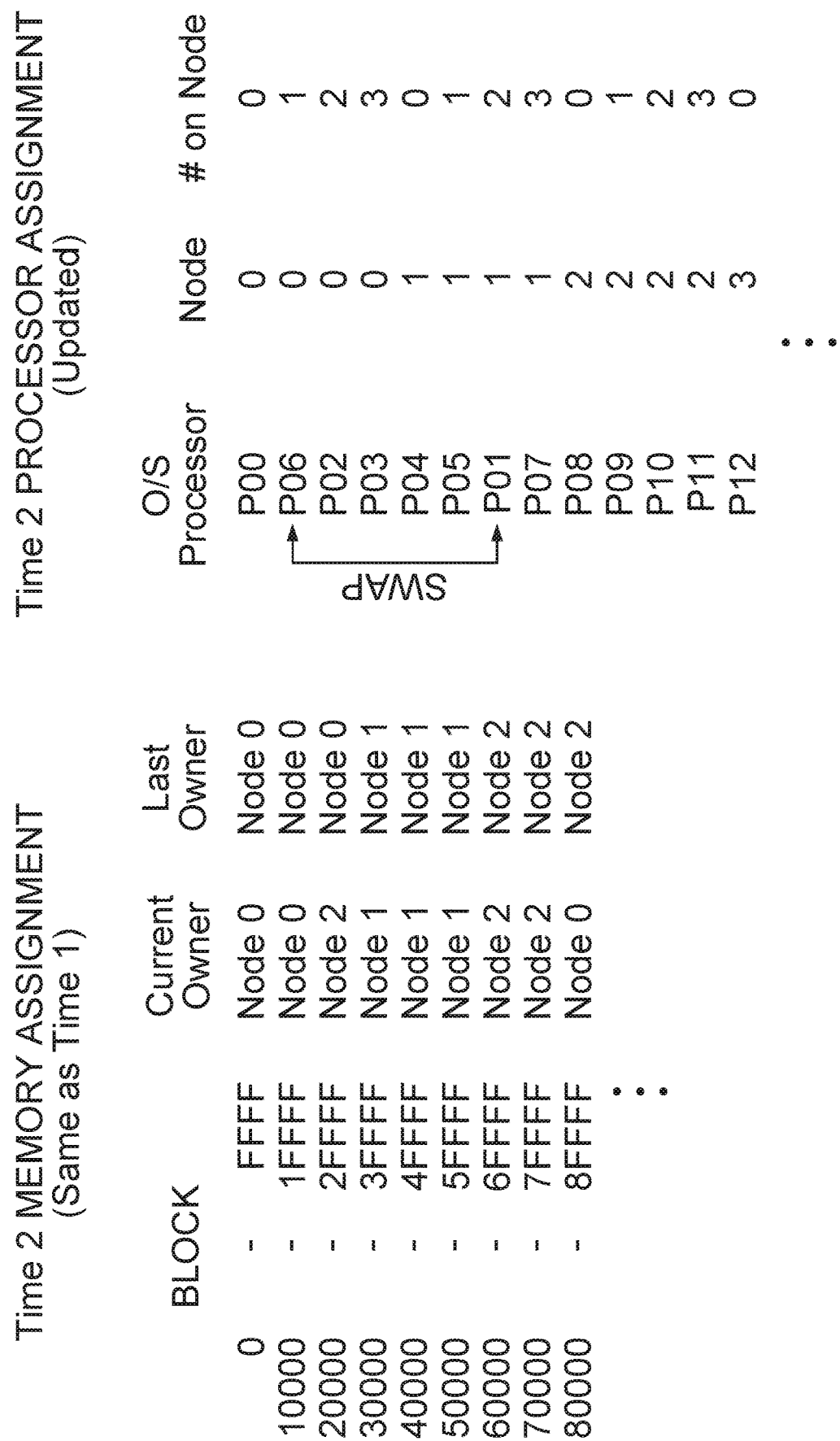
FIG. 12 illustrates a memory assignment and an updated view of the processor assignment.

Next, suppose virtual processor P06 makes a memory request to read location 81FFF. The contents of this block have been moved (as shown in FIG. 11) to node 0. The hyper-kernel may determine that, rather than moving the memory again, the computation should be moved. Accordingly, virtual processor P06 is moved to node 0, and may be swapped with virtual processor P01, as shown in FIG. 12.

Performance Information

Locks and Other Synchronizers

In various embodiments, the use of synchronization mechanisms like locks is minimal. Locks are used, for example, to insert queue and remove queue continuations on scheduler objects and to maintain the event table.

Code Path Lengths

In some embodiments, the (maximum) length of all code paths is determined through a static code analysis, resulting in estimable and bounded amounts of time spent in the hyper-kernel itself. All data structures can be pre-allocated, for example, as indexed arrays. The nodes of the TidalTree are determined at boot time and are invariant, as are the number of steps in their traversal. One variable length computation has to do with the length of the work queues, but even that can be bounded, and a worst-case estimate computed. In other embodiments, other variable length computations are used.

Static Storage

In various embodiments, all data structures needed in the hyper-kernel are static, and determined at boot time, so there is no need for dynamic memory allocation or garbage collection.

Physical Memory

All memory used by the hyper-kernel is physical memory, so no page tables or virtual memory is required for its internal operations (except, e.g., to manage the virtual resources it is managing), further helping the hyper-kernel to co-exist with an operating system.

Sharing Data and Maintaining Consistency

In some cases, e.g., to preserve the conceptual integrity of the virtual machine being presented to the operating system, changes in one node's data structures are coordinated with corresponding ones in a different node. Many of the data structures described herein are "node local," and either will not need to move, or are constant and replicated. The data structures that are node local are visible to and addressable by all hyperthreads on the node. Examples of data structures that are not node local (and thus require coordination) include the current resource map (or portions thereof), the root of the TidalTree, and migratory continuations (i.e., continuations that might have to logically move from one node to another).

A variety of techniques can be used to maintain a sufficient degree of consistency. Some are synchronous and assume all changes are visible at the same time to all nodes (i.e., "immediate consistency"). Others allow a more relaxed solution and strive for "eventual consistency." As mentioned above, physical nodes of an enterprise supercomputer are connected via one or more high speed interconnects. Multiple instances of hyper-kernels are interconnected to pass messages and resources back and forth between physical nodes.

Updating the Current Resource Map

Each physical node n starts off (e.g., at boot time) with the same copy of the physical resource map, the initial virtual resource map, and the current resource map. Each node maintains its own copy of the current resource map.

In some embodiments, each entry for resource r in the current resource map has the following:

1. A local lock, so that multiple hyperthreads on a physical-node cannot modify r at the same time.

2. A node number specifying the node that currently owns the resource.

3. A count k of the number of times n has requested r since the last time it owned r.

4. A boolean which when set signifies that this node n wants r.

5. A boolean which when set signifies that this node has r but is in the process of transferring it, in which case the node number specifies the new owner.

In some embodiments, the count k is used to deal with unbounded chasing of resources. If k exceeds a threshold, a determination is made that it is better to move the newly built continuation rather than chasing the resource around the system.

The following is an example of a mechanism for initiating migration of resources and receiving resources. Key transactions include the following:

1. Node n sends a request for resource r to n'.

2. Node n' receives a request for resource r from n.

3. Node n' may send a "deny" message to n under certain circumstances, otherwise it can "accept" and will send the resource r.

4. Node n will receive a "deny" message from n' if the resource r cannot be sent by n' at this point in time. It may be that r is needed by n', or it may be that r is being transferred somewhere else at the arrival of the request. If the request is denied, it can send a "forwarding" address of the node to which it's transferring the resource. It may be that the forwarding address is n' itself, which is the equivalent of "try again later." When node n receives the deny message, it can resend the request to the node suggested by n', often the new owner of the resource. To avoid n chasing the resource around the system, it can keep track of the number of attempts to get the resource, and switches strategy if the number of attempts exceeds a threshold.

5. Node n will receive the resource r if n' can send the resource. In this case, n needs to schedule the continuation c that was awaiting r, so that c can be resumed.

TidalTree Root

In some embodiments, one physical node of the set of nodes in the system is designated as a "master node." This node has the responsibility at boot time for building the initial virtual resource map and other data structures, replicating them to the other nodes, and booting the operating system (e.g., Linux). The master node can be just like any other node after the system is booted up, with one exception. At least one physical node needs to store the root of the TidalTree. The master node is one example of a place where the root can be placed. Updates to the event queue of the TidalTree root scheduling object are handled in each node by sending a message to the master node to perform the update.

Over time, the hyper-kernel will adapt and locality will continually improve if resource access patterns of the operating system and the application permit.

Continuations

As explained above, physical memory addresses across all nodes are not unique. In some embodiments, the inclusion of physical memory addresses in continuations can be avoided by using partitioned integer indices to designate important data structures in the hyper-kernel. In the event an addresses needs to be put into a continuation, care is taken in the move, since the address is a physical address of the source, and bears no relationship with the physical address in the destination. Moving a continuation means copying its contents to the destination node as discussed above, and remapping any physical addresses from the source to the target.

Timestamps

In some embodiments, access to a free-running counter is visible to all of the nodes. In the absence of this, free-running counters on each node can also be used. Counters in continuations are mapped between the source and destination.

Handling of Disks and Persistent Flash

Where a needed resource is on disk (or persistent flash), in some embodiments, such resources are treated as having a heavier gravitational field than a resource such as RAM. Accordingly, disk/flash resources will tend to not migrate very often. Instead, continuations will more frequently migrate to the physical nodes containing the required persistent storage, or to buffers associated with persistent storage, on a demand basis.

Operating System Configuration

There are many ways to configure an operating system. For servers, an assumption can be made that its operating system is configured to only require a small set of resource types from the virtual machine implemented by the hyper-kernel: storage that includes linear block arrays, networks, processors, memory, and internode interconnects. As a result, the complexity of the operating system installation can be reduced.

Example Data Structures and Functions

The following section provides a list of examples of data structures and functions used in various embodiments.

init-continuation: Initializes a continuation when a computation is stalled.

assignProcessor: Routine that assigns a new continuation to a shadow processor (if possible).

on-stall(r): Stalling event occurs for resource r.

migrate-computation(computational-state, r, n): Message to request migration of a computational state to another node n which you hope has resource r.

on-interrupt(i): Software interrupt i occurs.

handle-event(e): Routine executed when the hyper-kernel is called on to handle an asynchronous event.

request-resource(r, n): Request transfer of resource r from node n.

initiate-send-resource(r, n): Start sending resource r to node n.

on-request-transfer-response(r, n, b): The requested transfer of r from n was accepted or rejected. b is true if rejected.

on-transfer-requested (r, m): Receive a request from m for resource r.

on-resource-transferred(r, n): Ack of resource r has been received from n.

on-receive-resource (r, n): Resource r has been received from n.

migration-continuation(r): True if and only if it is better to migrate a continuation than move a resource.

parent(s): Returns the parent scheduler-object of scheduler object s.

cost(s,c): Used to evaluate placement of continuation c in the wait-queue of scheduler-object s.

find-best-within(s): A cost function that returns a continuation stored in the wait-queue of scheduler-object s.

conserve-energy: Enter low power mode.

resume-continuation(c): Resume the computation represented by c in the processor executing this function at the point.

valid(i): Boolean function that returns true if and only if interrupt i is still valid.

initialize(best-guess): Initializes cost variable best-guess.

insert-queue(s,c): Insert continuation c into the wait-queue of scheduler-object s.

return-from-virtual-interrupt: Resume execution that was temporarily paused due to the interrupt.

r.owner: Returns the node where resource r is local.

r.e: Resource r is awaiting this event.

e.r: This event is for resource r.

e.continuation: When this event occurs, need to resume continuation.

get-state( ): Returns processor's state.

scheduler-object(p): Returns scheduler-object currently associated with processor p.

on-request-transfer-response(r, m, response): Response to request of transferring resource r from node m. Response can be either true if "rejected" or false if "accepted."

Example Routines

The following are pseudo-code examples of routines used in various embodiments. In the following, functions that start with "on-" are asynchronous events or messages coming in.

```
==========================
init-continuation(computational-state)
==========================
/* InitContinuation by processor p awaiting resource r with hints h */
c = allocate continuation
c.state = computational-state
c.last = scheduler-object(p)
c.state = waiting-for-event
c.hints = h
e = allocate event in event-table
e.resource = r
e.continuation = c
return c
end InitContinuation
==========================
assignProcessor
==========================
/* Once processor p in physical node n becomes a shadow
processor, it gives up its O/S identity and starts looking for
a continuation with which to resume execution. p will look for
such a continuation in wait-queues as follows: */
    s = scheduler-object (p)
    initialize (best-guess)
    best-s = nil
    /* traverse upwards, keeping track of best candidate */
    /* assume there is a locally cached copy of the root */
    repeat
        guess = cost (s)
        if guess > best-guess
        then
            best-guess = guess
            best-s = s
        s = parent (s)
    until s = nil
    if best-s <> nil
    then
        c = find-best-within (best-s)
        resume-continuation (c)
    else conserve-energy
end assignProcessor
==========================
on-stall(r)
==========================
/* OnStall is invoked when the hardware detects an inconsistency
between the virtual and physical configurations. More specifically,
node n requests resource r which the hardware cannot find on node n. */
    if migration-continuation (r)
    then
        /* send the computation to node n */
        nn = owner(r)
        /* node n believes resource is probably at node nn */
        migrate-computation (r,nn)
    else
        /* request the resource r */
        c = init-continuation(get-state( ))
        /* insert code here to insert c into the local event-table */
        request-resource(r, owner(r))
        assignProcessor           /* At this point, p is an anonymous
                                     shadow processor */
                                  /* p needs to find some work to do */
    end OnStall
==========================
on-migrate-computation(computational-state, r,n)
==========================
    /* the remote node gets the message from n to receive a
       continuation.
Note: c in this case is the contents of the continuation, not the
continuation itself. */
    c = InitContinuation /* with the information in the request */
    c.state = computational-state
    e = insert c into the local event-table
    handle-event (e)
    end on-migrate-computation
==========================
on-interrupt(i)
==========================
/*When a processor p (in subtree of physical node n) is interrupted
by i (using a very low level mechanism specific to the particular
hardware design), p does the following: */
```

```
while valid (i)
    e = event-table (i)              /* find the event
                                        corresponding to i */
    handle-event (e)
    i = next-queued-interrupt
end while
/* resume prior execution */
return-from-virtual-interrupt
end on-interrupt
==========================
handle-event(e)
==========================
/* An event occurred. Move it from the event table to the best
scheduler-object. */
c = e.continuation               /* find the continuation
                                    for event e */
event-table (i).clear = true     /* remove the event from
                                    the table */
e.complete = true                /* mark e as completed */
c.state = ready
/* now find out the best place to put c */
s = c.last
initialize (best-guess)
/* look for best choice */
/* assume there is a locally cached copy of the root */
repeat
    guess = cost (s,c)
    if guess > best-guess
    then
        best-guess = guess
        best-s = s
    s = parent (s)
until s = nil
insert-queue (best-s,c)/* queue up c in the wait-queue of best-s */
end handle-event
==========================
request-resource (r,n)
==========================
/* When a node n needs a resource r owned by node n' the
resource is requested, but the request may not be satisfied
because someone else might have beaten you to request it or n'
is currently using it. */
    current-resource-map(r).wanted = true
    request-transfer(owner(r),r)     /* send a request to
                                        the owner of r */
                                     /* requesting r's
                                        transfer */
return
==========================
on-request-transfer-response (r, m, is-rejected)
==========================
/* Now, consider that you are a node getting a response from a
previous request to a node for a resource r. When the response to
this request comes in, it can be accepted or rejected. */
if is-rejected
then /* resource has been transferred to m */
    increment k
    if k > threshold
        then
                                 /* you don't want to go chasing around
                                    forever*/
                                 /* trying to get the resource. Give up */
                                 migrate-computation(r,m)
                                 return
        else
                                 request-transfer(r,m) /* try again */
                                 return
    else
        /* request was not rejected and r is the resource */
        r.k = 0
        r.wanted = false         /* resource has
                                    been moved */
        r.owner = me             /* set the owner to n
                                    (i.e., "me") */
        if the resource is memory,
                update the hardware memory map with the
                new memory
        return
==========================
on-transfer-requested (r,n)
==========================
/* When a resource request for r comes from node n, if transfer
in progress to owner(r), deny the request */
    if r.being-transferred
    then
        send-request-response (r, owner(r), true)
    else
        /* transfer of resource is accepted */
        r.transferring = true
        initiate-send-resource(r)
        if type(r) = memory
            then update local memory map
        send-request-response (r, owner(r), false)
    return
==========================
on-resource-transferred (r,n)
==========================
/* When an acknowledgement comes in that the transfer
is complete */
    r.owner = n
    r.transferring = false
    return
==========================
on-receive-resource(r,n)
==========================
/* Now we receive a message with the requested resource r from n*/
    r.k = 0
    r.wanted = false/* clear the bit saying that it's wanted */
    r.owner = me /* set the owner to n (i.e., "me") */
    if the resource is memory,
        update the memory map with the new memory
    send-resource-transferred(r,n)
    handle-event(r.e)            /* the event we've been waiting for has
                                    occurred */
    return
```

Associating Working Sets and Threads

In the above, various embodiments were described in which it is shown how to create, manage, and optimize an instance of a virtual server (or computer) which is distributed over a tightly interconnected set of physical servers (or computers).

In order to make such a system run efficiently, sets of guest physical processors (vcpus) are associated with sets of virtual pages of memory (guest physical pages of memory which the guest operating system believes to be physical pages), so that they may be co-located across a set of computers (e.g., nodes in a cluster). When co-located, virtualization hardware in microprocessors may be used to achieve a performance level consistent with hardware-based non-virtualized servers.

The pattern of page accesses by vcpus to sets of guest physical memory pages is defined by a combination of the application programs, operating system, networks, real time events, I/O devices, etc., and does not change if a true virtualized server is built.

Modern operating systems such as Linux, FreeBSD, Windows, and Mac OS provide a set of features to implement asynchronous control structures referred to as "threads." Threads are software structures and mechanisms in an operating system or a run-time library (or both) that allow for asynchronous and parallel program behavior, often including responses to asynchronous interrupts. Threads allow sub-programs to run different streams of instructions with different patterns of data access at different times. In the examples described herein, threads may be bound to a set of virtual processors under control of a scheduler running in a guest operating system. At any given point in time, a thread (e.g., guest thread associated with an application running on the guest operating system) is running on a vcpu or not running at all. At a later time, the scheduler may decide to run the thread on a different physical processor.

As described above, vcpus in a virtualized environment may be bound to true (also called "host") physical processors throughout the implementation of the virtual machine and the virtual machine's scheduler (which may be different from the guest operating system scheduler).

Modern operating systems may often provide information to the hardware or the virtualization system about which thread is running in which vcpu at any given point in time.

An assumption is made by an operating system that it has direct and fast access to all resources (e.g., memory, I/O, networks, etc.) of the system. In a single virtual machine spanning a set of nodes built using the techniques described herein, this assumption is semantically preserved, but the physical realization may not be true. For example, there may be virtual processors (or threads) accessing non-local resources, where this non-local access is neither direct nor fast access. As described above, when the virtualization system observes an event from the guest that is not physically realizable, a stall is generated. The virtualization system operates to correct or otherwise address the situation that caused the stall to bring it in line with the semantic behavior expected by the guest (operating system). The performance of the virtualized system is governed by the base performance of the guest operating system, but may be degraded by the number of stalls, and the total time taken to make the stall semantically accurate. Using the techniques described below, the number of stalls as well as the average time per stall may be reduced in a virtualization system.

In the above were described example techniques for tracking usage patterns of virtual processors and sets of virtual pages, as well as making decisions about migrating virtual processors and virtual pages through a distributed virtual environment. The above described techniques may be refined and extended, or otherwise adapted, to track the pattern of access of sets of threads accessing sets of pages of memory.

The tracking of threads and associated sets of pages of memory may be based on an observation that the pattern of access of virtual processors and sets of memory pages is in actuality determined by a guest thread running in a virtual processor under the control of a guest operating system scheduler. Guest threads may run in different virtual processors, and hence host physical processors, at different times. Vcpus, and hence host physical processors, may run the same guest thread at different points in time.

The binding of threads to host physical processors depends on a variety of factors, which may include the programmed behavior of the guest scheduler, computations performed by the thread, a pattern of external asynchronous events (such as the arrival of a network packet), completion of an I/O interrupt, etc. These events, and therefore the pattern of event arrival and the binding of the guest thread to a guest physical processor, may not be predictable in advance. Thus the behavior of the system may be non-deterministic, even if the program running is deterministic.

It may not be known a priori which thread is running in which vcpu by inspection of the thread, since this is under the control of the guest operating system or a guest runtime library. However, as will be described in further detail below, operating systems provide various mechanisms (or hints) to determine which thread is running in each virtual processor at any given point in time. Such information may be used in base scheduling and migration decisions for virtual processors (vcpus). As will be described in further detail below, using the techniques described herein, virtual processors (running guest threads) may be kept together along with the appropriate set of pages of virtual memory (guest physical memory) on the same node, as much as possible. By doing so, stalls due to non-local access may be reduced, and a performance level comparable to a real physical computer may be achieved. Further, the overhead (e.g., the product of the number of stalls and the average time per stall) may be reduced. This may be achieved by intelligently placing pages and threads where they will most likely not stall. The number of page transfers and page migrations may also be minimized.

A page may be resident on a node because the page needed to be read. The page may also be on a node because the page needed to be written. In some embodiments, multiple nodes may have local copies of a page as long as the nodes are all reading the page. When a page needs to be written into, invalidation is performed of all copies of the page on nodes other than the node doing the update/write. In some embodiments, when the update is complete, other nodes may then ask for/request copies of the page when the page again needs to be read.

Techniques for managing the relationship between threads and sets of referenced pages will be described in further detail below. Using the techniques described herein, given a page p, which threads have a strong need for p are determined. Further, given a thread t, which pages are strongly needed by t are determined. As one example, when a thread is running in a vcpu, if the thread stalls because it is referencing a page that is not resident on a node on which the thread is running, stalling is performed until the page arrives. The stall is an indication that this thread needs this page. Such information is kept track of, and may be managed, for example, by counting the frequency of times a given thread stalls to acquire access to the page, no matter on which node the thread is running. The pages determined to be needed by a thread are included in a working set of pages that are associated with the thread. Threads may be kept track of or identified on a thread-level basis, as operating systems may provide mechanisms or hints to determine which thread is running each virtual processor at any given time.

Figure 13A:
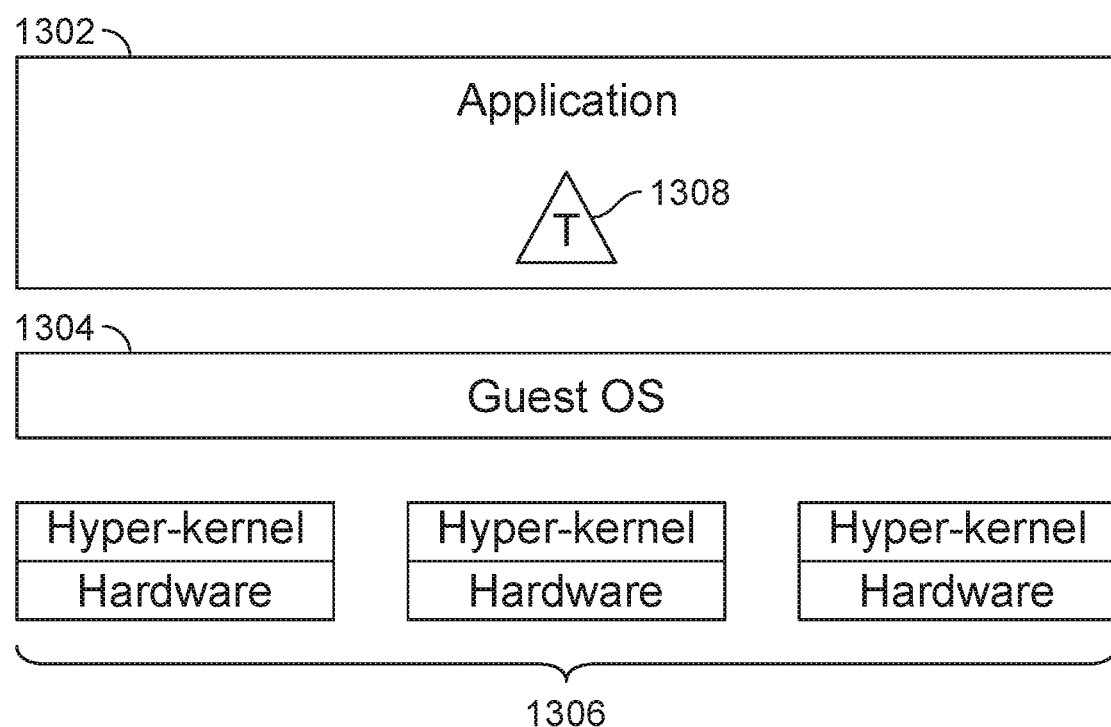
FIG. 13A is an example embodiment of an environment in which threads and working sets are associated.

FIG. 13A is an example embodiment of an environment in which threads and working sets are associated. Using the techniques described below, the pages that are of most interest to a given guest thread may be determined. For each guest physical page in the virtualized system, the threads that are most interested in a given page may also be determined. While the example embodiments described below involve Intel virtualization hardware (e.g., Intel VT-x), the techniques described herein may be variously adapted to accommodate any type of virtualization hardware (e.g., AMD AMD-V).

In the example of FIG. 13A, a guest application 1302 is running on top of a guest operating system 1304, which is in turn running collectively across a series of individual physical nodes 1306 that form an enterprise supercomputer (e.g., system 100). More specifically, the guest operating system is running on a virtual environment that is defined by a collection of hyper-kernels, as described in conjunction with FIG. 4B.

As described above in conjunction with FIG. 7, from the guest operating system's view, the guest operating system sees a plurality of "virtualized processors" (also referred to herein as "virtual processors" or "vcpus"), which correspond to the total number of hyperthreads across all nodes included in the enterprise supercomputer. The operating system also sees "virtualized physical memory" (also referred to herein as "guest physical memory") that appears to be a large, physical, linear memory of a size equal to the total amount of physical memory across all nodes. In such a virtual configuration, all memory addresses from the guest's perspective (also referred to herein as "guest physical addresses" of "gpas") are (globally) unique and represent the sum total of all memory contained in the nodes forming the enterprise supercomputer. The gpas are unique across the entire cluster (regardless of node), where the guest physical address space is a large and flat address space that is defined by the guest operating system (guest OS).

In the example of FIG. 13A, guest application 1302 is associated with a virtual address space. For example, when the guest operating system 1304 launches the guest application 1302, the guest OS creates a virtual address space (e.g., sets up the page tables) for that application. Each time a guest application is executed, new page tables are created. The guest application 1302 also has a set of threads. In this example, guest application 1302 is single-threaded and has a single thread 1308 (also referred to herein as a "guest thread"). Other applications may have multiple threads (i.e., the application may be multi-threaded). In this example, the guest thread is running on a vcpu. The vcpu is in turn run or executed on a physical processor (also referred to herein as a "pcpu") on a physical node, such as a hyperthread in the physical configuration of the enterprise supercomputer. Guest threads (as with vcpus) are globally unique across the cluster.

As guest application 1302 is running, the guest thread makes references to the virtual pages in the application's virtual address space. In order to obtain the physical page of memory referenced by the guest application (and needed by the guest thread to continue its computation), two levels of dynamic address translation are performed in the virtualized environment. The two levels of dynamic translation are automatically performed by turning on virtualization for those processors that support virtualization (i.e., if virtualization is turned on, then every time an address is referenced, two-step address translation is performed—if a virtualization system is not being run, then the second level of address translation would not be performed).

Figure 13B:
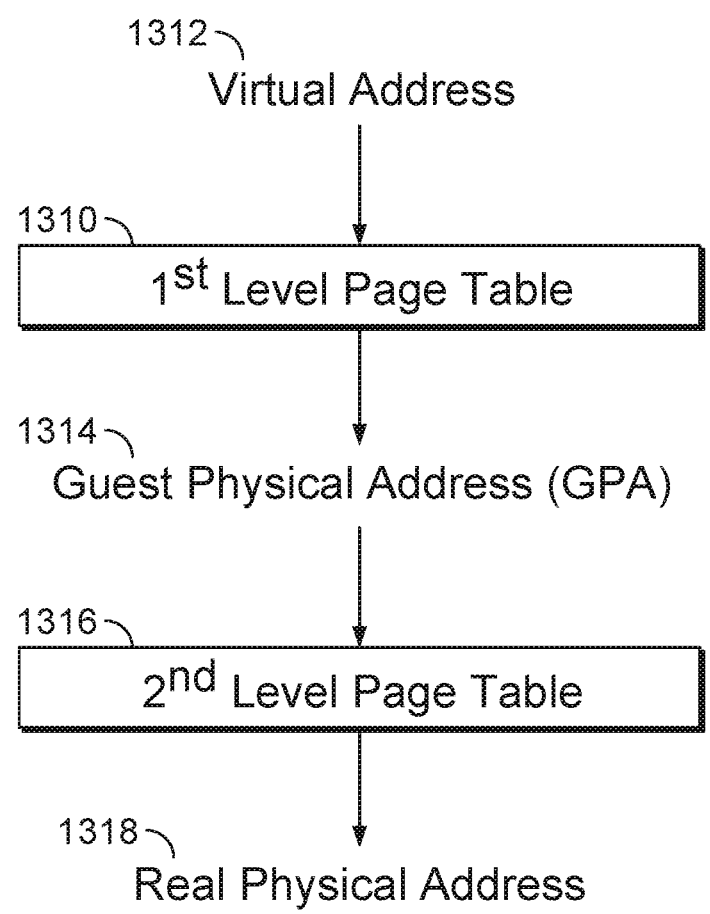
FIG. 13B illustrates an example of dynamic address translation in a virtualized environment.

FIG. 13B illustrates an example of dynamic address translation in a virtualized environment. In this example, at the application level, a first level of page address translation is performed by the internal vcpu state using a first level page table 1310 (managed by the guest operating system), which converts a virtual memory address (for a page of memory) 1312 into a guest physical address 1314. In some embodiments, the first level page table is a block of memory with various entries, where the first level page table is written by the guest operating system and read by the hardware. Different applications would operate in two different virtual address spaces (and at the guest level, each application would have its own first level page tables mapping each of its respective virtual address spaces to the guest physical memory/address space). For example, the virtual memory address is used as an index into the first level page table to obtain a corresponding guest physical address. Thus, the virtual address has been converted to what the guest operating system believes to be a "physical address" (but is in actuality a guest physical address from the perspective of the hyper-kernel).

The guest physical address (or block of gpa, which may, for example, be a 64 bit value) returned in response to the lookup of the first level page table is then used by the virtualization hardware of the physical processor as an index to a second level page table 1316 to obtain a corresponding physical page of memory (e.g., 4K physical memory address). The second level translation tables may be set up in the hardware to map guest physical addresses to "real" physical addresses 1318 (the actual physical pages of memory resident on the nodes of the cluster). While each application running on the guest OS has its own first level page tables, the second level page tables operate out of the same pool of memory of what the guest operating system believes to be physical memory.

The second level page tables are specific to each node, where each node in the enterprise supercomputer is associated with a corresponding second level page table. While each node is associated with its own corresponding second level page table, all of the page tables may be indexed in the same manner using guest physical addresses, which, as described above, are globally unique across the entire supercomputer cluster. If a page of memory corresponding to the guest physical address is resident on a node, then there will be a corresponding entry in the node's second level page table.

Figure 13C:
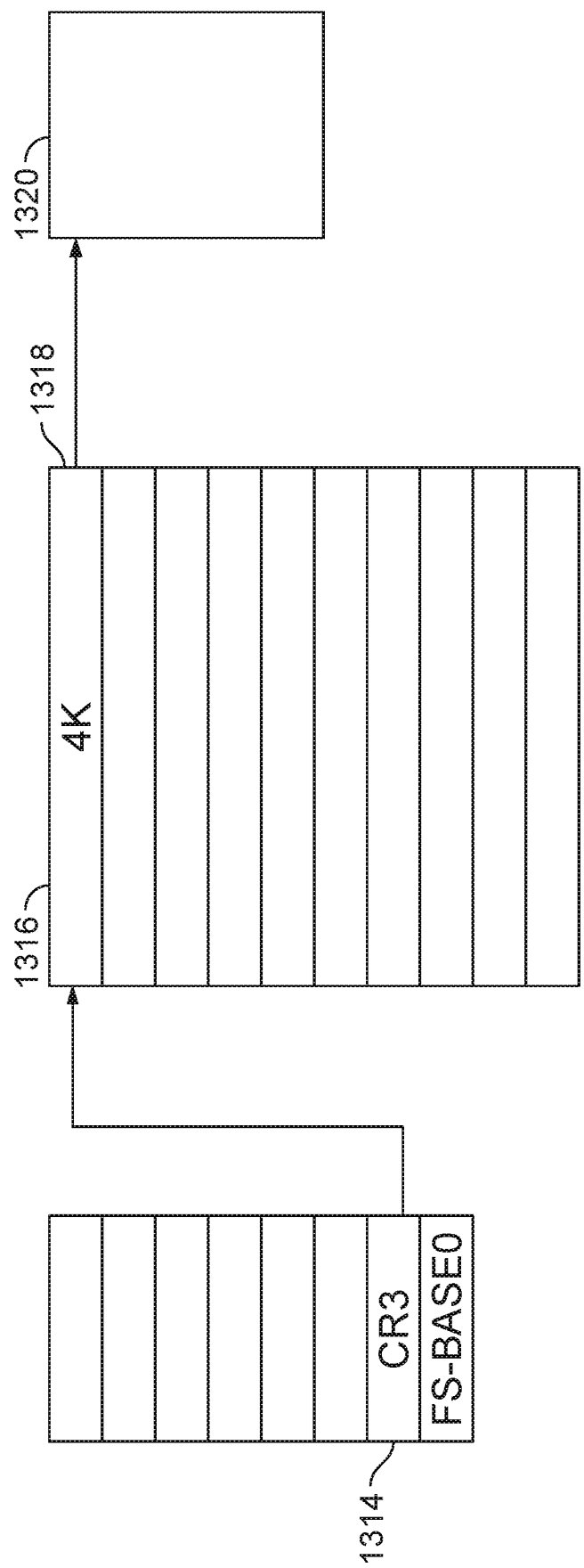
FIG. 13C illustrates an example embodiment of performing a second level address translation.

FIG. 13C illustrates an example embodiment of performing a second level address translation. In this example, a guest physical address (1314) stored in the CR3 register of the vcpu state (described in further detail below) is used to index the second level page table 1316 to obtain a corresponding 4K physical memory address 1318, which points to a real page of physical memory 1320 on the node on which the pcpu that has assumed the identity of the vcpu resides. In this example, because the requested page is local to the node, there is a valid entry in the second level page table corresponding to the guest physical address, and the page of real physical memory may then be obtained and used by the guest thread.

If the page of memory corresponding to the guest physical address is not local to the node, then the node's second level page table will not include an entry for the guest physical address (where, for example, the entry is zeroed out or has been invalidated). Thus, it may be determined that the real physical page corresponding to a referenced guest physical address is not locally available on the node. Either the page was at the node at some point in time and was migrated to another node by the hyper-kernel (in which case the location of the page is tracked), or the page was never seen on the node at all (e.g., the virtualized system may be newly booted). In the case of a page having been migrated away from the node, then the entry in the second level page table would have been zeroed out or invalidated so that the processor does not look up the physical page on that node (since it has been moved elsewhere).

As described above, when a stalling event occurs due to a page of memory not being accessible, the needed page may be migrated to the node where the memory is needed, or the vcpu may be migrated. When a page is moved, its contents are moved, which includes allocating a physical page at the destination node, and copying the contents of the page to the new node. The second level page table on the destination was also updated so that the entry corresponding to the gpa is filled with the newly migrated physical page. Thus, the next time the page is referenced, a fault is not generated. If the vcpu is migrated, then it is reconstituted on the node that has the page of referenced memory. Because the guest physical addresses are globally unique across the virtualized system, when the migrated processor accesses its new node's second level page table, a valid entry will be found corresponding to the referenced gpa (i.e., the indexes into all second level page tables on the nodes are the same or constant since they are indexed by globally unique gpas).

Thus, by performing the two levels of address translation, the virtual address referenced by a guest thread is translated into a guest physical address, which is in turn translated into a real physical address (if the referenced page of memory is on the same node as the pcpu that is running the vcpu that is in turn running the guest thread that accessed the page of memory). If the requested real page is on the node, then it will be in the second level page table, and a stall will not occur. The actual page of memory is accessed, and the guest thread may continue its processing.

Suppose, however, that the real physical page of memory corresponding to the guest physical address needed by the guest thread is not local to the node on which the guest thread is currently running, where the entry corresponding to the guest physical address is not present in the second level page table or is invalid or zeroed out.

In this example, a machine fault is generated—i.e., a stalling event occurs. At the time of the stall, the vcpu running the guest thread was in turn executing in a pcpu. The pcpu will thus stall. This results in the generation of an interrupt. This interrupt goes through an interrupt vector that points to the hyper-kernel. The interrupt is captured by the hyper-kernel, which executes a set of routines. In this example, execution of the routines causes the state of the pcpu to be saved. As one example, when the stall occurs, an instruction is executed that obtains a block of the physical processor state. The state of the physical processor state corresponds to the state of the vcpu whose identity the physical processor had assumed (where the hyper-kernel maintains a mapping of physical processors to virtual processors and may thus map the state of a physical processor to the identifier of a particular vcpu). The block of the processor state is saved to an area of memory. The functionality to save the physical processor block state may be provided by the microprocessor hardware architecture (e.g., by a macro provided by the hardware). In this example, the saving of the state information is a software instruction provided by a hypervisor that is provided by the hardware architecture, which maintains/tracks the multiplexing on physical processors.

In one embodiment, the saved processor state is the state of the vcpu that is saved when a continuation is created, as described above. The processor state may include various registers, the program counter, etc. During the stall, the invoked set of routines are also used to determine identity of the guest thread that was running in the vcpu and/or the identity of the guest physical address referenced by the guest thread. For example, as will be described in further detail below, the identification may be performed by accessing certain registers in the processor state saved during the stall. Thus, what the physical processor was running (which would have been a guest thread), and what page table the processor was using at the time it was trying to access memory may be determined and recorded. By obtaining such identity information, the association between threads and pages of memory may be determined.

Determining Thread Identity

As described above, the processor state of the vcpu (which had been running on a pcpu) is saved. In this example, the identity of the guest thread running in the vcpu (whose identity a physical processor has assumed) is determined as follows. The value in the FS-Base0 register is obtained.

In the guest operating system, each thread has an area of memory or data structure set aside that includes thread local storage that is specific to a given thread (which may be put in place by a threading library). The FS-Base0 register value includes a pointer to the thread local storage for a particular thread. The thread local storage may also be associated with kernel information. The FS-Base0 register is managed by the guest operating system.

The FS-Base0 register values are set such that two different threads will have different FS-Base0 values (i.e., for thread T1 not equal to thread T2, FS-Base0 for thread T1 is not equal to FS-Base0 for thread T2). Thus, the value in the fsbase register may be used to uniquely identify guest threads running in vcpus.

Determining Guest Physical Address

The guest physical address space referenced by the guest thread may be obtained from a register in the saved processor state. In this example, the identity of the gpa of the page that the thread stalled on is obtained by accessing the value in the internal CR3 register of the saved block of the processor state. The CR3 register value indicates what table was being used by the guest operating system to map addresses, where the value in the CR3 register defines an address space (guest physical address space) as seen by the guest operating system. For example, the CR3 register includes a pointer to the second level page table for all of the guest physical addresses on a node, where the CR3 refers to a particular address space (when new guest applications or processes are run, new CR3 address spaces are generated). As described above, the second level page tables are used to convert a gpa to a real physical address. For example, the address translation is performed by the physical processor (in its identity as a particular vcpu) by indexing the second level page table using the gpa value in the CR3 register. As one example, the top few bits of the guest physical address obtained from the CR3 register are used as an index into the second level page table (e.g., the top 20 bits of the CR3 register are a page directory base register which stores the physical address of the first page directory entry, where the CR3 allows a processor to translate linear addresses (gpas) into physical addresses by locating appropriate page directories and page tables when virtual addressing is enabled). The top few bits may be obtained by masking off the lower order bits and taking the higher order bits. These higher order bits indicate which of the 4K pages the guest physical address refers to (not all of the bits may be needed). While the second level page tables are different on every node, the gpas are unique across all nodes, and can be used as global indices to any second level page table.

As described above, if the page is on the node, then the real physical address of the requested page will be returned (i.e., there will be a corresponding entry for the real physical address in the second level page table when the CR3 register value is used to index the second level page table). If the page of memory is not present on the node, then a stall will occur (because the entry at the index of the CR3 register value will be zeroed or invalidated).

Thread Context Switching

In the above example, a stall was taken when a requested page of memory was not locally available on a node. The identities of the guest thread running in the vcpu and/or the guest physical address space referenced by the vcpu are determined from the block of the processor state saved in response to the stall. The thread/page identification may also be performed when stalls due to other events occur. For example, a stall may also be invoked when a thread context switch occurs. The guest operating system may perform thread context switching, where the operating system switches, moves, or multiplexes guest threads into different vcpus. When the thread in a vcpu is switched, this causes a corresponding change to the FS-Base0 register value of the vcpu (e.g., when the thread context switch occurs, the FS-Base0 register is switched or updated to a new value corresponding to the new thread).

The hypervisor may introspect what is occurring in the guest operating system to determine the identities of the threads running in vcpu containers. Portions of a hypervisor may be leveraged to keep track of the multiplexing performed on pcpus and for maintaining blocks of the processor state. For example, tracking of threads may be captured in a hypervisor when internal register changes occur, such as the FS-Base0 register value changing due to thread context switches as described above. In some embodiments, when a change in the FS-Base0 register is detected, a stall is invoked, such that the hyper-kernel is now aware that the vcpu is running a different thread.

Suppose, for example that the guest operating system was running a process in a particular vcpu. The guest OS is now switching the process to a different vcpu, and therefore updates the FS-Base0 register. The update to the FS-Base0 register triggers a stall, which wakes up the hyper-kernel (where the hyper-kernel is configured to be alerted or notified of FS-Base0 register value updates). The hyper-kernel is configured to determine what the previous value of the FS-Base0 register was, and/or observe the new FS-Base0 register value. Based on such observations, the thread context switch may be identified. During the stall invoked or triggered by the thread context switch, the identities of the threads and/or pages of memory in/referenced by the vcpu may be determined, as described above.

Kernel/User Space

A guest operating system may have been running either user space code or kernel space code at the time of the stall. If the guest OS was running user space code, then the FS-Base0 register will be filled in to point to the guest thread that was running, as described above.

If kernel code was being run, then a particular value (e.g., zero) will be in the FS-Base0 register, indicating that kernel space code (and not a guest thread/guest operating system code) was being run. For example, suppose that the guest operating system switches from running in user space to kernel space. The change between the two spaces results in a change in the FS-Base0 register, which may be detected, as described above. The CR3 register may change as well, and point to the kernel address space.

Thread/working set insights may also be gained when a stall occurs while in kernel space. As one example, suppose that a change to kernel space is detected due to a change in the FS-Base0 register value to zero. If the CR3 value has not changed, then the work being done by the physical processor may be associated or attributed to threads having a matching CR3 value. Thus, the work being done by a guest thread (operating in user space) may be determined when a switch to kernel space occurs. Thus, working set insights may occur on any stall, whether in kernel space or user space.

By determining the guest physical addresses accessed by threads (which may also be identified, as described above), the relationship between threads may be determined. For example, as the addresses in the CR3 register are globally unique guest physical addresses, if two threads have the same CR3 value, then it is determined that the threads are operating in the same guest physical address space (e.g., the two threads are sharing the same address space). This is an indication that the two threads are closely related (e.g., that they have the potential to share the same page tables).

Thus, using the techniques described above, what specific thread was running in which specific guest physical address space is determined. As stalling events occur over time, the pattern or set of guest physical pages of memory (i.e., "working set") referenced by threads may be identified or otherwise determined (where the pattern of memory access is thread-dependent, versus vcpu-dependent). Thus, for each thread, what pages are of interest to a given thread may be determined. Further, for each page, what threads are interested in a given page may also be determined.

Recording History

Upon identification of the guest thread and/or guest physical address associated with a stalled vcpu, the identified information may be recorded in a history. For a given thread, the pages accessed by the thread are recorded. For a given page, the threads that access the page are recorded. In some embodiments, each time that a guest physical page is accessed by a guest thread is recorded. The access may have resulted in either a hit (if the page was locally available) or a miss (the page was non-local). Regardless of whether a page access was a hit or miss, the identifiers of pages accessed by guest threads are recorded (i.e., both hits and misses are recorded). A time stamp associated with the access may also be recorded as part of the historical information. The history may be updated over time. For example, as the processing performed by the virtualized machine progresses, the state of computations and the state of memory access patterns of threads and the memory changes and evolves over time. Thus, the association between threads and working sets may dynamically change over time.

The information characterizing the relationship between memory and threads may be used in several places in the hyper-kernel, such as memory housekeeping, TidalTree decision making, cost function decisions, receipt of resource requests from remote nodes, etc., as will be described in further detail below.

In some embodiments, an API is designed that has behaviors that allow the relationships between threads and pages to be evaluated and maintained, and to guide hyper-kernel behavior that takes maximal advantage of these relationships in its decision-making.

Described below is a list of example cost terms and metrics that may be used to make decisions in the processing of the virtualized system described herein. Further details regarding where and how the cost terms are utilized (e.g., in housekeeping, TidalTree decisions, pair-wise resource migration negotiations, etc.) will be described below.

Memory State

In some embodiments, for a given thread T, a node n, and a time t, a set of pages H that T accessed on node n during some period of time prior to t is recorded, assuming T was running on that node during that period. The recorded set of pages is referred to as the history of page accesses H, t, n of T, on n at time t. In practice, H, t, n may represent a reasonable subset approximation of all the pages that T accessed on n during the time interval [t-$\delta$, t], for some duration $\delta$. In some embodiments, this approximation is used because without hardware support, it may be computationally difficult to record every single access of the thread without incurring a very large amount of overhead. If hardware support is available, it may be used to record the thread access. In some embodiments, rather than referring to non-constant deltas, the aforementioned time may be represented in terms of variable length of intervals (e.g., [t1 . . . t2] or [t3 . . . t4]).

Warmth and Utilization

For each history H, t, n, two metrics are maintained, utilization and warmth. In some embodiments, utilization (which may also be referred to as relevance) relates the history H, t, n that was recorded at some time t in the past, to the most recent pattern of page accesses of the guest thread T (i.e., its new history H, t', n), that happened at a more recent past [t'−δ', t'], where current time t'>t, and for some δ'. If accesses recorded in the two histories at t' and t are similar (i.e., the history recorded earlier at time t is being repeated), then utilization by T of the set of pages H, t, n is determined to be high. In one embodiment, the utilization is calculated as a percentage reuse of pages in the recent overlap, or the amount of overlap in page access behavior between the two histories/time periods.

In some embodiments, warmth measures how many of the pages in the history H, t, n are still local on the node at current time t'>t. So, in this example, warmth of a history of a thread relates the history to the set of pages that are still local on the node. In one embodiment, warmth is calculated as a percentage or ratio of accesses of the pages that are still local on the node. This indicates, of the pages accessed in the recent past, how many of those pages are still resident or local on the node. As one example, suppose that it is determined that 80% of pages accessed by a guest thread on the node during a period of time in the recent past are now gone from the node. The warmth at the current time would then be calculated as 20%.

Utilization is updated at node n where a thread T is currently running, based on an estimate of the percentage of pages that T is accessing that are also in its history H, t, n. However, as described herein, warmth is updated on node n (independently of the node on which T is currently running) if, for example, pages were removed that are currently in T's history. For each thread T, both warmth and utilization are calculated in relation to the local node n where T's history H, t, n is stored and hence the only parameter that may be needed to compute warmth and utilization is the guest thread ID (i.e., the local node is implied in the following APIs) and a time stamp t. More than one history recorded over different time intervals per node per thread may be stored. In some embodiments, the time stamp t is part of the APIs that are used in addition to the guest thread identifier.

One example difference between warmth and utilization is the following: warmth relates the history of a thread to the set of pages currently on the node containing the history, while utilization relates the history of the thread to the thread's current pattern of access on the node on which it's running.

The following are examples of functions for utilization and warmth:
(int) utilization(guest_thread_id)
(int) warmth(guest_thread_id)

In one embodiment, utilization is tracked as follows. A piece of code (referred to herein as a "balancer") periodically erases second level page table entries, but does not release the memory. For example, while the reference to a real physical page is zeroed out in the page table, the page itself is not deallocated. The next time that the page is requested, a fault will occur. However, because the reference was intentionally or purposely removed, it is known that the page access would actually have been a hit (i.e., if a stall occurs on a page for which the reference was deliberately zeroed out, then it is determined that a hit would have otherwise occurred for that page). By performing the above sampling, the references may be statistically counted to obtain an approximation for utilization. As described above, sampling may be performed to induce stalls that indicate whether hits for pages would have otherwise occurred. During the induced stalls, the guest thread and gpa identities may be obtained, as described above.

Managing Information about Sets of Pages

As described above, guest threads are associated with guest physical pages indicated by guest physical page addresses. In some embodiments, guest physical pages have the property that their addresses are unique across the pod. Therefore, in some embodiments, the management data that is consumed and maintained is guest physical addresses (gpas). As described above, guest threads are indicated by guest thread numbers (which are unique guest thread identifiers using registers such as CR3 and FS-Base0), and are therefore also unique across the pod.

For various purposes, examples of which will be described in further detail below, it may be useful to have a data structure that efficiently maintains a set of pages and efficiently tests for inclusion and exclusion. One example of a data structure that is efficient in both time and space that may be used is a Bloom filter (where, for example, information is hashed into a bitmap). A bloom filter may be used to record, for example, the history of page accesses by a thread in a compact way, where the thread access history (whether hits or misses) is updated over time. The length of the bloom filters may be tuned.

In some embodiments, this set of pages is updated over time. In one example embodiment, a version of the basic Bloom filter that allows this, such as an aging bloom filter, is used. In one example embodiment, an aging bloom filter with two active buffers is used, which ages the data in FIFO ordering by maintaining two Bloom filters, one of which is at capacity while the other keeps the most recent history.

In some embodiments, independent of which particular version of Bloom filters or other data structures that are used to keep a set of pages, the following example APIs are used that describe the operations needed (and that may be performed with respect to the bloom filters):

```
//get the total memory size (in bytes)
size_t ts_bf_size(uint32_t num_bf, uint32_t num_hash, uint64_t num_bits);
//initialize and destroy the bf
void ts_bf_init(struct ts_bf *bf, uint32_t num_bf, uint32_t num_hash, uint64_t num_bits,uint64_t capacity);
void ts_bf_destroy(struct ts_bf *bf);
//reset the bf
void ts_bf_reset(struct ts_bf *bf);
//add one element
void ts_bf_add(struct ts_bf *bf, vm_paddr_t gpa, bool *aged);
//query set membership of an element
bool ts_bf_contains(struct ts_bf *bf, vm_paddr_t gpa);
```

Page Affinity

As used herein, affinity is a metric that indicates the affinity of a thread to the node that it is currently running on. The affinity may be determined from the historical record of accesses by a thread, as described above, where, among the set of accesses, the number of accesses that are coming from a particular node is determined. In some embodiments, a relatively small number of the most recently accessed pages is tracked, and for each such page, the node id(entifier) from which the page most recently arrived (if it moved, or the local node ID otherwise) is tracked. For a guest thread, if multiple such pages come from the same node n, it is asserted that the thread has an "affinity" for n (i.e., if a thread is pulling pages from a particular node, then that thread has an affinity to that node). For example, suppose that the last 100 accesses by a thread are evaluated. If, for example, 90% of them (or any other threshold, as appropriate) are from a different node, the affinity function returns the identifier of that node. Otherwise, the function returns the identifier of the local node.

In some embodiments, the aforementioned example thresholds (100 accesses and 90% of accesses being from a particular node) are initialization parameters that can be adjusted (e.g., through experimentation). There may be tradeoffs. One example tradeoff is that the more pages that are kept for this term, the more fragmentation may be observed in the system before a measure of affinity of a set of pages for a node is obtained. For example, for a given thread, if 1000 pages are on node 0 and the thread is on node 1, a wait of 1000 pages may be done to decide that there is an affinity to node 0, however, a thread may unfortunately migrate from node 1 to node 0 after the pages have moved to node 1.

The following is an example of an affinity function call, which takes as input a guest thread ID and returns a node id:

node_id=affinity(guest_thread_id);

Duty

A vcpu may be determined to be productive if it executes a significant number of guest instructions without stalling.

After a vcpu migrates, the vcpu may need to have some minimal set of resident pages to be productive. For example, it may be observed that after a vcpu migration, there are typically ~15-30 pages that the vcpu needs before it can become productive (which may, for example, be observed experimentally). In some embodiments, the vcpu has a duty to stay at the node until it has performed at least a threshold number of page accesses. The (configurable) threshold is used as an initial mechanism to start building a working set for the thread. As used in the examples herein, these pages are referred to as the active set. Examples of pages in the active set that are needed by a thread to progress through its computation include the page at the top of the stack, the page that has the code that the thread needs to execute next, etc. This threshold is set, for example, to prevent a thread from accessing a page and then migrating to another node. If vcpus migrate too frequently, no progress may actually be made because they may not have an opportunity to use the set of guest pages they need to make sufficient guest progress and so therefore, may be unproductive.

As used in the examples herein, a groomed set refers to the set of pages frequently accessed by a guest thread over some time period, the duration of which, in some embodiments, is tunable. Multiple groomed sets may be encountered for a given guest thread. As used herein, the term duty is used to indicate a strategy factor forcing the guest thread to stay for some time on a node, to assist in forming groomed (working) sets. However, duty by itself may not be sufficient to maintain the groomed sets that it has created.

In some embodiments, a duty function call takes as input a guest thread identifier and returns as output a Boolean value indicative of the duty. For example, the Boolean value may be used to indicate whether the guest thread has completed its duty at the node. One way in which duty may be used is in requestor side decisions and cost terms. For example, when a vcpu determines (e.g., in response to a stalling event for a non-local page access) whether to send a request for the page of memory or to migrate, if the guest thread has not yet completed its duty on a node, then this contributes to a higher cost of migrating the vcpu (and by extension, the guest thread).

(bool) duty (guest_thread_id)

The duty status may be determined by computing or counting how many accesses have been performed by a thread since its arrival on a node, and comparing the number of accesses against a threshold. If the threshold is met or exceeded, then the duty has been completed or otherwise satisfied. If the threshold is not met, then the duty has not been completed.

Memory Pressure

In some embodiments, it is ensured that there is always enough space to satisfy memory needs on a node. However, depending on how many vcpus are running on a node and how much I/O is happening, pages may need to be evicted out of memory quickly by moving them to other nodes. In the case that eviction of pages cannot happen fast enough, the memory pressure on that node is considered to be in a critical state. In some cases, this is an emergency condition that is to be dealt with immediately. Further details regarding eviction are described below in conjunction with housekeeping.

//Memory critical on a node is reporting whether there are
       too many pages on a node given its capacity:
   (bool) memory_critical(node_id)

Goodness Metric

The efficiency of the virtualization system described herein may be improved by coordinating guest threads with the sets of pages they need (e.g., based on a determination of the association of working sets and threads, as described above). One example way of determining efficiency is through defining what is referred to herein as a "goodness" metric. The goodness metric is a function of a thread, and is indicative of a thread's efficiency when running on a node (where a thread may have different efficiencies on different nodes). As described herein, a thread is "good" if, when it runs, it rarely stalls. Various ways to keep track of goodness may be utilized, as will be described in further detail below. The goodness metric may then be used to determine how better to deal with stalls. For example, the migration of threads and the effects that they may have on working sets of pages used by the thread may be considered. As another example, the goodness metric may be used when making decisions about page evictions, responses to transfer requests, and how that might affect threads on the node using those pages (e.g., as described in "Resource Migration Negotiation," below).

Examples of computing the goodness metric are as follows. Typically, the more a guest thread accumulates run time in the guest, with as few misses as possible, the better the guest thread performs (i.e., the higher the net guest run time, and the fewer the misses, the better). One example of a metric that may be made use of, uniformly across subsystems in the hyper-kernel, is "net-guest-thread-runtime/miss-count," where the "net," in some embodiments, refers to the removal of any thread idle time due to the hyper-kernel. In one example embodiment, this time is accumulated just before a vcpu running a thread is returned to the guest, and accumulation of time is stopped after a stall. A timestamp may be recorded when a vcpu is returned to the guest, and when it stalls next, a new timestamp is recorded. The difference between the two timestamps may then be added to the accumulated net guest thread time. This is performed on a thread by thread basis. If the numerator or denominator becomes too large, their values may be divided (e.g., both by 2) such that the ratio remains the same.

In some embodiments, net thread time spent waiting for I/O is tracked. When a guest thread is stalled for I/O, the vcpu running that thread is placed in the event table, as described above. When the I/O completes, the vcpu running that thread is taken off of the event table and placed in the TidalTree, where it will eventually be run. Threads will perform I/O whether they run on bare metal or on the hyper-kernel described herein. The I/O waits on bare metal may become part of the run time of the guest thread on bare metal, and in some embodiments, the same is done in the hyper-kernel. One example way of incorporating, in the hyper-kernel, the I/O waits as part of the run time of the guest thread is as follows. A timestamp is recorded of when the thread is placed in the event table. When the I/O completes at a later time, the difference of the two timestamps is taken and added to the guest thread runtime. The thread (running in a vcpu) is then placed in the TidalTree.

As will be described in further detail below, the goodness metric may be used, in various parts of the virtualized system described herein, such as for cost functions (e.g., when considering migrating a thread, a decision to not migrate the thread may be made if its goodness metric is too high), housekeeping (e.g., with respect to a balancer, when pages are to be evicted because of memory critical conditions, those pages whose threads are not efficient may be chosen), and the TidalTree (e.g., when attempting to queue up a vcpu containing a thread to make it ready to run, and the node is found to be overloaded with vcpus that are already queued up ready to run, the worst or least efficient thread may be chosen to be placed in the root, not necessarily the one that is to be made ready to run).

The following are two example implementations of the goodness metric, both examples of which compute the ratio of net-guest-thread-runtime to one of two alternates:

1. number of misses, and
2. net-host-runtime (exclusive of guest)

Both of the above examples are readily computed and inexpensively monitored. One exception may be that the second may include wait time for I/O while the first does not. In some embodiments, if a comparison is to be made in comparing to bare-metal (which includes I/O), the same I/O treatment is performed in both cases (both should include, or both should exclude I/O wait times). Example details regarding incorporation of I/O wait time are described above.

For illustrative purposes, a function of the following example form is used:

//returns true if thread t's goodness is greater then t, false otherwise
boolean isGood (guest_thread t, threshold t)

In some embodiments, when using the second alternative, the net-host-runtime is used as the denominator of the goodness metric.

Page Contention

Page contention, as described in the examples herein, occurs when two or more guest threads on separate nodes need the same page(s) over the same short period of time. One indication of page contention is that there is a guest thread on a node that continues to frequently stall on the same page. This may be because the page is constantly being pulled by another thread, which pings back and forth between the two threads. An example of a (highly) contended page is one that is accessed every time that a system call is performed. For example, in the Linux operating system, the guest operating system frequently performs a system call to update the page containing the timer. However, since the Linux kernel is operating in a distributed manner across the cluster in the virtualized environment described herein, if all threads are attempting to update the page with the timer, thrashing of the page may occur. This may negatively impact performance.

The result of page contention may cause either the commonly needed pages to move back and forth between the nodes, or the contending guest threads to co-locate with their needed pages. Although the latter may potentially reduce re-stalling on these specific contending pages, it may have side effects such as causing many guest threads/vcpus to co-locate, or a large increase in stalls for different sets of pages needed by those threads. Many vcpus co-locating could potentially stress the system if there are not enough pcpus in the node to which they migrate that run efficiently. Contention for a page may not justify co-locating the contending guest threads if those have large sets of pages they access on different nodes with any or very little intersection. In some embodiments, the decision of how to solve page contention takes such issues into account.

The following is an example of a function that may be called to detect the issue of page contention. As described below, the function or algorithm determines, for a particular page, which guest threads need the particular page, and how often. For example, the function computes, for a guest thread that needs the page, a count of the times that the thread accessed (e.g., stalled over) the page over a short period of time (e.g., the recent past). If the count exceeds a (configurable) threshold (e.g., five times), then the page is flagged as being contended (e.g., a binary or Boolean flag for the page may be set). This indicates that the guest thread is contending for a particular page on a node at the time that the counter is at the threshold.

```
// Function page_contention uses a hash function data structure and
//       it identifies whether the guest thread has asked for the same
page more
//       than a given threshold in the recent past//
// Function page_contention_list returns the other guest threads also
  contending
on
//       the same page (gpa)
(bool) page_contention(gpa, guest_thread_id)
list of guest thread ids = page_contention_list(gpa)
```

Among the cost terms described herein, some may be used to decide actions to be taken upon page contention, such as the following:

The Goodness Metric:

The goodness metric described above may be used upon detecting page contention to identify if there is a problem that needs to be resolved. For example, if the contending guest threads are performing well, detecting page contention does not require any special treatment. Page contention could be ignored and a decision would continue to be made, for example, with a generic cost function that handles any stall (example APIs for the goodness metric are described above).

Frequency of Threads:

In some embodiments, if one thread runs much more frequently (i.e., it accesses pages more frequently) than the rest, this is an indication that there is likely a single threaded application, or an application that makes exceptional use of a single thread, perhaps the main thread. This is referred to herein as the popular thread.

In some embodiments, the popular thread is not to be forced to migrate to handle page contention unless that move does not contradict its memory placement of its working set. In some embodiments, not forcing migration of a popular thread due to page contention improves performance.

The following example function returns a value indicative of the frequency of the guest thread based on the frequency of accesses:

//The frequency of the guest thread based on frequency of accesses
(int) guest_thread_frequency(guest_thread_id)

Size of Common Interest Between Threads:

Page contention may occur when multiple threads in a set of cooperating threads are sharing memory in an application. Page contention may be observed in some user parallelized workloads, and there may be more page contention as application programmers write finer granularity parallel applications handling concurrency at the application level. For example, suppose that the guest application performs its own multi-threading, and has its own shared memory. The guest threads of such an application are likely to have a large amount of common interest (i.e., overlap in the pages that the threads access). This is in contrast, for example, to a set of processes in Unix, which have a limited amount of common interest, because they operate in different address spaces. High performance databases may also perform their own multi-tasking and multi-threading with a large shared address space. Guest threads of the application should not be separated, as they may be working on a common page of memory. Or, for example, the application has distributed work among its guest threads such that the result of one thread may be used by another thread. The techniques described herein for determining common interest may be performed at the application level and/or the operating system level.

A guest thread may see a performance benefit by co-locating with otherwise contending threads if they have a large number of shared pages in common. However, estimating the size of the common interest between guest threads in pairs may not be sufficient. Suppose the following example scenario: thread A has a lot of common interest with thread B, thread B has a lot of common interest with thread C, but threads A and C have no common interest. If A and C were located on separate nodes, thread B would have to share its common interest with A and C by either frequently migrating between the nodes or by frequently moving many commonly needed pages. In either case, the performance would suffer compared to a solution where A, B, and C co-locate (assuming they have enough pcpus to run). The following is an example API that estimates the size of common interest between (multiple) guest threads (as long as those threads are all locally running on the same node).

//Estimation of common interest of a guest thread with all the other guest threads in a set.
//This set can be given in a number of ways such as contending, frequent, or local guest threads
(int) common_interest(guest_thread_id, set of guest threads)

As described herein, common interest is a measure indicative of the size of the sets of pages that are shared between guest threads on a node (which may be indicative of the similarity in the pattern of page access). In one example, the size of common interest is determined as follows. The working sets for a guest thread and a set of threads are obtained. The overlap/intersection in the working sets of the threads is determined.

For example, suppose there is a first thread T1 and a second thread T2. Each thread has a respective working set of pages that they have accessed recently, W1 and W2. If, for example, there is only one page common to both W1 and W2, then T1 and T2 do not have much common interest. If, however, the intersection of the W1 and W2 is a large number of pages, then the two threads have a large amount of common interest.

The working sets for the threads may be determined by accessing the data structures (e.g., bloom filters) used to record the history of recent accesses (hits and misses) by the threads whose common interest is being calculated. As described above, the misses can be determined during stalls (e.g., using the CR3 and FS-Base0 registers). The hits may be determined by performing sampling. For example, as described above, a piece of code is executed that performs sampling of page tables, and invalidates the page tables, but does not delete them from the memory. When a hit for a page that is disabled has been deleted, but is still on the node is observed, the page table is re-enabled, and a hit is recorded. Thus, the number of hits may be approximated via sampling. The hits may be recorded in the (recent) history for the thread. If a physical processor includes hardware indicating when hits occur, this information may also be obtained to record page accesses that are hits. The hits and misses that are determined may be recorded as page accesses in the history of the thread.

W1 and W2, which are the recent accesses by threads T1 and T2, may be represented using respective bit arrays corresponding to the respective threads. For a given bit array, the number and location of "1's" is proportional to both the size and the pages accessed. The bit arrays are "ANDed." If, for example, the result of the ANDing is all zeros, then there is no common interest between the two threads. A count of the "1s" after the ANDing is determined, indicating the size of the common interest between the two threads. The count, or number of "1s," is computed, for example, as a hamming weight. This hamming weight is an estimate of the common interest between T1 and T2.

Thus, as described in this example, the recent histories of accesses for the threads are obtained and compared by performing an "AND." If a bloom filter is used, the hash functions used to generate the filters should be consistent so that the same page hashes to the same location in the bloom filters. This consistency may be provided due to gpas being hashed, which are globally unique across all nodes in a cluster. The hamming weight is then computed, where the value is indicative of the level of common interest.

The common interest for a given guest thread to multiple guest threads (which may be on the same or different nodes) may be computed. In one embodiment, the size of common interest is computed as the sum of the individual common interests determined for the given guest thread with respect to each thread in the set of guest threads (computed, as described above). For example, if the common interest of T1 with respect to T2, T3, and T4 is to be computed, then the pairwise common interest of T1 to T2, T1 to T3, and T1 to T4 are determined and summed together to determine the overall common interest of T1 to the set including T2, T3, and T4.

When estimating or otherwise determining the overall common interest of a guest thread to a set of other threads, certain individual common interest size values may be filtered or excluded from the summation. For example, if the common interest between two threads is below a threshold (e.g., the hamming weight is small), then the value is filtered out. As one example, suppose that a particular guest thread is being evaluated with respect to 100 other threads running locally on a node, and for each of the 100 threads, the common interest is 1. Added together, the common interest is 100, which may indicate a high common interest between the requesting guest thread and the other threads on the node. In reality, however, there is only a small amount of common interest with each thread. Thus, individual common interest sizes smaller than threshold may be filtered out when estimating an overall size of common interest In some embodiments, common interest is evaluated on-demand, for example, when a stall occurs for a contended page. For example, as will be described in further detail below, common interest may be computed or used in pairwise resource migration. Thus, common interest may be computed as needed, during stalling events (e.g., when a page contention flag is set).

In some embodiments, each pairwise computation of common interest between two guest threads that is computed is stored (e.g., in a two-dimensional array). In some embodiments, the common interest computation is associated with a timestamp. For example, if there is page contention at every stall, common interest may not change after every stall, and there is no need to calculate common interest every time a stall occurs. The timestamp may be used to determine when the last time common interest was computed, where it is recalculated if a sufficient or threshold amount of time has elapsed (i.e., common interest between two threads need not be computed on every stall if it has been recently computed).

Memory State:

Movement of a guest thread to handle page contention may cause multiple pages to move in the future. Thus, knowing where groomed sets are created for that thread may be useful to make this decision. (See, for example, APIs in the related section above).

In some embodiments, a page contention issue may only need to be resolved as a special case (i.e., differently than stall handling described herein) if it, for example, hurts performance (which may be characterized by the goodness metric), and in some embodiments, to resolve the page contention issue, memory state and relationship with other threads are negotiated. In some cases, there may be no reason to deny co-locating guest threads if by doing so they gain additional benefits in terms of locality and they do not stress the system in terms of pcpu availability.

VIOPs:

One example subcase of page contention is when a guest thread is contending with a viop (virtual input/output operation) during I/O operations. In some embodiments, if the viop representing a physical device cannot move, the contending guest thread is moved to the node containing the viop and stays there as long as I/O activity lasts. In an alternative embodiment, I/O operation is remoted, as this may be more cost effective than moving pages back and forth between viops and guest threads on different nodes.

//Returns true if there is contention between a guest thread sharing a page with a viop
(bool) viop_contention (gpa, guest_thread_id, viop_thread);

The aforementioned historical information, metrics, cost terms, etc. may be stored as metadata. Such information may also be transferred between nodes as well, for example, if the thread is running in a vcpu that needs to migrate. The number of guest pages under management in a virtualized environment may be numerous. The number of threads may also be numerous, but is typically much smaller than the number of pages. Thus, sparse and often imperfect data is handled or otherwise dealt with to effectively manage the metadata associating threads with working sets of pages. The metadata associating threads and pages may be prevented from growing too large in size and too stale (since the running characteristics may change in unpredictable ways), where the metadata is implemented in a manner that takes into account that the threads may migrate, where the associated metadata is migrated as well (pages referenced by the metadata may be moved as well). In one embodiment, aging bloom filters are utilized to implement some of the aforementioned metadata in a compact representation.

As will be described in further detail below, the metadata (associating threads with sets of pages) described above may be used as factors (e.g., in a weighted non-linear polynomial) to make decisions about what to do with vcpu stalls. In some embodiments, when a vcpu stalls, it is running a guest thread. As described above, guest threads may also move from vcpu to vcpu under control of the guest operating system (and not under the control of a hyper-kernel). The hyper-kernel may base its decisions on the pattern of access of a thread, no matter on which vcpu the thread is running. Other factors may be used to determine what to do when a vcpu stalls.

In some embodiments, the above recorded history and determined metrics/factors for a thread are stored on a per-thread basis.

FIG. 13D illustrates an example embodiment of a table used to store information pertaining to guest threads (threads running in a guest operating system). Other types of data structures may be used as appropriate.

In this example, table 1330 includes the guest threads that are running in the guest operating system. Hanging off each guest thread is thread information. In this example, each row (e.g., row 1332) corresponds to a different thread, identified, for example, by its unique, corresponding FS-Base0 register values. For each thread, references to the above described per-thread metadata information are recorded. In this example, for each thread, warmth (1334), utilization (1336), and common interest (1338) are recorded in the table. The recorded history of page accesses by the thread (represented using a data structure such as a bloom filter) may also be included in the table. Other cost terms/metrics may also be stored in the table. The cells in a given row (thread) may also include links or references or pointers to the separate pieces of information. The table (e.g., a hash table) may then be indexed by thread to obtain per-thread information. Thus, by identifying guest threads and/or guest physical address spaces as described above, a table such as that shown in the example of FIG. 13D may be managed. Thus, a particular thread may be tagged with information associated with the vcpu (running in a pcpu that has assumed the identity of the vcpu). In some embodiments, the table of thread metadata is stored in RAM (random access memory).

In some embodiments, each node in the computer system has a table of threads and thread information. This effectively forms a table of all the threads that are running on a particular node. Information about a thread may be transferred between nodes.

Figure 13E:
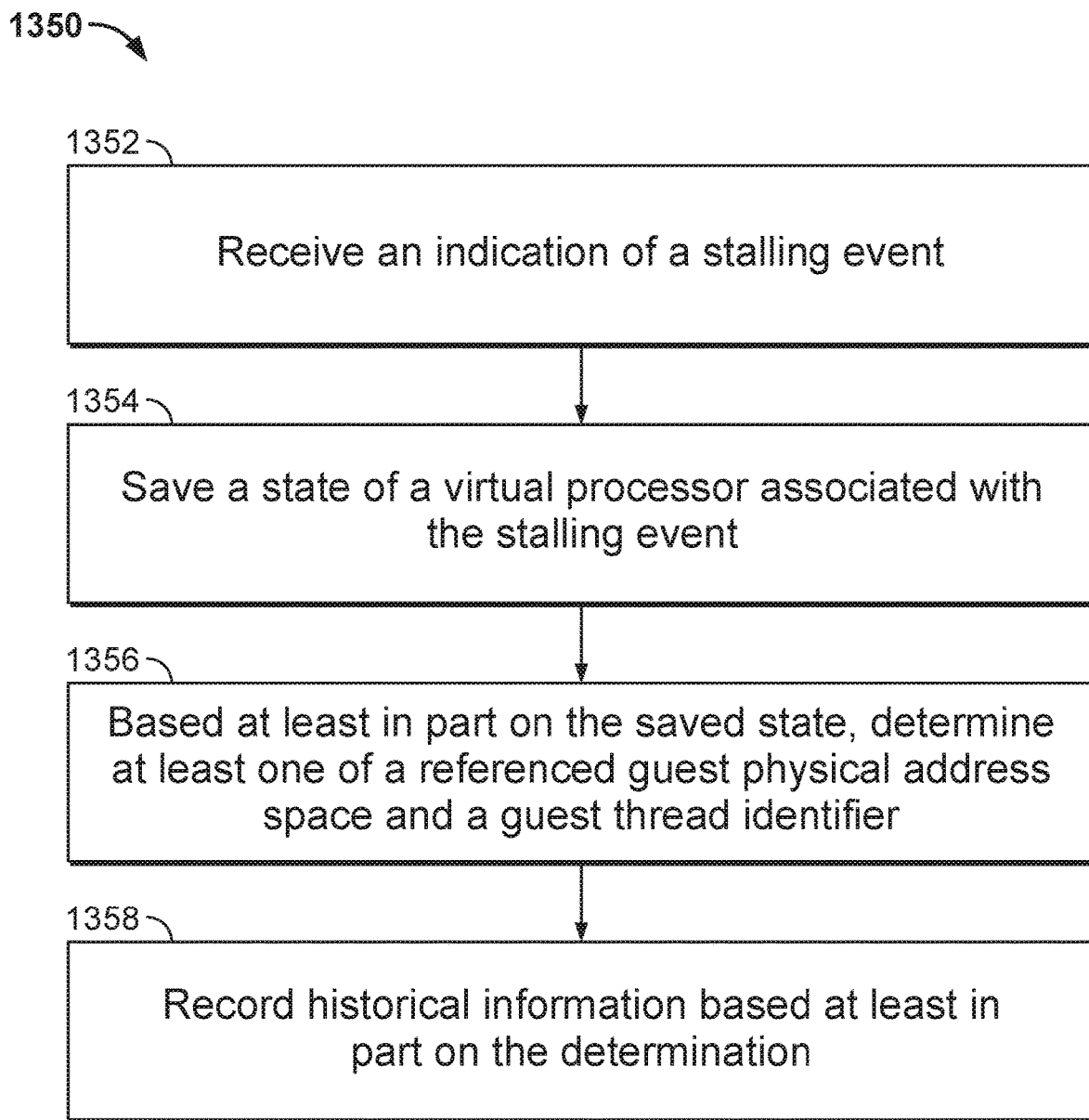
FIG. 13E is a flow diagram illustrating an embodiment of a process for associating working sets and threads.

FIG. 13E is a flow diagram illustrating an embodiment of a process for associating working sets and threads. In some embodiments, process 1350 is executed by a hyper-kernel. The process begins at 1352 when an indication of a stalling event is received. In some embodiments, the stalling event is associated with a non-local page request, as described above. In other embodiments, the stalling event is triggered in response to detection of a thread context switch, as described above.

At 1354, a state of a virtual processor associated with the stalling event is saved. This may include the saving of a block of the processor state including internal registers, program counters, etc., as described above.

At 1356, at least one of a referenced guest physical address space and a guest thread identifier is determined at least in part by evaluating the saved processor state. In one example embodiment, the value of the CR3 register in the saved block of the processor state is obtained. The CR3 register value corresponds to the guest physical address space referenced by the process (guest thread) running in the virtual processor. In some embodiments, the identifier of the guest thread running in the virtual processor is obtained by accessing the value in the FS-Base0 register of the saved block of the processor state (which uniquely identifies a guest thread, as different guest threads will have different FS-Base0 register values).

At 1358, historical information is recorded based at least in part on the determination at 1356, as described above. For example, the identified page accessed by the identified thread may be recorded to a history of page accesses by the thread. As one example, the history of page accesses by the thread is stored using a data structure such as a bloom filter. Various metrics and factors may be determined based on the recorded history and stored as well (e.g., warmth, utilization, common interest, goodness, etc.).

Thus, using the techniques described above, given a page p, what threads have a strong need for p may be determined. Also, given a thread t, what pages are strongly needed by t may be determined. Various processing may then be performed based on such information, as will be described in further detail below.

Resource Migration Negotiation

As described above, in some embodiments, when a non-local resource is needed by a VCPU (executing, for example, on behalf of a guest thread), it attempts to calculate the cost of several known strategies (e.g., whether to request the resource from the node owning the page or whether the vcpu should migrate to the owner node). Once those costs are calculated, the hyper-kernel code chooses the lowest cost strategy based on the cost polynomials.

In the examples described above, a series of cost polynomials on the side of the requestor are described, where there may be minimal or no decision making on the side of the owner of the requested resource. Except for the page being wired or locked-down to the node due to current use by a non-moveable device (e.g., a direct memory access by a physical device such as a hard drive, which cannot move), the page is typically sent to the requestor in the above examples.

In some cases, it may not be optimal for the owner to send the requested page. For example, suppose that a vcpu on a requestor node requests a page. However, if there are thirty vcpus on the owner node that have been actively using the page, sending the requested page to the requestor would not be optimal, as the requested page has a large amount of usage on the owner side. Instead, it would be optimal for the owner to deny or reject or veto the request, with the vcpu migrating from the requestor to the owner.

In the example embodiments described below, the owner also has a series of cost polynomials to choose how to decide what to do with the request that it receives from the requestor (if the vcpu decides to migrate, then no decision need be performed on the owner side, since there is no request). The owner-side series of polynomials are used to determine whether it is more cost effective to reject the request or send/migrate the requested page (versus the polynomials on the requestor side, which are used to determine whether to request a page or migrate the vcpu requesting the page). By having the decision in both the requestor side and owner side, a better or improved decision may be made about how to treat the request.

In some embodiments, the cost polynomials of the requestor and owner nodes are independent of each other, and may exist without the other.

Examples of the decisions and cost terms for the decision polynomials of the requestor and owner are as follows. While the examples described below refer to requests for a page, the techniques described herein may be variously adapted to accommodate any other type of resource, as applicable.

Requestor Side Decisions and Cost Terms

Requestor-side decisions

1. Request—ask for the resource to be sent from the owner node to the requestor node.

2. Migrate—move the VCPU running the guest thread to the owner node

Requestor-Side Cost Terms

1. Received reject—In some embodiments, this term indicates that a page is being requested for which a rejection has just been received. In some embodiments, requesting a page for which a rejection has just been received contributes to an extreme high cost for requesting.

2. Thread efficiency—In some embodiments, this term defines how well the guest thread has been executing on this node. In some embodiments, thread efficiency is measured based on a comparison of the number of misses and thread runtime (e.g., when the thread is running and there are no misses), where the fewer the misses in comparison to the thread runtime, the more efficient the thread. In some embodiments, the better the guest thread executes on the requestor node, the higher the cost of migration of the VCPU (and guest thread running on the VCPU). One example measure of thread efficiency is the goodness metric.

3. Out of memory—In some embodiments, this term indicates whether the requesting node is running out of memory. In some embodiments, the requesting node running out of a memory is a high cost to requesting the resource.

Owner Side Decisions and Cost Terms

Owner-Side Decisions

1. Send—send the page to the requesting node

2. Reject—Inform the requesting node that it should make a new decision

Owner-Side Cost Terms

1. Page wired—In some embodiments, this term indicates that the page is in use by a non-moveable device, and cannot be moved. In some embodiments, a page being wired is an extremely high cost to sending the resource. Whether a page is in use by a non-migratable resource or device may be indicated by a set of bits. The status of the page as wired may be transient and change over time (e.g., when the page is no longer in use by a hard drive for direct memory access).

2. Efficiency comparison—In some embodiments, this term indicates whether the requesting thread on the requestor side is running much better than any thread on the owner node using the requested page. In some embodiments, the better the requesting thread on the requestor side runs as compared to any thread on the owner node using the requested page, the higher the cost to rejecting the request.

3. Page warmth—In some embodiments, this term indicates whether the page being requested has been moved to the owner node due to a recent request and whether it is being accessed frequently on the owner node. In some embodiments, a high value indicates a high cost to Send.

In some embodiments, for a cost polynomial, each of the terms is weighted to express how important the term is. As an example, the "Received Reject" cost term may be weighted so that no matter what the other cost terms are, it will reflect a much higher cost to request the page than to migrate to the page (i.e., Request_Cost>Migrate_Cost). Likewise, the "Page Wired" cost term may be weighted so that it will reflect a higher cost to Send than to Reject (Send_Cost>Reject_Cost). In some embodiments, this reflects that there may be no other choice among those presented. Otherwise, in some embodiments, the weights may be set to values based on performance analysis and tuning.

In some embodiments, short-circuited polynomial evaluations are performed, where a short-circuiting control mechanism is used in addition to or instead of weights. Both mechanisms of weighting and short-circuiting may be used.

Example Transaction for Requesting a Page

The following is an example transaction for requesting a page, which is described in conjunction with FIGS. 14A-14E Example Initial Configuration In the following example, suppose the following scenario, which is described in conjunction with FIG. 14A.

Figure 14A:
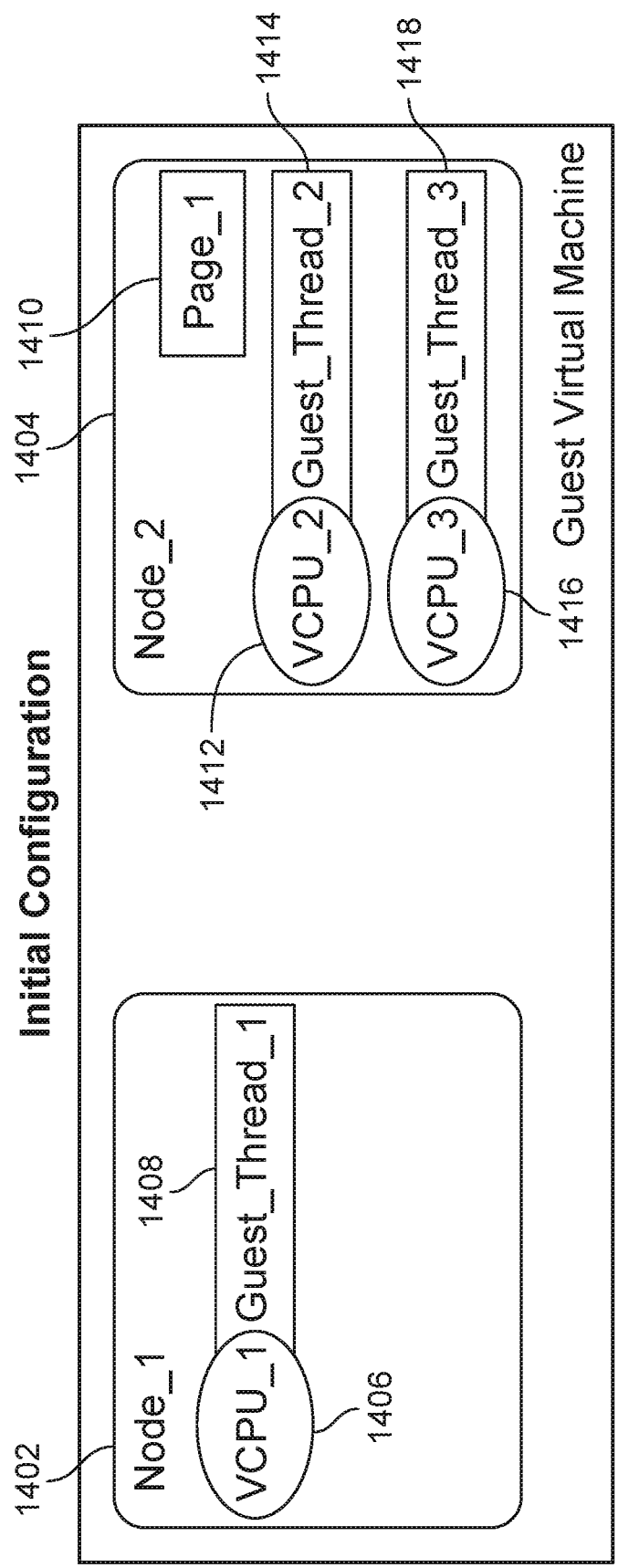
FIG. 14A illustrates an example initial configuration of a guest virtual machine.

FIG. 14A illustrates an example initial configuration of a guest virtual machine:

There are 2 nodes (Node_1 (1402) and Node_2 (1404)) in the pod (where an example of a pod is a virtualized system such as computer system 100 of FIG. 1).

VCPU_1 (1406) is running Guest_Thread_1 (1408) on Node_1

Page_1 (1410) is on Node_2

VCPU_2 (1412) is running Guest_Thread_2 (1414) on Node_2

VCPU_3 (1416) is running Guest_Thread_3 (1418) on Node_2

In this example, as part of its execution, Guest_Thread_1 needs Page_1.

This causes an exit from the guest (operating system) and into the hyper-kernel to satisfy the request. In this example, as described above, VCPU_1 (which is running Guest_Thread_1) calls a set of functions (1420, seen in FIG. 14B) to determine whether to request the page or migrate to the node that currently has the page (e.g., by evaluating the requestor-side cost polynomials described above). In some embodiments, the set of functions are implemented as an array of function pointers that have a common application programming interface (API), which return a value which is multiplied by a weight to obtain a new value. All of the values returned by the functions are added up and multiplied by the weights for each of those individual functions to obtain a value. A final polynomial result value is then obtained for migration cost, while another polynomial result value is obtained for the request cost. The lowest cost (i.e., least expensive) approach is taken. Further examples regarding migration cost and request cost calculation are described below.

Example Phase 1

Figure 14B:
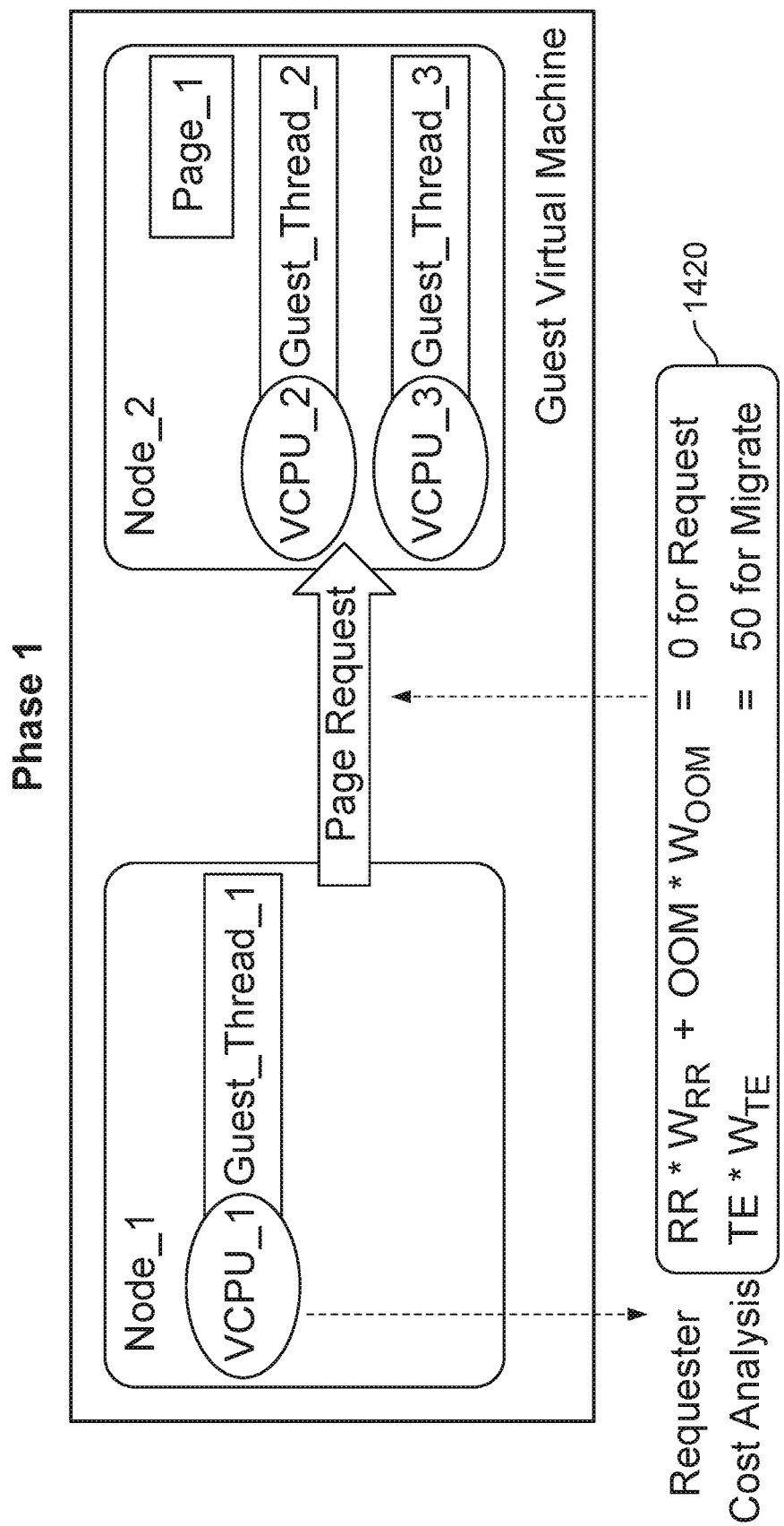
FIG. 14B illustrates an example first phase of a transaction for requesting a page.

The following is an example of a first phase of the example transaction for requesting a page, which is described in conjunction with FIG. 14B, which continues from the example of FIG. 14A.

In this example, VCPU_1 executes a cost analysis (requestor side) in the hyper-kernel based on cost polynomials such as those listed above. In this example, as shown at 1420, since this is the initial request, the "Received Reject" (RR) cost term is 0. Suppose that up to this point in time, the thread efficiency has been very good, so the combination of the "thread efficiency" value and the weight is 50. In this example, the check on "out of memory" (OOM) is 0, since there is plenty of memory available on this node. This leads to a cost of 0 for the "request" decision and 50 for the "migrate" decision. Therefore, in this example, the result is to request the page from Node_2 (because the cost to request is lower than the cost to migrate). If the result is to migrate, then no request is made.

In this example, VCPU_1 creates the request packet for Page_1, and includes, in various embodiments, information on the thread efficiency, how often that page has been requested in the (brief) past by this thread, and the request type (e.g., read/write, etc.). This information is transmitted to Node_2 via, for example, an interconnect network. As will be described in further detail below, the information transmitted with the request may be used by the owner node (Node_2) when determining whether to reject the request or send the requested page. Other examples of information transmitted with the request include metadata information corresponding to Guest_Thread_1, such as warmth, utilization, and common interest, as described above. The recorded history for the thread may also be transmitted. For example, the data structure (e.g., bloom filter) representation of the history may be transmitted with the request. Other examples of metadata information and their use in resource migration negotiation will be described in further detail below.

In this example, at this point, VCPU_1 waits for the page to arrive or a message to arrive from Node_2.

Example Phase 2

Figure 14C:
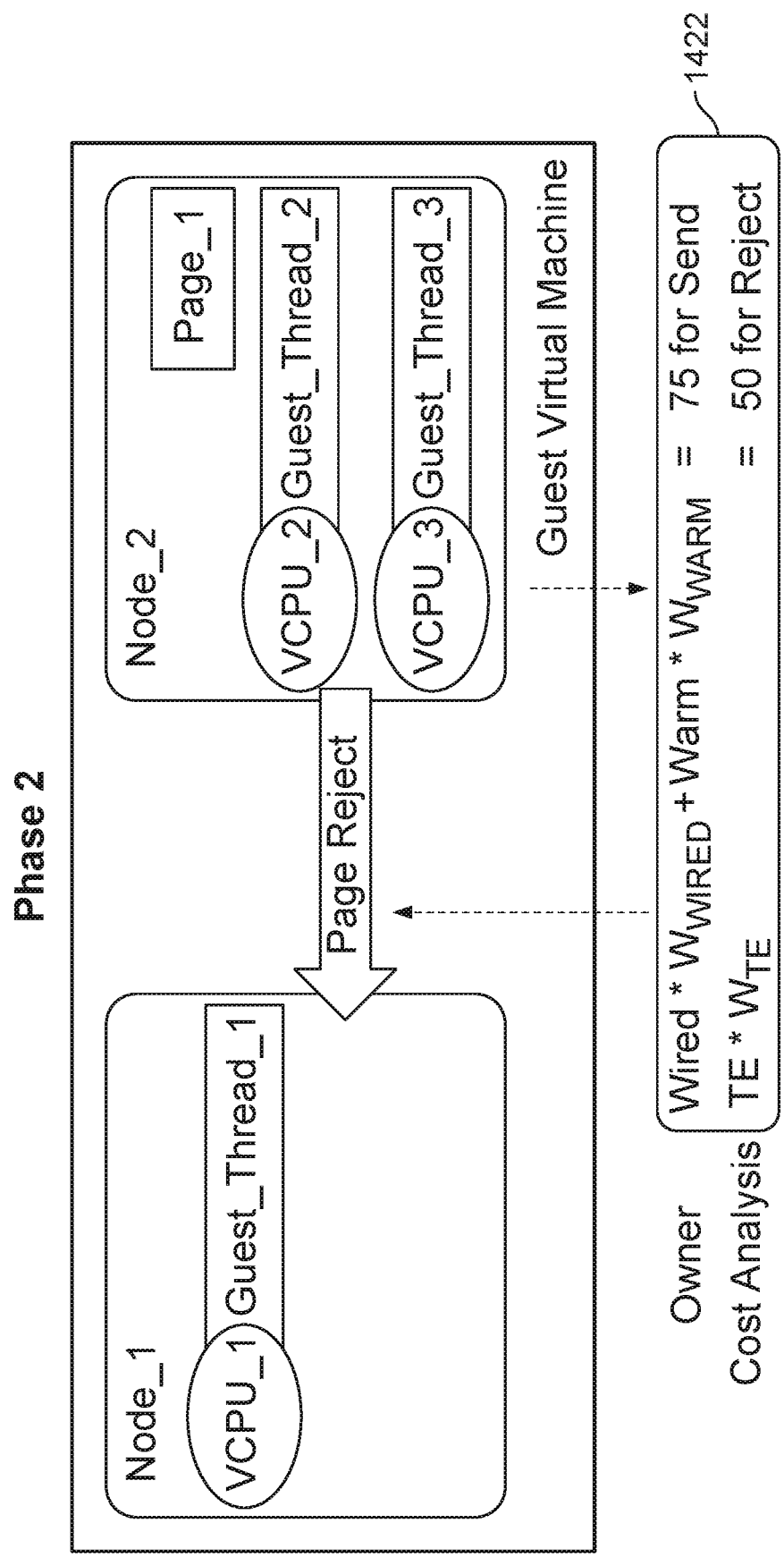
FIG. 14C illustrates an example second phase of a transaction for requesting a page.

The following is an example of a second phase of the example transaction for requesting a page, which is described in conjunction with FIG. 14C, which continues from the example of FIG. 14B.

In this example, Node_2 receives the packet requesting Page_1 from Node 1. In some embodiments, using information that has been stored on Node_2 as part of the normal operation of the hyper-kernel, Node_2 executes a cost analysis (1422) based, for example, on the owner-side cost terms listed above. In this example, the result of this analysis is a decision to either send the page or reject the request.

For illustrative purposes, in this example, assume that the requested page is not wired to a non-moveable device, and it has been heavily used recently by threads Guest_Thread_2 and Guest_Thread_3 on Node_2.

In this example, the cost term "page wired" returns 0 due to the page not being in active use by a non-moveable device. In this example, no matter what the weight, this term is 0. Next, in this example, suppose that the analysis of the threads Guest_Thread_2 and Guest_Thread_3 for efficiency yields fair efficiency. In this example, these two threads are making multiple calls to get resources, and are not as efficient as Guest_Thread_1. Finally, in this example, the "page warmth" cost term is calculated for this page. In this example, since this page has been accessed many times in recent past for threads Guest_Thread_2 and Guest_Thread_3 on Node_2, this allows for a high cost for sending.

Based on an evaluation of the two values, a value of 75 for sending the page and a value of 50 for rejecting the request are determined. In this example, based on the values, the request is rejected (because the cost for rejecting the request is lower than the cost for sending the page). In some embodiments, the reason for rejection is included as part of a reject packet, which, in this example, is sent back to VCPU_1 waiting on Node_1.

Example Phase 3

Figure 14D:
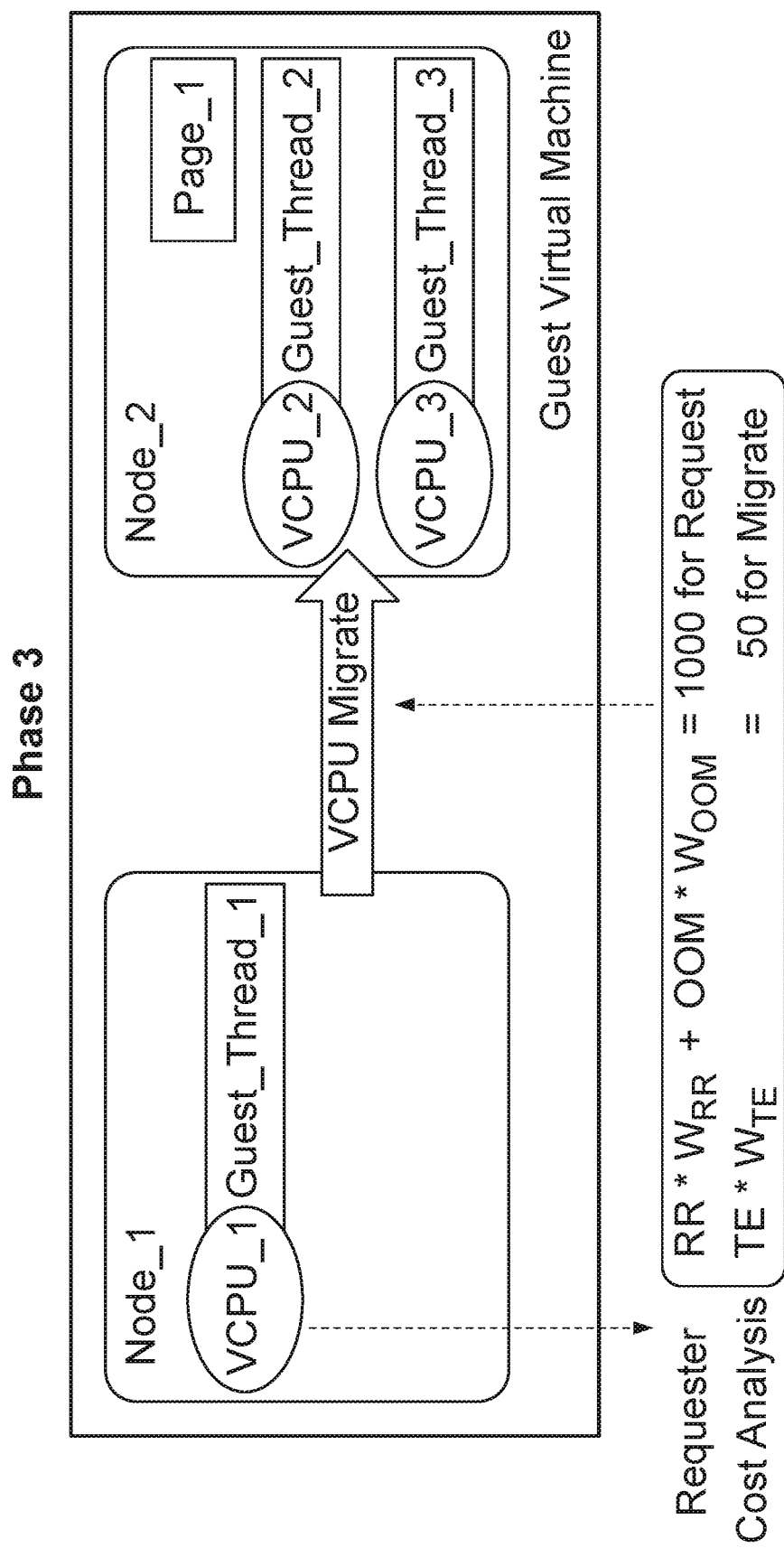
FIG. 14D illustrates an example third phase of a transaction for requesting a page.

The following is an example of a third phase of the example transaction for requesting a page, which is described in conjunction with FIG. 14D, which continues from the example of FIG. 14C.

In this example, the reject packet is returned to Node_1, and VCPU_1 is made ready-to-run, so that it can run Guest_Thread_1. In some embodiments, the re-entry into the guest causes a stall to occur on Page_1 once again. This stall causes an exit from the guest into the hyper-kernel, and, in some embodiments, the cost analysis is executed again to determine what to do about resolving Page_1 access. In this example case, however, the "received reject" cost term returns a positive value, and with the weight of that term, the values for the request and migrate decisions end up with different results than in phase 1, where in phase 3, the decision is made to migrate VCPU_1 to Node_2 (because the cost to migrate is now lower than the new cost for requesting the resource).

Figure 14E:
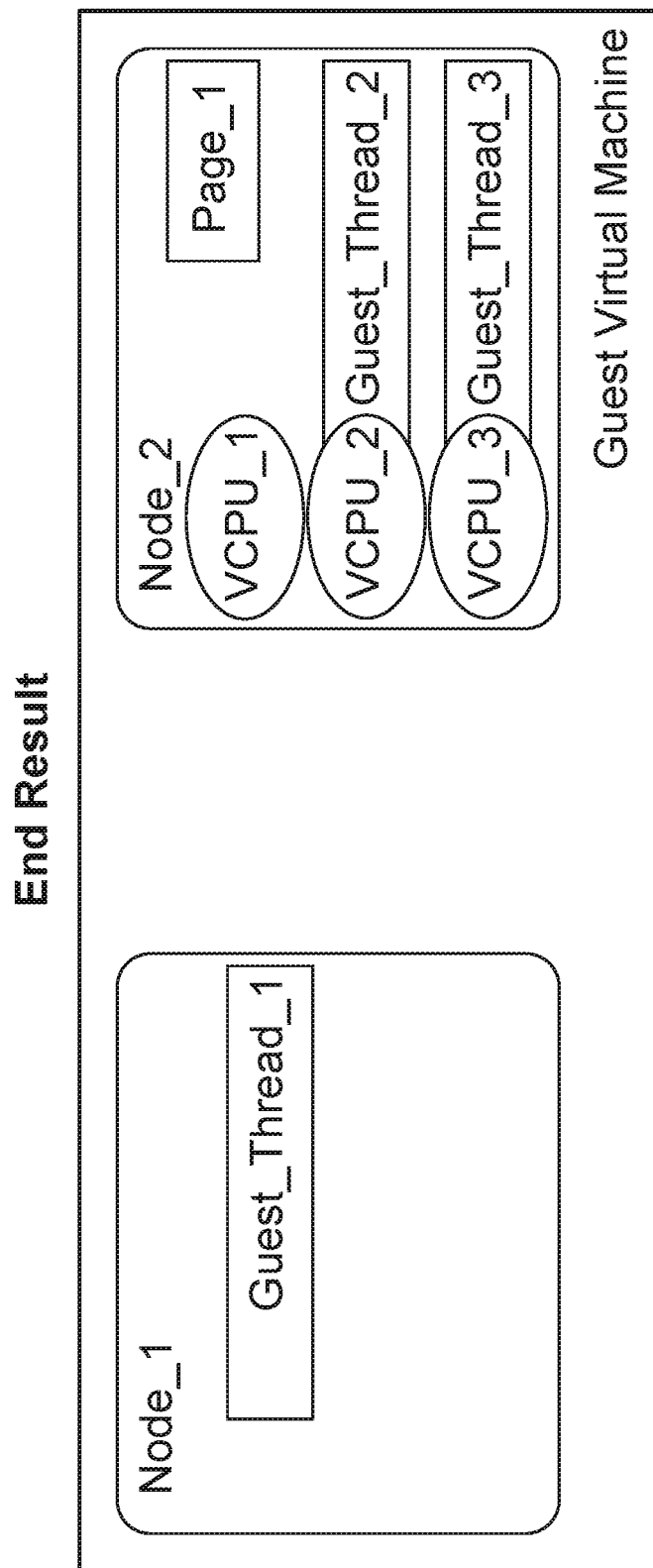
FIG. 14E illustrates an example end result of a transaction for requesting a page.

As can be seen with the above 3-phase example of the requestor/owner negotiation, the end result of this example negotiation, as shown in the example of FIG. 14E, which continues from the example of FIG. 14D, is to have VCPU_1 (running Guest_Thread_1) move from Node_1 to Node_2 to satisfy the request for Page_1.

In various embodiments, different cost terms can be added to support the requestor decisions (request, migrate), as well as cost terms to support the owner decisions (send, reject). Further examples of cost terms used to support the owner decisions will be described in further detail below.

Figure 14F:
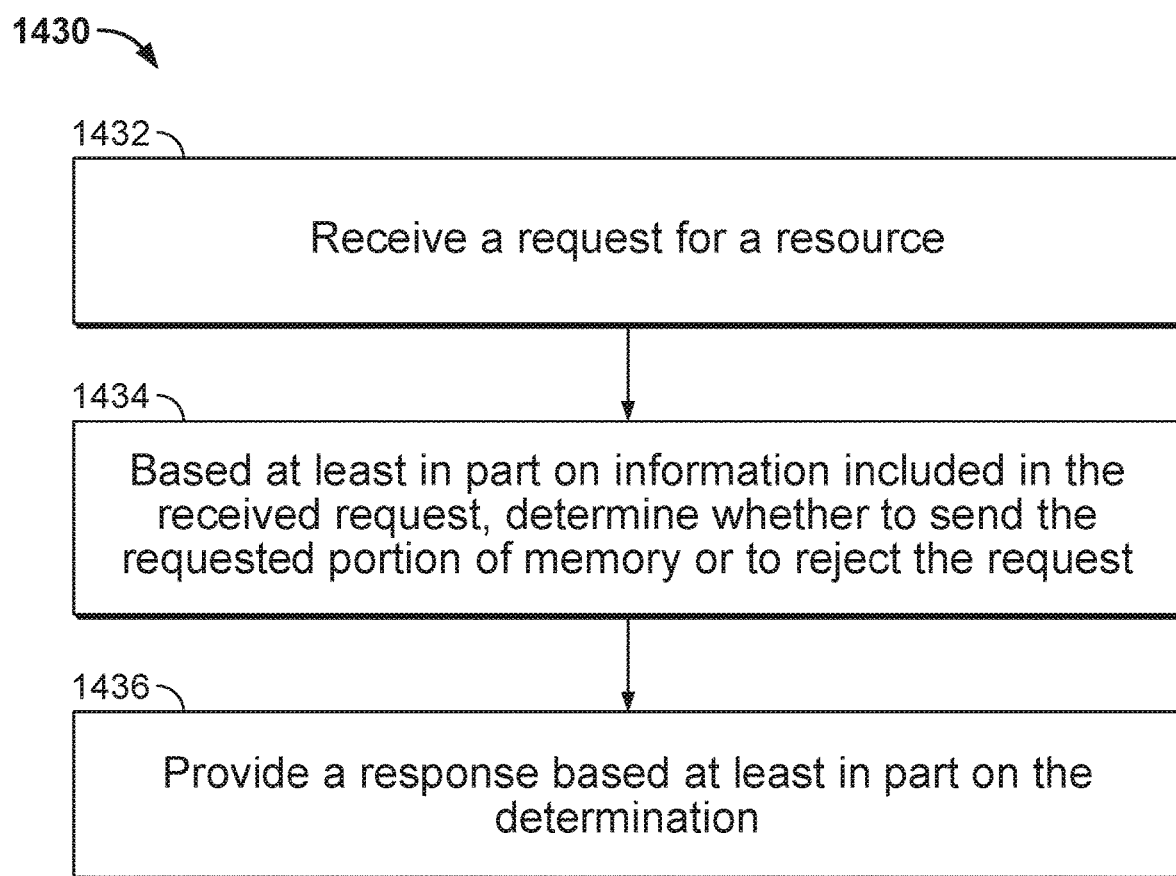
FIG. 14F is a flow diagram illustrating an embodiment of a process for resource migration negotiation.

FIG. 14F is a flow diagram illustrating an embodiment of a process for resource migration negotiation. In some embodiments, process 1430 is executed by a hyper-kernel (e.g., the hyper-kernel on a target node that received a request for a page, where the target node owns the requested page). In this example, pair-wise resource migration negotiation between the target node and a remote node from which a request is sent is performed. The process begins at 1432, when a request for a resource (e.g., needed portion of physical memory such as a page of physical memory) is received.

For example, the request is made by a vcpu running in a pcpu on a first node (also referred to as the "requestor node" or "originator node" from which the request originated). The vcpu making the request is running a guest thread that needs the requested page of memory. For example, while executing the guest thread, the virtual processor was unable to access a page needed by the guest thread (e.g., because it is not locally available on the originator node). A stalling event occurred, where the guest thread is unable to continue its processing unless it is able to access the needed page of physical memory. As described above, the vcpu on the originator node evaluates a set of cost functions (e.g., polynomials) to determine an appropriate strategy—whether to migrate itself to the originator node to be closer to the needed page of memory, or to send a request for the needed page of memory. In this example, the vcpu has determined that it is a lower cost to request the needed page of memory. Thus, in response to the guest thread on the originating node stalling on a non-local page request, a request is sent by the originator node and received by the targeted node (that owns the requested page) at 1402.

The received request also includes metadata information, at least some of which will be used by the targeted node to determine whether to send the requested page or to reject the request. The request includes an identifier of the resource being requested (e.g., gpa of the page of physical memory being requested). The metadata information included in the request includes per-thread metadata corresponding to the guest thread that needs the requested page of memory. The metadata information may be included in a request packet that is transmitted to the owner node via an interconnect network.

For example, as described in conjunction with example phase 1 of FIG. 14B, the request may include information on the thread efficiency, how often the requested page has been requested in the brief past by the guest thread on the requestor node, and the request type (e.g., read, write, etc.).

Other examples of thread metadata information included in the request from the requestor node include metadata information such as that described above, including warmth, utilization, goodness/thread efficiency, affinity, duty, page contention (indicated, for example, by a flag), size of common interest, etc. The (recent) history of accesses of the guest thread in the vcpu on the requestor side making the request may also be included in the request. As described above, the recent history of accesses may be stored in a bloom filter, which represents such information using an array of bits. The sent history of accesses may include accesses within a certain recent period or window of time, or, for example, the most recent set of accesses (e.g., last 10,000 accesses, or any appropriate number of most recent accesses) made by the guest thread on the requestor side that needs the page of memory.

At 1434, a determination is made, based at least in part on information included in the received request, whether to send the requested portion of memory or to reject the request. The determination may be made by evaluating a set of cost functions/polynomials.

The set of cost functions/polynomials may take into account the information included in the request from the requestor node, as well as information that has been stored on the owner node as part of the normal operation of the hyper-kernel. For example, the cost analysis at the owner node may be based on the owner-side cost terms listed above (e.g., page wired, efficiency comparison page warmth, etc.). Another example of an owner-side cost term is the number of requests that have been previously received from the requestor node.

When performing the evaluation/determining the cost of the strategies (i.e., sending the page or rejecting the request), some of the thread metadata information in the request from the requestor node may be directly compared/negotiated to information stored on the owner node, while other metadata information from the requestor node is not directly negotiated.

Examples of information included in the request that may be directly negotiated include information that has direct counterparts/equivalent metrics on the owner node that can be explicitly compared. In various embodiments, such directly negotiable information includes warmth, utilization, and size of common interest.

For example, the per-thread information included in the request from the requestor side may be compared against local node-level information accessible/stored by the owner side. The owner side information may include information pertaining to the pages currently owned by the owner side (including the requested page).

As one example, the per-thread warmth information included in the request may indicate how recently the requested page was accessed by the guest thread (currently on the requestor side). The warmth information on the owner side may indicate how recently the requested page was accessed by threads running or executing locally at the owner side node.

As another example, owner side utilization information includes information indicating the number of threads running on the owner side that accessed the requested page over a period of time and with what frequency (e.g., in the last ten seconds, one thread has accessed the requested page once, etc.). This information may be used to determine whether the page is highly utilized on that node (by any thread). If there is high utilization of the requested page on the owner side, then the page should not be given up, as this would result in the breaking up of the working set (where time and effort has previously been spent to ensure that all threads on the nodes are co-located with the pages that they need). Thus, the cost to break up this working set that has been built on the owner side should be high (and the requested page should not be let go easily).

With respect to utilization, the owner side may also have utilization information corresponding to the guest thread running on the requestor side. For example, the guest thread may have been run on the owner side at a previous time, and historical information about the thread's behavior may also be resident on the owner node. If such utilization information is available on the target owner node, then the information may be compared against the utilization information in the request. If the owner side utilization information is not available, then such a comparison need not be made (i.e., there is no history for the guest thread on the owner node, so no relevant information with which to negotiate). Even though there is no guarantee what information may be on the owner side, the request may still include the warmth/utilization information, in case such information is available/stored on the owner side for comparison/negotiation.

Examples of information included in the request from the requestor side that may be used in the owner-side cost analysis, but are not directly negotiated, include information that is computed for the guest thread in the requesting vcpu with respect to the originating/requestor node, but for which there is no target/owner node counterpart. In various embodiments, such information that is not directly negotiable includes goodness, affinity, duty, page contention, and recorded history. For example, with respect to duty, which indicates whether the guest thread has completed its duty on a node (e.g., a threshold number of accesses since arriving on the requestor node, as described above), because the guest thread that needs the page is not actually on the owner node, duty cannot be determined for the guest thread with respect to the owner node.

As another example, although the guest thread on the requestor side is not running on the owner side, the recent access history of the guest thread included in the request may be used by the owner side to determine how the guest thread would have behaved or performed had it been running locally on the owner side.

With respect to page contention, if the request includes a page contention flag that has been sent, this indicates to the owner side that the requested page is highly needed by the guest thread on the requestor side trying to access the page. As described above, if there is page contention, then cost terms such as the goodness metric, frequency of threads, and common interest may be used to facilitate in determining what actions to take.

For example, two (or more) guest threads may have page contention for the same page. Common interest calculations may be used to determine whether the two threads should co-exist on the same node. For example, the size of the common interest that the contending guest thread (on the requestor side) has with other guest threads running on the requestor-side may be compared with the size of the common interest that the guest thread at the requestor side has with the guest threads running locally on the owner-side.

The common interest may be computed using the techniques described above (e.g., by summing and determining hamming weights).

The size of common interest of the guest thread to the threads on the requestor side may be obtained (e.g., dynamically computed, or a recently computed common interest may be obtained) and included in the request.

Although the guest thread is not running on the owner side, the common interest of the guest thread (running on the requestor side) with respect to the set of threads on the owner side may be determined if the access pattern history of the guest thread is included in the request. As described above, by sending the access pattern history in the request, the owner side may determine how the guest thread would have behaved or performed had it been running locally on the owner side. For example, the pattern of access of a guest thread is defined by the guest application, and is independent of which node the guest thread is running on. Had the guest thread been running on the owner side, the same pattern of accesses would have been made (what may be different depending on guest thread location is what accesses were hits or misses).

Thus, by receiving the thread pattern of access history in the request, common interest may be computed for the guest thread with respect to the threads locally running on the owner side. For example, as described above, on the owner side, individual estimates of the common interest of the guest thread (in the vcpu that made the request for the page) to each guest thread running locally on the owner side are computed and summed (or otherwise aggregated) together (where individual estimates of common interest may be excluded or filtered from the summation if they are below a threshold value).

In some embodiments, common interest calculations are triggered in response to determining page contention by the guest thread for the requested page. As described above, in some embodiments, common interest calculations may be stored and associated with a timestamp indicating when the common interest was last estimated. If common interest values applicable to the stall (either on the requestor side or the owner side, or both) have been recently computed (e.g., within a threshold period of time), then the estimation of common interest (or portions of the estimation) need not be re-computed (as it is unlikely to have changed within that threshold period of time), with their recent values reused (thus, recalculation may be avoided, reducing the amount of computing resources that are used).

If the guest thread of interest (in the vcpu making the request) has greater common interest with threads on the owner side (as compared to the threads on the requestor side), this may contribute to a lower cost to reject the request (or a higher cost to send), which will cause the guest thread to migrate to the owner-side.

Thus, in addition to determining whether a guest thread has a high need for the requested page with a high frequency, the overlap in accessed pages between the guest threads and with the threads running on the owner node (e.g., in the recent past) may be utilized when making a strategy determination of whether to send the requested page or reject the request.

As described above, if there is page contention, then goodness metric/thread efficiency may also be used to determine what decision the owner side should make. For example, if the contending guest thread is not performing well on the requestor side (e.g., the page contention flag is set and the guest thread's goodness metric value when running on the requestor node is low), then the page request should be rejected, causing the thread to migrate to the owner.

In some embodiments, the information that is not directly negotiable may be used to perform tie breaks. For example, if after performing a comparison of metrics that have requestor-side and owner-side counterparts (e.g., comparison using requestor-side information and owner-side stored information), a tie is determined, the goodness, affinity, etc. may be used to perform a tie break. For example, if the thread has a high efficiency/goodness, or an affinity to the requestor node, then the owner node may decide, via the polynomials, to send the page to the requestor node. On the other hand, if the thread has a low affinity or low goodness/efficiency on the requestor node, then the owner node may decide to reject the request, and cause the vcpu running the thread to migrate to the owner node. The factors without equivalent counterparts may also be used as part of the polynomial calculation (and not only used during tie breaks).

Other examples of owner-side cost terms include whether the requested page is wired, efficiency comparison, and page warmth, as described above. For example, if the requested page is currently wired to the owner node (e.g., being accessed by disk for DMA), sending the page would have a very high cost, as it would disrupt the processing that has been occurring on the owner side.

In some embodiments, a cost for sending the page and a cost for rejecting the request are computed. The action (sending the page or rejecting the request) with the lowest cost is the one that is performed.

At 1436, a response is provided based at least in part on the determination. For example, if a decision is made at the targeted/owner node to send the requested page, then the page is sent to the originating/requestor node. In some embodiments, appropriate data structures and mappings are updated to indicate the new location of the page of physical memory. For example, the owner may record that the page of memory has been sent to the requestor, so that if the now-previous owner of the page receives a request for the page, it can redirect the request to the current owner of the page.

If, for example, the request is rejected (i.e., the request cost is lower than the cost to send the page), then a reject message (e.g., packet) is sent back to the requestor/originating node. In this example, in response to the rejection, the vcpu at the requestor node may re-evaluate its set of cost functions (e.g., as described in the example phase 3 described in conjunction with FIG. 14D). The re-evaluation may take into account new information, such as the rejection of the previous request, or why the request was rejected. New costs for migrating and/or requesting the page may be computed, with the requestor taking an action based on the determined new costs.

If, for example, the vcpu at the requestor node decides, based on the re-evaluation, to migrate itself to the target node, then the vcpu is migrated, as described above. As the vcpu is now on a new node, the thread information associated with the guest thread running in the migrated vcpu is also updated. For example, because the guest thread is now on a new node, per-thread metadata information, such as warmth and utilization, is updated.

As another example, suppose that the owner side rejected the request because a disk was performing a direct memory access into the requested page. Such a DMA tends to be a transient action. Based on this information, the requestor-side hyper-kernel may determine to request the page again, but also wait to make the request (e.g., in addition to determining whether to migrate or request, the requestor polynomials can also be used to compute whether to wait to request again). In some embodiments, the owner side hyper-kernel, in addition to determining whether to send or reject the request, may also decide another action, such as instructing the requestor to try their request again.

Thus, as described above, in some embodiments, upon a stall, the guest thread sends a request to the owner of the resource. In some embodiments, this request is a message that may have a relatively fair amount of unused space that can be used to communicate additional locality information (e.g., above example metadata information pertaining to the guest thread) between nodes. This exchange of information between pairs of nodes is used to perform some locality negotiation between the two nodes, as described above. Pairwise negotiation may also supplant the need to maintain globally consistent state information. Through pairwise negotiation, a good enough state may be converged to for all guest threads. 1-n (one node to many nodes) type of negotiations may also be utilized, but may be more expensive. Details regarding such negotiations are described above in the section "Resource Migration Negotiation," in which examples of types of information sent over to other nodes during negotiation are also described. Various common cost metrics may be identified for comparisons. For example, the estimate of the size of common interest may be compared for a single guest thread between two nodes and provides an answer that is not a value of the cost but instead, the identifier of the node where the guest thread would potentially have more common interest with the other guest threads. This information may be beneficial for improving the effectiveness of negotiations, as described in the examples above. As described above, in various embodiments, the goodness metric, memory state, and duty information are sent when performing negotiation. Such information may further be extended with common interest and other state information. Such information is added in the request message which, as described above, has plenty of available space (e.g., given that it may hold very little information without these additional negotiating parameters).

Additional Details and Embodiments of the Hyper-Kernel, Event Table, and TidalTree Hyper-Kernel Threads The examples described below will make various references to FreeBSD threads. FreeBSD is but one example of a host operating environment with which the hyper-kernel may co-operate (e.g., where the hyper-kernel works alongside FreeBSD, utilizing its services, such as services for I/O and thread management), and some or all of the FreeBSD features described herein may be re-implemented with a different host operating environment or without using FreeBSD. For example, the hyper-kernel may be written to not use FreeBSD at all. As one example, instead of using a host operating system such as FreeBSD, a multi-threading microkernel can be built to provide any needed functionality. This would minimize the reliance on the host operating system. In order to maximize options, the number of interactions between FreeBSD and the hyper-kernel may be limited. For example, FreeBSD provides thread management services, one aspect of which is thread scheduling. The FreeBSD scheduler provides a basic abstraction for threads, which may be assigned to physical processors (i.e., the FreeBSD scheduler is the entity that assigns threads onto actual physical processors). Typically, it is desired for the hyper-kernel to be in control of making the assignments, rather than FreeBSD. The interaction between the hyper-kernel scheduler and the FreeBSD scheduler may be reduced. Further details regarding the hyper-kernel scheduler are described below.

The host may operate in either user mode or kernel mode. The processing performed by the hyper-kernel may be in either the host's user mode or kernel mode. For example, the hyper-kernel processing may be performed in the kernel mode to reduce the number of context switches between user mode and kernel mode in FreeBSD. This reduces overhead, such as saving and storing of registers, managing security measures, etc. For example, the event table may be run in kernel mode in the hyper-kernel (i.e., running in FreeBSD kernel mode).

In the example embodiments described throughout, a guest operating system (and the guest applications running on the guest operating system) believes that it is managing physical processors, when in actuality, the guest operating system is managing vcpus provided by the hyper-kernel. The guest operating system also manages guest threads (where the guest operating system has its own thread scheduler). These guest threads run in the vcpus (which from the perspective of the guest operating system, are physical processors). When the guest threads are created, they are assigned a name (e.g., an identifier that is a string of bits). As described above, the guest operating system places the names of guest threads in a special register (e.g., FS-Base0 register), which is visible to the hyper-kernel by the hardware architecture. Thus, guest threads may be identified (where the guest threads are in a different space from the FreeBSD threads). The guest thread is run when a physical processor assumes the identity of the vcpu that is running the guest thread.

Three example types of hyper-kernel threads maintained in each hyper-kernel instance include: housekeeping threads, I/O threads, and vcpu threads. In some embodiments, the number of hyper-kernel threads is known at initialization time, and each hyper-kernel instance may create all threads on the node on which it is running at startup time.

In one example embodiment, at the time of hyper-kernel initialization, each hyper-kernel instance running on each node creates FreeBSD threads to represent each vcpu and each viop (virtual input/output operation) in the hyper-kernel. As a result, in this example embodiment, it is the case that each vcpu and each viop has a unique corresponding FreeBSD thread on each node. Auxiliary threads may also be created by the hyper-kernel instance.

The vcpu threads are the FreeBSD threads used to represent a vcpu, and run the software associated with a vcpu and its data structures. As described above, each vcpu (which is global to the virtualized system and may exist on any node in the cluster) has a unique corresponding FreeBSD thread on each node (referred to herein as surrogate vcpu threads). For example, if there are four nodes in the cluster, then each vcpu has four surrogate vcpu threads, one on each of the four nodes. A vcpu thread may be either empty or full (i.e., inactive or active, respectively), where only one vcpu thread for a vcpu will be running or active at a time (all other surrogate vcpu threads for the vcpu will be empty or inactive), and it is never the case that two nodes have active vcpu threads for the same vcpu, which would be a violation of the guest operating system (where one vcpu should not be running on two different pcpus). The vcpu may only exist on one node at a time, where only one vcpu thread is running the vcpu for the guest operating system, and the other inactive vcpu threads are waiting. Thus, the surrogate vcpu threads act as proxies for the vcpu, handling processing on behalf of the location (node) where the vcpu is running (e.g., a vcpu thread runs a vcpu on a node, whereas the vcpu itself may run on any node). The use of surrogate threads on the nodes of the cluster prevents the need for locking and synchronization during, for example, vcpu migration.

A vcpu thread will either be running a vcpu in the guest operating system, or the vcpu thread is not running a vcpu in the guest operating system, and may perform some other operations. For example, the vcpu thread may run/execute hyper-kernel code, until some point in time at which it is instructed to assume the identity of a vcpu. For example, in the Intel architecture, the vcpu thread may execute a VM enter instruction, at which point it is running instructions in the guest vcpu (and is no longer running instructions in the hyper-kernel, until, for example, a VM exit occurs). A VM exit may occur, for example, because while the vcpu thread was running a vcpu in the guest operating system, a page fault occurred. The page fault causes the VM exit to occur. The vcpu thread will then stop running guest operating system code, and will instead begin running hyper-kernel code. The vcpu thread will then decide, for the vcpu, and using the hyper-kernel code, whether to migrate the vcpu or send a request for a page (e.g., using the cost functions/polynomials described above). The vcpu thread only makes decisions for its corresponding vcpu, and no other vcpus.

One example of how a vcpu thread performs work related to a vcpu (on a given node) is as follows. Suppose, for example, that a vcpu is to be migrated to a target node. When migrating, the processor state of the vcpu is explicitly saved to memory (e.g., as stored when creating a continuation). This saved memory is then sent as a message to the target node (e.g., by a network thread configured to handle such networking). The surrogate/auxiliary thread on the target node is then signaled or notified to wake up and is run on a pcpu on the target node (FreeBSD may be called to assign the vcpu thread to a pcpu, where the host operating system is used to schedule threads onto the physical processors). The vcpu thread, now running on a pcpu, restores onto itself the state of the stalled vcpu (using the processor state included in the message). A VM enter is performed. A pcpu on the target node has now assumed the identity of the vcpu. The pcpu may then return to the guest operating system, and the vcpu thread continues to execute guest code (instead of hyper-kernel code). From the guest operating system's point of view, it did not observe a fault (the hyper-kernel intercepted the faults and performed the vm exit/enter). Instead, the guest operating system attempted to access a page, and at the next instruction, it has already accessed the page (where the guest operating system is not aware of the underlying migration that was performed by the hyper-kernel). As described above, the use of surrogate threads on the nodes of the cluster prevents the need for locking and synchronization during vcpu migration, where only one vcpu thread for a vcpu will be running at a time (all other surrogate vcpu threads for the vcpu will be empty), and it is never the case that two nodes have active vcpu threads for the same vcpu (i.e., the vcpu may only exist on one node at a time).

In this example, FreeBSD does not control scheduling of the vcpu threads. Instead, the vcpu threads, when initialized, begin in a wait state. The vcpu threads are only signaled to start running when the hyper-kernel sends the signal to the vcpu thread to wake. For example, as will be described in further detail below, the hyper-kernel scheduler and the TidalTree bind the vcpu thread to make it active (e.g., the vcpu thread for a vcpu on a given node is woken up so that the vcpu may begin running on the node). Creating such vcpu threads, which are data structures, is relatively inexpensive, and when they are waiting, do not perform any processing (or use up computing resources). The vcpu thread that is running the vcpu is a representation of the vcpu, and is the schedulable entity from the perspective of the hyper-kernel (where, as will be described in further detail below, vcpu threads may be signaled to wake up or sleep under the control of the hyper-kernel). At various times, the vcpu thread is running a guest thread, but at other times, may not be. For example, when a vcpu is running on a node, the corresponding vcpu thread is running the vcpu (which is running a guest thread). When the vcpu thread is not running (e.g., the vcpu is not running on the node that the vcpu thread is on), then it may be waiting or asleep.

If the vcpu is running (e.g., not a continuation), then it is running in a vcpu thread. Performing a computation is done in the vcpu thread, where, when the vcpu is running a guest thread, it is the vcpu thread that is running the guest thread (where the guest thread is managed by the guest operating system).

When a vcpu thread is running, the register state corresponding to what the guest believes to be a physical processor is in actuality running on a pcpu (where the pcpu has assumed the identity of a vcpu, which has a set of processor states). When the vcpu thread is running, the virtual processor state information is being used. For example, the guest thread carries with it the program counter, registers, etc. When the guest thread is scheduled in the TidalTree and begins running on a vcpu, the vcpu inherits the program counter, the registers, etc. When the vcpu is running, it is a bit-for-bit accurate representation of what the guest believes to be a physical processor, and in fact, the vcpu is running on a physical processor (i.e., the physical processor assumes the identity of the vcpu by taking on the processor state of the vcpu). At any instance in time, when a vcpu is running on a physical processor, it exactly matches what the guest thinks of as a physical processor. When the physical processor is bound to a virtual processor, all the registers associated with the virtual processor are the same as the information associated with what the guest operating system believes to be a physical processor. If an operating system were running on bare metal, the pcpus would have the same state as the vcpus.

When a vcpu stalls, the vcpu, in some cases, will have been running a guest thread running in what the guest operating system (OS) believes to be a physical processor, which in the virtualized system/machine described herein, is in actuality a virtual processor (i.e., a vcpu). In some cases, the scheduler in the guest OS (e.g. Linux, where other guest operating systems may be accommodated) may frequently change the mapping of guest threads and vcpus on some basis which, from the hyper-kernel's point of view, may seem arbitrary (i.e. thread context switching, as described above). The guest thread/vcpu association does not change while the stall is processed (because the vcpu is not running while it is stalled). When the guest operating system multiplexes guest threads amongst what it believes to be physical processors, this is taken note of by the hyper-kernel. As described above, the hyper-kernel tracks the identity of the thread running in the vcpu (e.g., as indicated by the FS-Base0 register of the processor state, as described above) and takes notice of relevant thread transition events. This is in part because the binding/affinity between nodes, memory, and threads occurs from a guest thread standpoint, where thread context switching may happen repeatedly, as described above. For example, as described above, when the guest operating system switches a guest thread onto what it believes to be a different physical processor (but in actuality is a virtual processor from the hyper-kernel perspective), a register (e.g., FS-Base0 register) is updated, which is visible to the hyper-kernel. Detection of the thread context switch causes a stalling event to occur.

Additional Details and Embodiments of the Event Table (ET)

Described below are additional details and embodiments of the event table, which may be configured to take into account threads. The Event Table (referred to herein as "ET") and the TidalTree (referred to herein as "TT") may operate in close cooperation. The operations on the ET are designed to be simple, inexpensive, thread-safe, and generic. As used herein, the ET and TT working together is referred to as the "hyper-kernel scheduler."

In the examples described herein, the ET is a data structure that anticipates asynchronous events that are expected to happen in the future. The ET is the data structure that may be consulted when an event that is being waited for has occurred, and the ET directs the hyper-kernel to perform a set of actions as a result of the event occurring.

In some embodiments, an event is an abstract data type; the event may have a limited but well-defined set of operations on that type.

Since many threads may want to access the ET, synchronization around access and updates to the ET is performed. For example, a thread waiting on an event in the ET might be a guest thread running in a vcpu, or a viop thread waiting for completion of an I/O operation or receipt of completion interrupt from a remote node.

A hyper-kernel thread does not invoke the FreeBSD scheduler to wait directly or indirectly unless the thread is already waiting in the ET. One reason for this is for the hyper-kernel to have tight control over scheduling of its resources in order to make hyper-kernel-appropriate decisions. These may or may not conflict with FreeBSD scheduling strategy. In either case, a goal is to minimize and tightly control the hyper-kernel/FreeBSD scheduler interactions.

In some embodiments, the hyper-kernel scheduler and the FreeBSD scheduler are non-interfering. For example, implicit invocations of the FreeBSD scheduler are removed (e.g., cond_wait). Viops may invoke waits because the underlying I/O devices may require some time to complete their operations. In this case, a vcpu may be represented in the event-table, and when the event occurs, the vcpu transitions to the TidalTree (TT). In some embodiments, I/O is performed in the FreeBSD domain. Thus, in some embodiments, a viop (rather than, for example, a vcpu) invokes cond_wait.

There may be other threads that also interact with the ET (e.g., a thread in the network subsystem). The following is a list of examples of asynchronous events:
Receipt of a solicited page
Receipt of an unsolicited page
Receipt of an I/O completion notification
Receipt of a remote interrupt notification
Receipt of a remote or local I/O operation
Receipt of a remote or local request for instruction emulation In this example, every event has a status. The status may be one of {anticipated, posted, completed}. As described herein, an event is anticipated if a vcpu makes a decision to put an event on which it wants to wait into the ET, but has not done all the work necessary to trigger the event. Once the work to trigger the event is complete, it changes the state from anticipated to posted. When the event fires, the state is changed to completed (and is removed from the ET). (In some embodiments, the completed state is not required, and is described here for illustrative purposes, since, once an event has occurred, it is immediately removed from the event table.) There should not be a completed event in the ET. Once purged from the ET, any thread waiting on the event takes the appropriate action corresponding to the event.

In some embodiments, a pending bit is used which indicates that a page has been requested. The pending bit may be implemented as a bit on a page in a page database that indicates that the page has already been asked for (but the page has not yet been received). Note that, if a page has been requested, there is an event in the event table corresponding to the requested page. Therefore, both the pending bit and the event may not be needed. In either case, the information may be used to ensure that a node does not ask for the same page twice (this may prevent an infinite cycle of requesting pages—e.g., when a node sends a page, it does not know if the page was received by the requesting node—the pending bit may help to guarantee this).

In some circumstances, a page-arrival event may occur before the page has been formally requested (i.e., formation of the request is still in progress). In this case, the update to the ET triggered by the arrival will see that the event has not yet been posted, but it is in the event table in the anticipated state. Thus, in some embodiments, after the page arrives, the event state is marked as completed, and the actual request is not made. In this case, when the update to the ET is made to mark it as posted, the update instead simulates the state change to completed as if the event had occurred, which it has, and as usual, the event is removed from the event table. Also, if a page arrives without having been solicited, or if there are multiple threads waiting for the page, any thread waiting for it in the ET is made ready-to-run.

Another example issue to consider is the following. One example of an invariant in the virtualization system described herein is that there are not overlapping requests on the same node for the same page. This is done to ensure that the hyper-kernel search for a mobilized resource eventually terminates. This may be solved by having a second event that corresponds to the completion of an outstanding request. Thus, if any thread (the original one or a subsequent thread) stalls on the same page, another request is not issued until the first one is satisfied.

Therefore, in the virtualization system described herein, every vcpu and every viop on each node has an associated FreeBSD thread. In some embodiments, the hyper-kernel deals with vcpu threads which correspond 1:1 with a vcpu. The vcpu has an associated FreeBSD thread (above described vcpu thread), created, for example, at the hyper-kernel initialization time. A viop also has a FreeBSD thread. The vcpu or viop may be identified with a hyper-kernel thread-id, or represented, for example, as a FreeBSD thread number. In some embodiments, the two are kept disjoint, where a table is separately maintained that maps a hyper-kernel vcpu or viop to a FreeBSD thread. This may be done for the reasons stated earlier regarding limiting the interdependence of the hyper-kernel and FreeBSD. In some embodiments, whichever FreeBSD thread is responsible for removing an event from the ET causes the waiting hyper-kernel thread to awaken, for example, by signaling its corresponding FreeBSD thread. Note that doing this in this way means that in some embodiments, further consideration about continuations need not be made. In some embodiments, the state of the computation is represented by a FreeBSD thread number (or equivalently a hyper-kernel-defined vcpu or viop number). In this example, FreeBSD then becomes responsible for saving and restoring the thread runtime state.

In some embodiments, every event contains an event-type (examples of which are listed above), an event status, and a set of threads to be signaled when the event is completed. Also, as indicated earlier, multiple threads might wait on the same event, in which case, when the event fires, all threads waiting on the event are woken up. This may be a by-product of the example APIs described below, and is a part of the example ET implementation described herein. In some embodiments, every event is associated with a resource ID as well (e.g., gpa for a guest physical page). In some embodiments, for each event (identified by a corresponding resource ID) in the event table, the event table includes a list of vcpus (identified by their globally unique vcpu identifiers) that are waiting on the event.

In some embodiments, because APIs for the event table are all implemented as safe ones (i.e., under some mutex), the collection may be considered as a Hoare-style monitor.

```
// insert an event into the event table in a safe way.
// my_event may be an index into the event table.
// if the event is already in the event table,
// add thread "t" to the list of threads to be awakened when the event "e"occurs
my_event = ts_insert_event (thread t, event e);
// change the status of the indicated event to posted
ts_change_event_status_to_posted (my_event e);
// signal all threads waiting for it to proceed, and remove e from the event table
ts_trigger_event (my_event e);
```

Additional Details and Embodiments of the TidalTree (TT) and Scheduling

Described below are additional details and embodiments of the TidalTree (TT) and scheduling, which, in some embodiments, take into account threads.

Optimized TidalTree

Figure 15A:
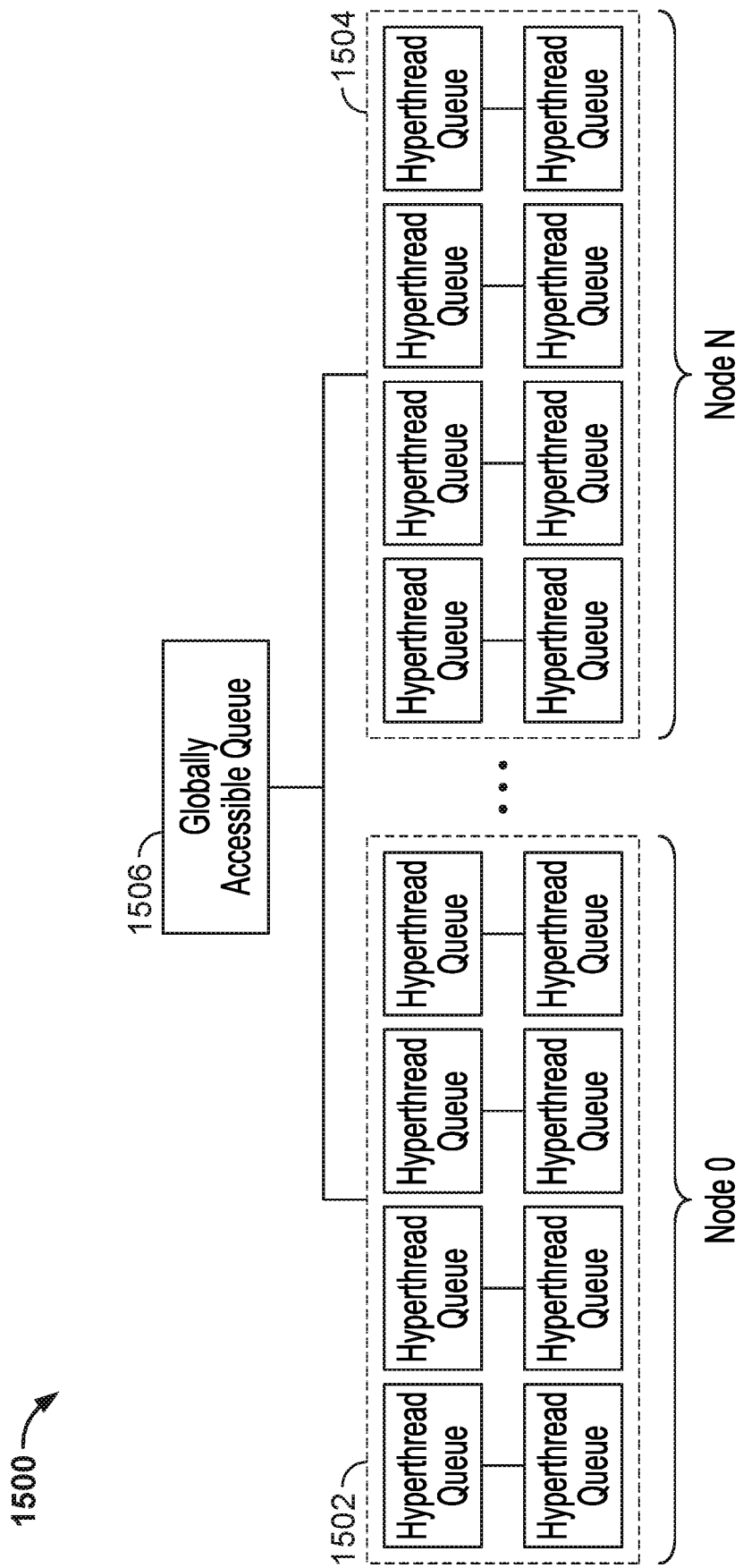
FIG. 15A illustrates an example embodiment of a TidalTree.

FIG. 15A illustrates an alternative embodiment of a TidalTree. In this example, the alternative embodiment of the TidalTree is referred to as the "optimized TidalTree," and is an optimized or flattened or reduced version of the TidalTree described above.

In an above example implementation of the TidalTree, the TidalTree was implemented as a physical tree, for example, a depth-five tree (when including hyperthreads), where each node/vertex of the tree had a work queue of vcpus that were ready to run. In the physical tree implementation of the TT, each second level subtree was resident on a node, and each vertex in the tree represented a physical portion of the computation hierarchy. For example, the leaves corresponded to hyperthreads. One level up represented the joining of hyperthreads into a core. One level up from that represented the physical processor containing all the cores which it contains. One level up from that represented the motherboard containing all the processors which it contains. Finally, one level up represented the TidalPod (i.e., all of the motherboards in the system). When queuing vcpus that were ready to run, an attempt would be made to place a vcpu in the queue of the pcpu that it last ran. If that queue was full, the next queue one level up would be searched and so on, until the vcpu could be added to a work queue.

In the above implementation of the depth-five TT, the location of the root may be arbitrary, but may, in some embodiments, be on a well-known node or a node specified at boot time. The root contains a queue of TidalPod-wide vcpus that are ready to run that are not queued on the pcpu queues on any node. In some embodiments, the node containing the root queue responds to enqueue-root and dequeue-root messages, but the location of the root may be independent of vcpu migration policy; in some embodiments, it may be the node that maintains the queue.

In the optimized version of the TidalTree structure, instead of building or implementing a physical tree structure (as in the depth-five TT), the optimized TidalTree is implemented as a set of queues corresponding to each physical processor in the hardware configuration (e.g., the hyperthreads in the example of FIG. 2) and a globally accessible queue, where the hierarchy of the tree is replaced with a visitation order. For example, there is one queue for each pcpu assigned to the hyper-kernel. (See, for example, the discussion on split schedulers below.) The queues corresponding to each of the physical processors (e.g., queues 1502 and 1504) are referred to herein as "pcpu queues," and the globally accessible queue (1506) is referred to herein as the "root." Rather than the two-dimensional structure of the above depth-five TidalTree, the optimized TidalTree is implemented using a one-dimensional structure. In this example embodiment, the pcpu queues are examples of the leaves of the depth-five TidalTree, while the globally accessible queue is an example of the root queue of the depth-five TidalTree.

The optimized TidalTree has a reduced number of work queues, as compared to the above example implementation of the depth-five TidalTree. For example, if there are N physical processors assigned to the hyper-kernel, then there are N+1 queues in the optimized TidalTree (N physical processors and one globally accessible root queue), whereas the depth-five TT has a number of nodes equal to the number of vertices in the tree. Thus, the number of queues to traverse/visit in the optimized TT is reduced.

Thus, as described above, in this example implementation of the optimized TT, the optimized TT is implemented as a set of queues, where there is one queue for each physical processor assigned to the hyper-kernel, along with a traversal algorithm that mimics a tree-walk. In one embodiment, the pcpu queues are implemented as first come first serve (FCFS) lists of vcpus that are ready to run. In some embodiments, the order in which the pcpu queues are searched is pre-determined to implement cache-affinity. For example, a search path that corresponds to the cache levels of the conceptual tree is used. The knowledge of cache levels is embedded in the physical processor traversal algorithms, rather than maintaining multiple queues on tree vertices, as described in the above embodiment of the depth-five TT. The traversal order may be fixed at boot time and corresponds to the physical topology of the virtualized system described herein.

Assume, for example, that there are p physical processors on a node assigned to the hyper-kernel. On each node, there are n physical processors reserved for FreeBSD, leaving the remaining p-n physical processors reserved for the hyper-kernel to use in scheduling vcpus. Assuming k nodes, then, there are k*(p-n) vcpus to be scheduled.

As described above, each pcpu has an associated FCFS list of vcpus that are ready to run.

As described, when a vcpu stalls, it is placed on the node's event table waiting for the event to occur. In this state, the vcpu cannot migrate. When an event occurs on the node (being triggered, for example, by some pcpu pe), pe takes the event and enqueues all vcpus waiting on this event into the virtual TidalTree and then continues to do whatever it was dong previously. (The processor pe may be either a reserved FreeBSD processor or a reserved hyper-kernel processor whichever processor is handling the event, it should release the appropriate vcpus waiting on the event, and queue them onto the TidalTree).

When a pcpu pnew becomes available, it assigns itself work, for example, by searching for the most appropriate vcpu to run. Pnew then assumes that vcpu's identity and the vcpu starts running.

Further details and embodiments regarding the process of placing ("enqueueing") a vcpu onto the TT (e.g., after it is taken off the ET), and the process of dequeuing a vcpu from the TT into a pcpu (e.g., when an anonymous pcpu is looking for work to perform) are described in further detail below.

Enqueueing a VCPU onto the TT

As described above, a vcpu is queued when it is removed from the event table (e.g., because an event that the vcpu was waiting on has occurred), or as a result of a migrating vcpu arriving on a node. In both cases, the vcpu is queued up on a selected pcpu on this node (i.e., placed in the queue corresponding to a particular pcpu), if an appropriate pcpu queue may be found.

The order in which the pcpu queues are searched may be predetermined to implement cache-affinity, where, in some embodiments, the traversal order conforms to the cache hierarchy. In one example of the cache hierarchy or hierarchy of caches, two hyperthreads on the same core share cache data, multiple cores on a processor chip share cache data, and multiple processors on a motherboard share cache data.

In some embodiments, overscheduling of multiple hyperthreads on a same core is avoided when possible, since the multiple hyperthreads on a core may be using the same processor hardware, and may conflict with each other's execution. Thus, it may be desirable to spread out hyperthreads to prevent such execution conflict; however, it may also be desirable to utilize cache affinity as much as possible, resulting in two potentially conflicting goals. Thus, in some embodiments, a search order is established (e.g., at boot time), for a particular type of processor being used.

As one example, when a vcpu becomes ready to run, the search for a queue on which to place or enqueue the ready-to-run vcpu is performed as follows. Begin with a starting chosen pcpu. As one example, the search is started on the queue corresponding to the pcpu on which the vcpu last ran. In some embodiments, the state of each vcpu is extended to record the last node and the pcpu on that last node on which the vcpu ran. The search for an available pcpu queue (and by extension, pcpu) begins with the last pcpu on which the vcpu ran (assuming that the last time the vcpu ran, it was on the same node that it is currently on). If the vcpu has just migrated (and therefore cannot run on the pcpu that it previously ran on), or is just starting up, the first pcpu queue to access or visit may be arbitrarily selected. As described above, one goal is to not overload cores. In some embodiments, the search is biased to distribute the ready-to-run vcpus over the full set of cores if possible, as will be described in further detail below.

As one example, the search starts with the chosen pcpu (i.e., the physical processor on which the vcpu was last running, if possible, as described above), and a cache-related pcpu not on the same core whose queue length is zero (i.e., the queue is empty) is searched for. If one cannot be found, then an attempt is made to queue the vcpu on a core which already has a vcpu ready-to-run. For example, a queue whose queue length is one, then two, up to the maximum queue length is searched for. The order of the search conforms to the cache hierarchy. In one example, an attempt is first made to enqueue the vcpu on the first or starting pcpu (queue), then its siblings, then cousins, then second cousins, and so on. In one embodiment, a sibling of a pcpu p refers to the hyperthread that shares the same core as p. A cousin processor refers to a pcpu that has a common ancestor. An example of a cousin pcpu is a pcpu that is on a different core of the same chip. If such a pcpu cannot be found, then the next pcpu that is checked is one that is on a different chip or socket, but on the same motherboard (i.e., that has a physical connection to p). In this way, implicitly, both the warmest cache is found, and the vcpus are spread out on the available pcpus on this node.

As another example, when a vcpu becomes ready to run, a search is started with the physical processor (e.g., hyperthread) on which the vcpu was last running if possible, and if the corresponding queue has empty slots (i.e., the queue length is less than the max length). Otherwise, the search progresses to the next pcpu and so on until all possibilities are exhausted on the node. The vcpu is then placed on the root.

Various traversal orders may be set at boot time. As one example, the next core in a numerically ordered list of cores is searched. If the vcpu can be placed on that core, then the vcpu is placed on that core. This may result in the sharing of some of the same cache lines as the pcpu on which the vcpu was last running. As described above, in some embodiments, use of a hyperthread on the same core is avoided if the sibling hyperthread on that core is busy.

Figure 15B:
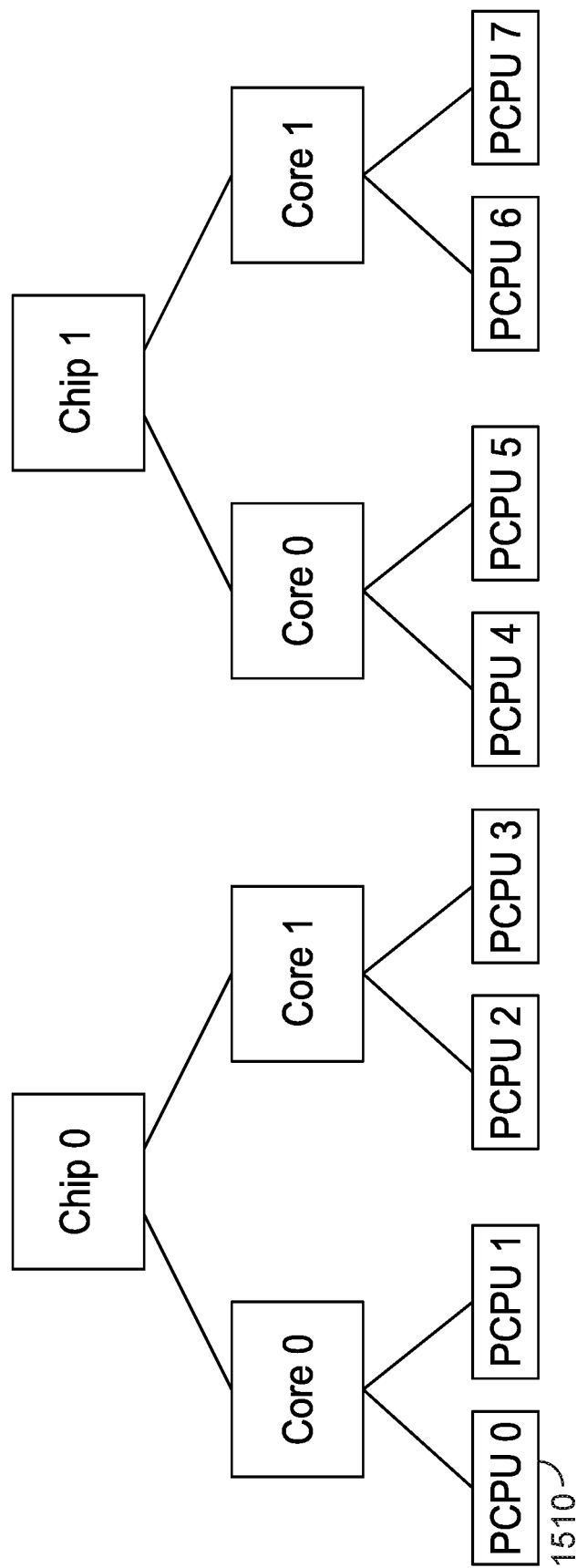
FIG. 15B is a diagram illustrating an embodiment of a search for a pcpu queue on which to enqueue a ready-to-run vcpu.

FIG. 15B is a diagram illustrating an embodiment of a search for a pcpu queue on which to enqueue a ready-to-run vcpu. In the example shown, a motherboard for a node has two chips (e.g., in two sockets on the motherboard), with each chip having two cores, and each core having two hyperthreads (other hardware configurations may be possible). Thus, as shown in this example, there are eight pcpus, labelled in this example as PCPU 0 to PCPU 7. Suppose that the search starts from PCPU 0 (1510). If the vcpu cannot be placed on PCPU 0, then in this example, the next pcpu queue that is visited in the search is the queue corresponding to PCPU 2, which is on the same chip, but a different core, than PCPU 0. In this example, by visiting PCPU 2 next, overloading of core 0 of chip 0 may be avoided if PCPU 1 is busy. Further, this attempts to spread out the vcpus on the nodes (e.g., to pcpus on other cores).

In this example, the next PCPU queue after PCPU 2 is visited is PCPU 1 (for example, if PCPU 1 had been previously busy, it may no longer be busy at this point in the search, and overloading may be avoided). The PCPU visited after that is PCPU 3, then PCPU 4 (moving to the other chip on the motherboard in this example), then PCPU 6, then PCPU 5, then PCPU 7.

In this example, the repeating formula defining the ordering above is (+2−1+2)+1 (+2−1+2) and so on. As a "Kleene" or regular expression pattern, the above is defined by the following example formula:

$$[(+2-1+2)+1]*$$

If any appropriate pcpu queue with less than or equal to the maximum queue length cannot be found on the node, the vcpu is queued on a globally accessible FCFS list of vcpus (the root, as described in FIG. 15A) that are available to run on any node in the cluster. The queues for pcpus on other nodes are not evaluated, because the vcpu is on a particular node for a reason, for example, based on the locality of the polynomial strategies—i.e., the vcpu had been migrated to the specific node, or requested a page to be moved to the node it is on.

In an alternative embodiment, rather than placing the vcpu on the root, the poorest performing vcpu for the node is evicted and bumped onto the root queue. The vcpu-to-be-queued is then placed on the pcpu queue from which the poorest performing vcpu was evicted.

Care should be taken to not overload the pcpus on a node; the FreeBSD scheduler queues that run hyper-kernel threads should be kept as short as possible. In some embodiments, the maximum number of TidalTree threads that can be made ready-to-run (i.e., placed on the pcpu queues and root queue of the TT) are specified as a hyper-kernel initialization parameter.

If there are too many vcpus compared to available pcpus on the virtualized system, the CPU load should be balanced among the nodes of the pod. The determination that there are too many vcpus compared to available pcpus may be made by tracking the total number of vcpus in the TidalTree that are ready to run. It can be assumed that there is some level of overcommitment that can be tolerated. This level may be established by a boot time parameter. Additional details regarding overcommitment will be described below. If the node's TidalTree (e.g., set of pcpu queues corresponding to pcpus local to the node) becomes congested (i.e., the commitment level is going to be exceeded), the hyper-kernel may perform an exceptional action, where, as described above, the TidalTree selects a vcpu that is ready-to-run (e.g., poorest performing vcpu on a node) and places it in a special queue—the global TT-root, as described above, where there is one root for the entire pod.

The vcpu which will be evicted from the node's pcpu queues and bumped onto the globally accessible root queue may be selected as follows. The vcpu which will be evicted is currently running a guest thread, and therefore has an associated goodness metric. By evicting this guest thread (by evicting the vcpu running the guest thread), this may affect the location of the guest thread's needed memory, as well as the location of memory of other guest threads that may have common interest with that guest thread. In some embodiments, to decide which vcpu to evict (by placing it to the root to be pulled in the future), a set of terms such as the goodness metric, memory state, and common interest (examples of which are described above) are considered. For example, the vcpu (in the pcpu queues on the node) that is performing the poorest (e.g., as measured using the goodness metric) is evicted and placed onto the globally accessible root queue.

While it may be important to both keep pcpus busy and to reuse cache lines, in some embodiments, the traversal algorithm described herein asserts a bias towards keeping pcpus busy versus reusing cache lines, but not at the expense of overloading a core with too many hyperthreads.

The scheduling algorithm described herein may take into account thread identity. For example, using the scheduling algorithm described herein, attempts are made to restore a vcpu onto the last pcpu on which the vcpu ran. The vcpu was running a guest thread, which does not change while the vcpu was stalled. When the vcpu is restored, not only will it be restored in the most advantageous pcpu that can be identified, but in restoring the vcpu, the thread is simultaneously restored onto the last pcpu on which that thread ran. While this is a heuristic (as it may not be possible to observe the L1, L2, or L3 caches), this approach is optimal, where the thread is placed on the last pcpu on which it ran, or the closest relative not on the same core that can be identified.

In some embodiments, cores are prevented from being overloaded. For example, the search described above may be biased to distribute the vcpus over the full set of cores. The bias is added to not co-schedule threads onto hyperthreads when empty cores are available (where placing a vcpu on a pcpu queue will cause the vcpu to run on the corresponding pcpu, thereby scheduling the running of the vcpu on a pcpu). For example, a vcpu (and by extension, the guest thread running in the stalled vcpu) may be placed on the last pcpu on which it ran, or the closest relative not on the same core. Thus, in this way, if there is already a vcpu queued up on a hyperthread, then a new ready-to-run vcpu is not placed on the next hyperthread sharing the same core.

In some embodiments, the traversal order (order of visitation of the queues) is fixed at boot time and corresponds to the physical topology of the system.

Dequeuing a VCPU from the TT into a PCPU

In the following example of dequeuing a vcpu from the TT into a pcpu, suppose that a guest operating system is collectively run across the cluster. A guest application is running on the guest operating system. The guest application is in turn associated with guest threads. The vcpus (managed by their vcpu thread on a node that the vcpu is running on) run the guest threads.

Vcpus exist in the context of the hyper-kernel. In this example, the vcpu is running in a vcpu thread. In this example, this vcpu thread is actually a FreeBSD thread and as such is managed by FreeBSD as a FreeBSD thread, but it is also managed as a vcpu thread by the hyper-kernel. On any node, there is a 1:1 correspondence between a vcpu thread and a vcpu. In one example implementation, on a given node, there is a 1:1 correspondence between a vcpu thread and a FreeBSD thread. In some cases, the hyper-kernel has no other threads than those on which the hyper-kernel relies on FreeBSD to provide.

Suppose that the virtualized system is in a steady state. A guest operating system (e.g., Linux) is running an application (e.g., performing reads, writes, computations, executing instructions, advancing the program counter, etc.). For example, a guest thread associated with the application has been assigned (by the guest operating system) to a vcpu, which has been assigned to a physical processor.

Now suppose that the physical processor, on behalf of the guest thread, executes an instruction and tries to access a page of memory that is not available to the physical processor (e.g., the page of memory is not on the same node as the physical processor). For example, the virtualization hardware attempted to translate (e.g., by performing dynamic address translation using the second level page table for the node on which the physical processor resides) a guest physical page (address of which was obtained using a first level page table, as described above) into a real physical memory address in the host physical memory. In this example, suppose that there was no entry for the gpa (e.g., the second level page table entry is invalidated, zeroed, etc., and there is no mapping between the gpa and a real physical page on the node), and the corresponding real physical page could not be resolved or referenced by the physical processor (which has assumed the identity of the vcpu that is being run by a vcpu thread, working on a guest thread).

Because the virtualization hardware (e.g., Intel VT-x or AMD AMD-V) cannot translate the gpa to a real physical address, an interrupt is automatically generated. When the hardware generates an interrupt, the hardware accesses an interrupt table (a part of the operating system), which includes an address of a routine to be called when the interrupt occurs. The hardware then vectors to the routine (e.g., by using the corresponding address). For example, the program counter (and any other register state) is saved by the hardware (e.g., the processor state is pushed onto an interrupt stack), and the new program counter is set to the routine that was specified in the interrupt table. By saving the processor state prior to performing the interrupt routine, the physical processor may then return to its previous state after returning from the interrupt (e.g., after returning from the interrupt, the saved state is taken off the interrupt stack in reverse order, causing the processor to effectively jump to the next location after the interrupt occurred, such that the guest operating system will continue as if the interrupt had not occurred).

In this example, the routine included in the interrupt table/vector that is called is a hyper-kernel routine/code. In some embodiments, the host operating system is configured to deliver an interrupt to the hyper-kernel (e.g., re-vector interrupts to the hyper-kernel), where the hyper-kernel code is then run.

Examples of the hyper-kernel code that is executed to handle the interrupt when it fires are described above. For example, a continuation may be created using the saved processor state (e.g., by the hyper-kernel code, which has visibility into the interrupt stack and may take a snapshot or copy of the saved processor state for the continuation). After the stalling event is handled, the state of the vcpu may be restored from the continuation (e.g., when a physical processor assumes or takes on the identity of the vcpu, it loads the processor state in the vcpu).

In this example, a stall has occurred. The stall may be either something that can be dealt with immediately, or something that will require waiting. An example of a stalling event that may be handled immediately is a request for a timer. After the timer is obtained, the stall is handled, and the interrupt may be dismissed.

If, however, the stall is, for example, a page stall (due to a non-local page request), then handling of the stall will require waiting. For example, as described above, a set of polynomials is evaluated to determine a strategy for handling the stall. As described above, either a decision to request the page is made, or a decision is made to migrate the vcpu to the node that the page of memory is on.

Suppose, for example, it is determined that a request for the page is to be sent. The vcpu thread will have to wait in this case. The pcpu then places the thread ID (of the guest thread running in the vcpu thread representation of the vcpu) and a pointer to the continuation in the event table. Other information stored in the event table includes the identifier of the page that was requested and that the vcpu (continuation) is waiting on.

Thus, as described above, when a vcpu stalls, the vcpu is likely to have been running a guest thread in what the guest thinks of as a physical processor, but from the perspective of the hyper-kernel, is in reality a virtual processor (i.e., vcpu). The scheduler in the guest operating system (e.g., Linux) may change the mapping of guest threads and vcpus on, what is from the hyper-kernel's point of view, some arbitrary basis (i.e., thread context switching, as described above), but the guest thread/vcpu association cannot change during the stall. As described above, the hyper-kernel may track the identity of the thread running in the vcpu by examining the processor state, and may also notice thread transition events when the vcpu stalls. The vcpu may perform what is needed to satisfy the stall immediately, or the vcpu may need to initiate an action so that the guest can complete the operation later, as described in the discussion regarding the event table above.

If, for example, it is the latter case, once a strategy decision (migrate vcpu or send page request) is made for this stall, and it is known that this will result in a delay (i.e., the stall cannot be handled immediately), an entry is placed, as described above, in the event table and the event on which it is waiting is marked as anticipated. The action corresponding to the stall is initiated after selection of the strategic alternative, (e.g., initiate a page request, initiate an I/O operation, etc.), and the vcpu thread (representing the stalled vcpu) sets the state in the event table to posted.

Now, after the vcpu thread enters the event into the event table, the vcpu thread is still running in a pcpu, but the vcpu (technically) is not (e.g., the vcpu thread is running hyper-kernel code). The pcpu that had been running the vcpu thread (where the pcpu is now an anonymous processor) may then directly or indirectly perform a limited amount of housekeeping (e.g., balancing memory usage). In some embodiments, the vcpu thread signals a housekeeping thread to wake up and perform housekeeping. Alternatively, the vcpu thread may perform the housekeeping itself, which reduces the number of context switches.

A mechanism may be used to limit the amount of work a housekeeping thread can do. This mechanism may be parameterized by the amount of pending work that needs to be done by the guest. The amount of pending work may be characterized, for example, by the number of vcpus in the TidalTree that are ready to run. This may be given in the example provided below: For example, if there are many vcpus that are ready to run, then less housekeeping is performed. If, on the other hand, there is a small number of vcpus that are ready to run, then more housekeeping may be performed.

//returns the number of vcpus in the TT that are ready to run
   n=runnable_vcpus( );

It may be desirable to segregate the pcpus that perform FreeBSD work from pcpus performing work on behalf of the guest operating system. For example, a small number of the physical processors are reserved for FreeBSD (e.g., two, which may be a boot time parameter), while the remainder may be for the hyper-kernel. This division of responsibilities is referred to herein as "scheduler-splitting." As described above, FreeBSD may be used to handle thread sleep and wakeup, where FreeBSD is taking care to save and restore the proper state of the FreeBSD thread corresponding to the vcpu thread on a given node, which in turn corresponds to the vcpu. FreeBSD handles these operations on behalf of the hyper-kernel automatically (and presumably, in a highly-optimized manner). The hyper-kernel migration code simulates this behavior across node and host scheduler boundaries.

The following is an example implementation of choosing which vcpu to run next on the now anonymous physical processor (i.e., selecting or dequeuing a vcpu that is ready to run from the TT into the physical processor).

The vcpu thread that had been running a vcpu that had just been placed in the event table is actually running in a pcpu. That vcpu thread running in the pcpu may now select a waiting vcpu (if there is one) in the TidalTree that is already ready-to-run. For example, the following dequeuing algorithm is performed by the pcpu (now anonymous/available) running the vcpu thread.

The search for a vcpu to run on the anonymous physical processor is begun at the pcpu queue corresponding to the anonymous physical processor. Similar to the enqueueing/scheduling algorithm described above, the conceptual tree is traversed upwards to reuse cache lines. As described above, when vcpus are placed on the TidalTree, attempts are made to place the vcpus on the queues of the pcpus that they last ran on. The now anonymous pcpu (now running hyper-kernel code, independent of any vcpu threads) scans its own queue to search for a ready-to-run vcpu that has been running on the pcpu most recently. The new anonymous pcpu may be running a FreeBSD thread to perform the scanning (while it is searching for a new vcpu identity to assume). In some embodiments, the anonymous pcpu will attempt to select the vcpu on the node that last ran on it due to cache warmth, where selection of the vcpu that had been running on the anonymous pcpu last allows for reuse of the warmest cache. For example, each physical processor has one or more levels of cache, such as a translation lookaside buffer (TLB) and cache line entries for pages. If a page that is being looked for is already in the cache, then there is no need to search for it in the memory. If the anonymous pcpu's queue does not have any vcpus that are ready to run, other queues are looked at next, following, for example, the conceptual cache hierarchy order.

One example reason for the order visitation described herein is as follows. Suppose that a multi-core processor has four cores. Each core has a cache. If there are two multi-core processors, each with four cores, then the pcpu should stay on the queues for the multi-core processor that it is a part of, because it may then utilize the shared cache (i.e., it is more advantageous to use a core that has a physical locality, as the probability that the cache lines can be reused is higher than if the queue for a different core is used). This is true up the hardware configuration (where the hardware configuration may be described as a tree structure or hierarchy, as described in conjunction with FIG. 2). If all the pcpu queues on the node of the pcpu are empty, in some embodiments, the pcpu searches a root queue that is globally accessible to all pcpus on all nodes. This has the effect of helping to balance the activity on all nodes. If the root queue is empty as well, then the pcpu may be configured to perform other processing, such as housekeeping.

In some embodiments, two hyperthreads on the same core are not scheduled back to back, as the two hyperthreads may share or be using the same processor hardware, potentially causing conflict with each other's execution.

Upon selection of a waiting vcpu that is ready to run, the pcpu takes on the identity of the selected vcpu. For example, the vcpu that has been waiting the longest on a pcpu queue and/or the warmest cache affinity is taken off the TidalTree (e.g., the first vcpu is taken off an FCFS list/queue, which will have been the vcpu that has been waiting the longest). A cost function may also be used to determine which continuation is the most appropriate to assign to the hyper-thread. In some embodiments, the vcpu thread signals the selected waiting vcpu to wake up, and then puts itself to sleep waiting for the event in the event table on which it's waiting to complete. The state of the selected vcpu is restored onto the pcpu. In this example, this sleep operation, which is an implicit invocation of the host scheduler, allows the FreeBSD scheduler to use the pcpu in which the vcpu thread had been running for other purposes (e.g., the housekeeping thread, or a newly awakened vcpu). The FreeBSD may also select a different pcpu to use. The signal/wake operations described above are among the explicit points at which the hyper-kernel synchronously invokes the FreeBSD scheduler.

If there are no vcpus on a node that are ready to run (i.e., all pcpu queues for the queues on the node are empty), the pcpu should not let itself become idle. Instead, it should select a vcpu from the root. By searching for work after the previous vcpu running in the pcpu has stalled and is placed on the event table, the pcpu is kept maximally busy (rather than waiting for the stalling event for the vcpu to be satisfied, the pcpu searches for new work to perform). If there are no vcpus on the root, then in one embodiment, the dequeuing/vcpu selection algorithm described above is looped until a vcpu that is ready to run is found (either on the pcpu queues of the local node, or on the globally accessible root). In another embodiment, if there is a ready-to-run vcpu on another node, work-stealing may be performed, where the other node is queried for vcpus to run, and one is "stolen" from the node to run on the pcpu. If that fails, the pcpu may be halted and placed into a power-saving mode to save power, since the pcpu cannot find any work to do, anywhere in the pod/cluster. In some embodiments, the pcpu is tasked to perform housekeeping in order to keep maximally busy.

Thus, as described above, when a pcpu becomes available (i.e., stops running a vcpu because the vcpu was stored in the event table, or a vcpu migration occurs, or at startup or shutdown), pcpu queues are searched looking for the most appropriate vcpu to run. If the node is completely empty of vcpus that are ready to run (i.e., the pcpu queues associated with the node are empty), the first vcpu is pulled off the global root of the TT, and restored on that pcpu.

Multiple strategies may be used to select which vcpu should be pulled or dequeued or otherwise selected from the TidalTree. In some embodiments, cost functions are used to arrive at the highest benefit strategy. Examples of factors to consider include:

1. Starvation should be avoided.
2. Locality—the memory state of the pulled guest thread on the node which is pulling it may be consulted.
3. If attempts are made to compress the vcpu load into the minimum possible number of nodes, some unnecessary (for vcpu load) nodes may be excluded from being involved.

Additional Details Regarding Overcommitment

In some embodiments, the maximum length of each pcpu queue of available vcpus (i.e., vcpus that are ready to run) is tunable. The queue lengths may be fixed at boot time or dynamically adjustable. As one example of determining the maximum queue length, suppose that it is desired that the number of pcpus equals the number of vcpus. The maximum queue length may be limited to the number of vcpus, meaning that all vcpus in the system could queue up on a single pcpu. In some embodiments, in order to encourage even distribution of an n-node pod where there are p pcpus per node, the maximum queue length per pcpu may be determined according to the following equation:

$$\text{maximum queue length per } pcpu = \frac{\frac{\text{number of } vcpus}{n}}{p}$$

Experimentation may be performed to determine a queue length that provides the best performance of a broad workload.

Example Data Structure

Suppose a virtualized system in which p pcpus are allocated to the hyper-kernel, where the p pcpus are distributed among n nodes. Corresponding to each pcpu on each node, there is a queue of vcpus that are ready to run. Initially, the queue is empty. In some embodiments, each pcpu also specifies the next pcpu to search in a pattern fixed at boot time. In some embodiments, the search is a circular search, where, in this example, the search starts with two parameters: the current pcpu, and the starting point. If the search returns back to the starting point, then all queues have been visited.

As physical processors start up on each node, the processors look for vcpus to work on. First, the physical processors look locally (e.g., on the pcpu queues local to the node), then globally (e.g., to the globally accessible "root" queue). Care should be taken at startup to not overload the root of the TidalTree.

Housekeeping Functions

As described above, assuming, for example, that the aforementioned TidalTree mechanisms are in place, a vcpu thread, after it has placed its vcpu in the ET, may invoke various housekeeping functions, directly or indirectly.

In some embodiments, housekeeping may be performed via a balancer thread (which may be implemented as another FreeBSD thread). In one example embodiment, the balancer thread is a single synchronous thread. The balancer thread tracks the amount of memory and may perform other housekeeping functions. The balancer thread may also be used to perform the sampling described above. The actions taken by the balancer thread may depend on utilization. In one embodiment, utilization is categorized into three levels: low, high, and critical.

The balancer may be run asynchronously by one or more pcpus. While the pcpu is anonymous (i.e., after it has shed a previous vcpu entity and prior to assuming the identity of a new pcpu), the pcpu may perform some housekeeping. This allows the housekeeping workload to be distributed amongst various pcpus (and not just one thread that may become overloaded).

The amount of housekeeping work performed by the pcpu may vary depending on various factors. As one example, the amount of housekeeping work that is performed by the pcpu is dependent on the number of vcpus that are queued up to run in total, as described above. If there is a large number of vcpus that are ready to run, then the amount of housekeeping should be minimized. If there are not a lot of vcpus that are queued up, then more housekeeping may be performed by the pcpu. This allows the pcpu to remain maximally busy doing useful work.

Thus the amount of incremental work the balancer is allowed to do is limited. For example, if the node is congested with a large number of vcpus that are ready to run, the housekeeping code may use this information (i.e., the number of vcpus that are ready to run) and limit itself accordingly, so that the pcpus can be used, for example, as containers for vcpus. As described above, the balancer is provided with information indicating how many vcpus are in the TidalTree, and are therefore ready to run. For a low number of vcpus that are ready to run, the balancer spends more time housekeeping; for a high number, the balancer spends less time performing housekeeping.

One example of housekeeping that is performed is, at the critical memory utilization level (e.g., memory pressure is at a critical state, as described above), to get rid of or evict pages. As described above, memory management may be performed, which includes keeping track of, for each page, which threads need the page, and also keeping track of, for each thread, which pages they need. The determination of which page to evict may be determined based on such information, as well as the goodness metric. For example, when evaluating a page for eviction, the goodness metric of each thread that needs the page may be determined. For example, if the threads that are using a page are performing well, then the page probably should not be evicted, all else being equal. In contrast, pages whose threads are behaving poorly may be evicted.

In some embodiments, neither of the below calls returns status (since, in some cases, nothing may be done with it). In some embodiments, the calls are prevented from invoking any code (e.g., such as a wait) that would cause the FreeBSD scheduler to get involved without allowing the opportunity to choose the next thread to activate from the TidalTree.

```
//In some embodiments, this example code is invoked before
   sending a VCPU to
another node,
//       allowing the housekeeping code to perform housekeeping
   processing,
//       such as moving pages in advance.
//       In this example, ts_load_hint is an enum that indicates
   to the housekeeping
code that
//       the system is either busy (and to limit itself)
//       or that the system is not busy.
void ts_housekeeping_on_vcpu_move(int vcpuid, void *arg,
   ts_load_hint hint)
//In some embodiments, this is invoked after placing a VCPU
   in the event table.
void ts_housekeeping_incremental(ts_load_hint hint)
```

The following defines an example set of cases when the housekeeping system makes a decision, where one or more of the cost terms described herein may be used:

Example of Choosing When to Act:

Housekeeping may not need to happen all the time. If the housekeeping functions "overreact," for example, by sending too many pages away, this may potentially cause memory fragmentation. On the other hand, if housekeeping does not act fast enough, too many vcpu migrations may be forced due to memory pressure. In various embodiments, estimates of memory capacity, number of active threads/vcpus, and frequency of IOs are used to facilitate deciding when to act and how many pages would need to be evicted.

Example of Choosing Those Pages to Evict:

In some embodiments, the balancer evicts a certain number of pages within some short period of time (for example, to avoid excessive memory pressure). Input from terms such as memory state, goodness, common interest may be used to evict the "least" useful pages on the node in relation to the guest threads on that node, or, for example, to evict a set of pages useful to a guest thread with least goodness on that node. Various alternatives may be implemented.

Example of Choosing a Destination for Being Evicted:

In some embodiments, memory is not spread out more than is needed. Information about capacity of other nodes may be used to assist the balancer in moving the memory on a node that does not have balancing problems of its own.

Figure 15C:
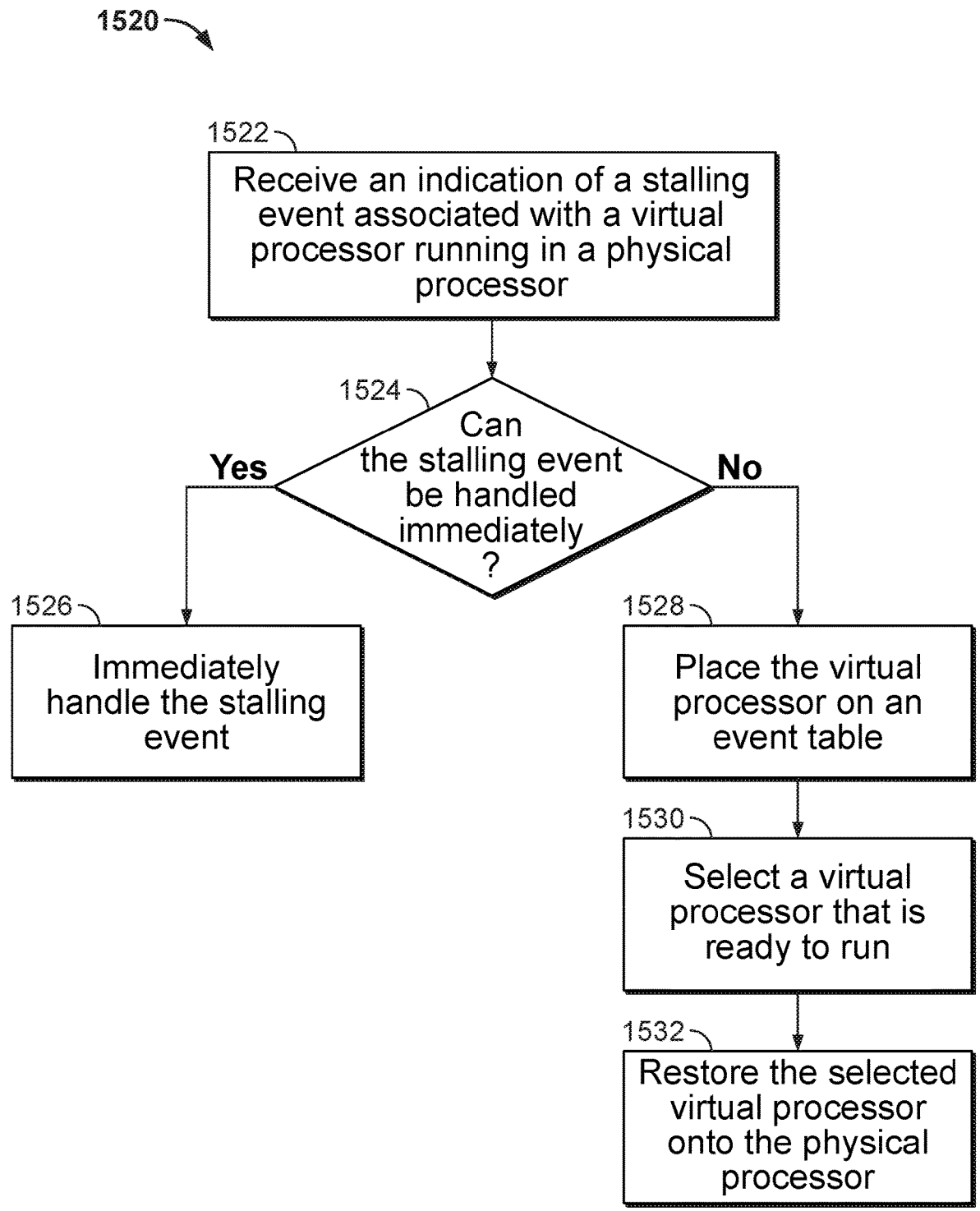
FIG. 15C is a flow diagram illustrating an embodiment of a process for handling a stalling event.

FIG. 15C is a flow diagram illustrating an embodiment of a process for handling a stalling event. In some embodiments, process 1520 is performed by a hyper-kernel. The process begins at 1522 when an indication is received of a stalling event associated with a virtual processor running in a physical processor. One example of a stall is due to a non-local page request.

At 1524, it is determined whether the stalling event may be handled immediately. If the stalling event may be handled immediately, then it is handled immediately at 1526, and process 1520 ends (where the virtual processor continues to run in the physical processor after the immediate handling of the stall).

If the stalling event cannot be handled immediately, then the process continues to 1528, where the virtual processor is placed on an event table. For example, suppose that the stalling event may not be handled immediately because it is due to a non-local page access. In this example, a request for the page is sent. The vcpu is then ensconced in the event table (where, for example, its continuation is placed in the event table), where it waits on the requested page. When the event occurs or is satisfied, then the virtual processor is taken off the event table and placed or enqueued on the TidalTree (e.g., Tidaltree 1500 of FIG. 15A, using process 1560 of FIG. 15E). Taking the vcpu off the event table and enqueuing the vcpu onto the TidalTree effectively schedules the running of the vcpu on a pcpu (as the vcpu will be eventually run by a pcpu when the pcpu becomes anonymous and searches for work).

The physical processor that had been running the virtual processor is no longer considered as running a vcpu and is now anonymous. The process continues to 1530, where a virtual processor that is ready to run is selected for the physical processor to run. Example processes for selecting a virtual processor that is ready to run include process 900 of FIG. 9 and process 1540 of FIG. 15D. At 1532, the selected virtual processor is restored onto the physical processor (where the physical processor assumes the identity of the selected virtual processor and is no longer anonymous).

In some embodiments, prior to step 1530 (e.g., between the time the pcpu has become anonymous and when the pcpu resumes a subsequent vcpu identity), the physical processor may be assigned to perform housekeeping, as described above. When the housekeeping work is completed, the process continues to step 1530.

FIG. 15D is a flow diagram illustrating an embodiment of a process for searching for a vcpu that is ready to run. This may include dequeuing a vcpu from a TidalTree into a physical processor. In some embodiments, process 1540 is performed by a hyper-kernel. In some embodiments, process 1540 is used to implement process steps 1530 and 1532 of process 1520 of FIG. 15C.

The process begins at 1542 when an indication is received of a stalling event. The stalling event is associated with a virtual processor running in a physical processor on a node. The node includes a plurality of physical processors. The node is included in a cluster of nodes, across which a guest operating system is collectively run. In some embodiments, step 1542 is an example of step 1522 of FIG. 15C.

At 1544, a set of queues corresponding to the physical processors on the node is searched for a virtual processor that is ready to run. Examples of the set of queues corresponding to the physical processors are the pcpu queues described above in conjunction with FIG. 15A. The set of queues are searched in a manner that follows a conceptual cache hierarchy order. For example, the set of queues may be searched according to a predetermined traversal algorithm, as described above, where the order of visitation of the queues corresponds to cache affinity and mimics a tree walk. In some embodiments, the first queue that is visited and searched is the queue corresponding to the physical processor that ran the stalled virtual processor and is now anonymous.

In the event that a virtual processor that is ready to run is not found in the set of queues corresponding to the physical processors on the node, a search of a root queue that is globally accessible to the plurality of nodes in the cluster is performed.

At 1546, a virtual processor that is ready to run is selected based on the search. For example, the virtual processor at the front of the first non-empty queue that is visited in the traversal order is selected (where the queues are FCFS). In some embodiments, an appropriate vcpu to run (e.g., assign to the anonymous physical processor) is selected based on a cost function. For example, the continuation that has been queued for the longest amount of time could be assigned. The selected virtual processor is assigned to the physical processor (e.g., restored onto the physical processor, where the physical processor assumes the identity of the selected virtual processor).

Figure 15E:
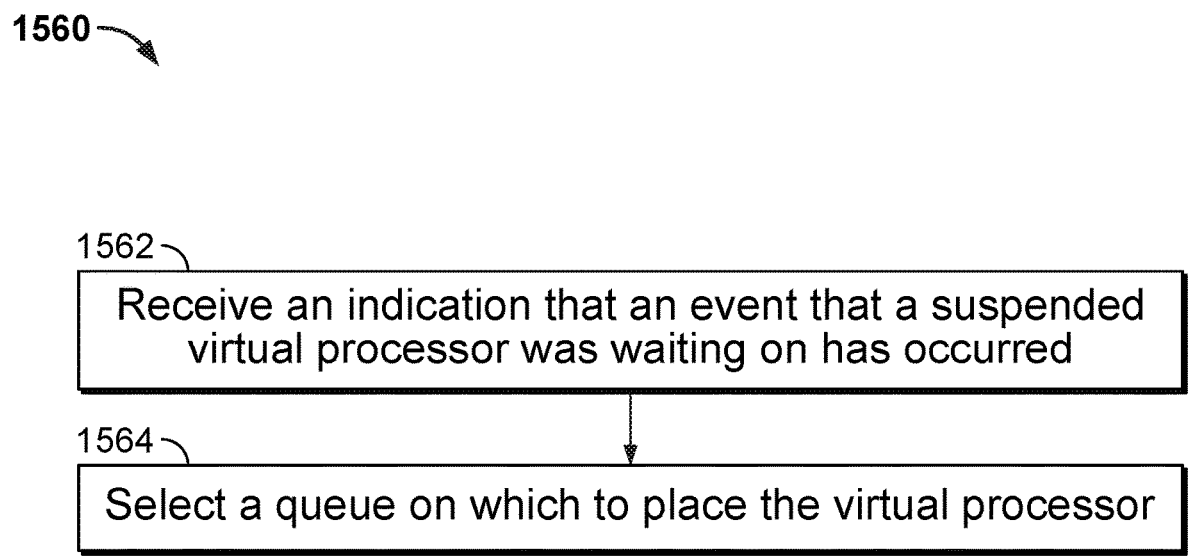
FIG. 15E is a flow diagram illustrating an embodiment of a process for placing a vcpu that is ready to run on a TidalTree.

FIG. 15E is a flow diagram illustrating an embodiment of a process for placing a vcpu that is ready to run on a TidalTree. This may include enqueueing a vcpu onto a TidalTree. In some embodiments, process 1560 is performed by a hyper-kernel.

The process begins at 1562 when an indication is received that a virtual processor is ready to run. The indication may be received in response to an event that the virtual processor was waiting on having occurred. The virtual processor is taken off the event table as a result of the event on which it was waiting on having occurred. As one example, suppose that a stalled vcpu had requested a page. The page has arrived, satisfying the event that the stalled vcpu was waiting on. For example, when the page arrives, the event table is accessed to determine what vcpus were waiting on the page (identified by its resource identifier, such as its guest physical address). The virtual processor (and any other processors waiting on the page) is made ready to run.

At 1564, a queue on which to place the virtual processor is determined at least in part by traversing a set of queues corresponding to a set of physical processors on a node. For example, a TidalTree implemented as a physical tree of queues, as described above, is searched. As another example, the TidalTree is implemented as a line or set of queues of vcpus that are ready-to-run, where there is one queue for each physical cpu ("pcpu") assigned to the hyper-kernel, where the hierarchy of the physical TidalTree is replaced with a visitation order (e.g., the optimized TidalTree, as described in conjunction with FIG. 15A). In some embodiments, the first queue that is visited corresponds to the physical processor on which the virtual processor last ran. As described, the state of the virtual processor (e.g., continuation) may be extended to indicate the last physical processor on which it ran. Unless the pcpu is overloaded, then the vcpu is placed on the queue. If the first queue is full or overloaded, then the traversal proceeds through the other queues in the set according to a fixed traversal order. In some embodiments, the traversal order is defined by the system topology. The traversal order mimics a tree walk (e.g., walk of a conceptual tree).

If a physical processor queue is not full, then the virtual processor is placed on the physical processor queue (e.g., at the end or tail of the queue, where the queue is FCFS). Thus, the next pcpu that is looking for work now has an additional vcpu to look at that it may become. So, when the next vcpu stalls, the pcpu that had been running the stalled vcpu will choose that next vcpu that was placed on the queue as a result of the page arriving, that has the warmest cache, and becomes the new vcpu (at some point in time, as there may be other vcpus already on the queue). As described above, in one embodiment, the pcpu queues are FCFS or first in first out (FIFO) such that the vcpu that is taken off will be the vcpu that has been in the queue for the longest amount of time. Non-FIFO strategies may also be used as well. The computer system may then semi-automatically optimize itself.

If all of the queues corresponding to the physical processors of the node are full (and there is no physical processor queue on which to place the ready-to-run virtual processor), then in one embodiment, the vcpu is placed on a queue (referred to as the "root") that is globally accessible to the entire cluster, that any pcpu can access. As one example, the root queue is made globally accessible to all pcpus throughout the cluster through a protocol between the nodes of the cluster (e.g., where the contents of the root are broadcasted).

In the above, the vcpu was placed on the root because all other queues were full on the node. This may not be the most optimal decision, as it may impact locality. For example, on a given node (e.g., the node on which the vcpu last ran), the vcpu may have been performing very well (e.g., as measured by the goodness metric). In other embodiments, instead of placing the vcpu on the root queue, the poorest performing vcpu in the set of queues on the node is identified and evicted from its physical processor queue. As one example, the poorest performing vcpu is determined according to the goodness metric, as described above. The evicted virtual processor is then placed on a root, globally accessible queue of virtual processors that are ready to run. The virtual processor that is ready to run is then placed (e.g., at the end of) on the physical processor queue from which the evicted virtual processor was removed (i.e., if a vcpu performs well on a node, then a ready-to-run vcpu on the node that does not perform as well should give its spot in the queue to the well-performing vcpu). Thus, as described above, when trying to place a vcpu in a queue, its goodness is compared with the goodness of the other vcpus (comparing the goodness of the threads that are in the stalled vcpus). The worst performing vcpu by goodness on the node is then moved to the root. Thus, if the vcpu that is being placed has better locality on a node than another vcpu in the queues of the node, the worse performing vcpu is moved off the node and placed in the root queue (i.e., the least good thread running in a vcpu is the one chosen to be evicted to the root queue).

In some embodiments, the traversal algorithm is biased to not co-schedule threads (vcpus) onto hyperthreads (pcpu queues) when empty cores are available.

In some embodiments, to prevent queues from becoming too long, an overloading threshold is implemented (e.g., maximum of three vcpus on a queue). The overloading threshold may be a boot time parameter. Suppose, for example, that all pcpu queues on a node are full. For example, the length of the queues may add up to more than the node can accommodate. For example, there may be two times, three times, or ten times the number of vcpus as there are pcpus on the node. The overloading threshold, in conjunction with the goodness metric, forces the worst performing vcpus on a node to be evicted to the root queue. This has the benefit of spreading processors out and preventing flocking/overloading. This also results in creating locality with pages (i.e., building up working sets). The load across the virtualized system may also be balanced on a demand-driven basis.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
   a plurality of physical nodes, wherein each node includes a plurality of processors;

wherein each of the processors includes a plurality of hyperthreads; and wherein in response to receiving an indication of a resource that a stalled virtual processor had been waiting on becoming available, resuming of the stalled virtual processor is scheduled at least in part by placing a representation of the stalled virtual processor in a work queue of stalled virtual processors to be resumed by a hyperthread, wherein the scheduling comprises:

traversing, according to a predetermined traversal order, a set of work queues corresponding to a respective set of hyperthreads on a physical node in the plurality of physical nodes, wherein a given work queue is accessible by a corresponding hyperthread; and in response to determining that all work queues in the set of work queues corresponding to the respective set of hyperthreads on the physical node are full, evicting a previously queued virtual processor from the set of work queues corresponding to the respective set of hyperthreads on the physical node, wherein the resource is on the physical node, wherein evicting the previously queued virtual processor is based at least in part on a comparison of a performance of the stalled virtual processor on the physical node relative to performance of previously queued virtual processors on the physical node, and wherein the evicted virtual processor is placed in a global work queue accessible to hyperthreads across the plurality of physical nodes.

2. The computer system of claim 1, wherein the evicted virtual processor comprises a poorest performing virtual processor in the set of work queues.

3. The computer system of claim 1, wherein the evicted virtual processor is evicted based at least in part on a measure of efficiency associated with a guest thread that had been running in the evicted virtual processor.

4. The computer system of claim 1, wherein the stalled virtual processor is placed on a queue from which the evicted virtual processor was evicted.

5. The computer system of claim 1, wherein the predetermined traversal order mimics a tree walk.

6. The computer system of claim 1, wherein the traversal begins from a queue corresponding to a hyperthread on which the stalled virtual processor last ran.

7. A method, comprising:
receiving an indication of a resource that a stalled virtual processor had been waiting on becoming available; and in response to receiving the indication of the resource that the stalled virtual processor had been waiting on becoming available, scheduling resuming of the stalled virtual processor at least in part by placing a representation of the stalled virtual processor in a work queue of stalled virtual processors to be resumed by a hyperthread, wherein the scheduling comprises:

traversing, according to a predetermined traversal order, a set of work queues corresponding to a respective set of hyperthreads on a physical node in a plurality of physical nodes, wherein a given work queue is accessible by a corresponding hyperthread; and in response to determining that all work queues in the set of work queues corresponding to the respective set of hyperthreads on the physical node are full, evicting a previously queued virtual processor from the set of work queues corresponding to the respective set of hyperthreads on the physical node, wherein the resource is on the physical node, wherein evicting the previously queued virtual processor is based at least in part on a comparison of a performance of the stalled virtual processor on the physical node relative to performance of previously queued virtual processors on the physical node, and wherein the evicted virtual processor is placed in a global work queue accessible to hyperthreads across the plurality of physical nodes.

8. The method of claim 7, wherein the evicted virtual processor comprises a poorest performing virtual processor in the set of work queues.

9. The method of claim 7, wherein the evicted virtual processor is evicted based at least in part on a measure of efficiency associated with a guest thread that had been running in the evicted virtual processor.

10. The method of claim 7, wherein the stalled virtual processor is placed on a queue from which the evicted virtual processor was evicted.

11. The method of claim 7, wherein the predetermined traversal order mimics a tree walk.

12. The method of claim 7, wherein the traversal begins from a queue corresponding to a hyperthread on which the stalled virtual processor last ran.

* * * * *

UNITED STATES PATENT AND TRADEMARK OFFICE
CERTIFICATE OF CORRECTION

PATENT NO. : 10,579,421 B2
APPLICATION NO. : 15/687172
DATED : March 3, 2020
INVENTOR(S) : Isaac R. Nassi et al.

It is certified that error appears in the above-identified patent and that said Letters Patent is hereby corrected as shown below:

On the Title Page

In page 4, Column 1, item (56), other publications, cite no. 10, delete "Juhasz et al., "Distributed and Parallel Systems: Cluster and Grid Computing", the Kluwer iternational series in engineering and computer science, 2005." and insert --Juhasz et al., "Distributed and Parallel Systems: Cluster and Grid Computing", the Kluwer international series in engineering and computer science, 2005.--, therefor.

In page 5, Column 1, item (56), other publications, cite no. 5, delete "VM (operating system). From Wikipedia, the fee encyclopedia. https://en.wikipedia.org/wiki/VM_(operating_system). Jun. 22, 2012." and insert --VM (operating system). From Wikipedia, the free encyclopedia. https://en.wikipedia.org/wiki/VM_(operating_system). Jun. 22, 2012.--, therefor.

Signed and Sealed this
Twenty-second Day of September, 2020

Andrei Iancu
*Director of the United States Patent and Trademark Office*